United States Patent [19]
Hashimoto et al.

[11] Patent Number: 6,091,584
[45] Date of Patent: *Jul. 18, 2000

[54] RECORDING MEDIUM WITH A BAND ATTACHED TO BOTH SIDES OF A SHUTTER FOR OPENING/CLOSING THE SHUTTER

[75] Inventors: Akira Hashimoto; Takamitsu Sugahara; Hirohiko Sugiura; Junji Kawada; Yasutaka Mizutani, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,117

[22] Filed: Jan. 9, 1997

Related U.S. Application Data

[62] Division of application No. 08/624,306, Dec. 26, 1995.

[30] Foreign Application Priority Data

Dec. 28, 1994 [JP] Japan ..................................... 6-328025
Nov. 21, 1995 [JP] Japan ..................................... 7-302979

[51] Int. Cl.[7] .................................................. G11B 23/03
[52] U.S. Cl. ........................................... 360/133; 369/291
[58] Field of Search ........................... 360/133; 369/291; 206/307, 308.1, 308.3

[56] References Cited

U.S. PATENT DOCUMENTS

| | | | |
|---|---|---|---|
| 4,509,086 | 4/1985 | Hickethier et al. | 360/99.05 |
| 4,608,617 | 8/1986 | Oishi et al. | 360/133 |
| 4,646,285 | 2/1987 | Ogusu et al. | 369/291 |
| 4,694,448 | 9/1987 | Tamaru et al. | 369/291 |
| 5,073,889 | 12/1991 | Rayner | 369/291 |
| 5,646,807 | 7/1997 | Ohnuki et al. | 360/133 |

FOREIGN PATENT DOCUMENTS

| | | |
|---|---|---|
| 57-210486 | 12/1982 | Japan . |
| 58-193392 | 12/1983 | Japan . |
| 60-87463 | 5/1985 | Japan . |
| 61-192064 | 8/1986 | Japan . |
| 62-40677 | 2/1987 | Japan . |
| 64-56061 | 4/1989 | Japan . |
| 4-78063 | 3/1992 | Japan . |
| 4-105852 | 9/1992 | Japan . |
| 5-6608 | 1/1993 | Japan . |
| 5-28713 | 2/1993 | Japan . |
| 5-266495 | 10/1993 | Japan . |
| 5-342735 | 12/1993 | Japan . |
| 6-139676 | 5/1994 | Japan . |
| 6-150510 | 5/1994 | Japan . |
| 6-168053 | 6/1994 | Japan . |
| 6-52054 | 7/1994 | Japan . |

*Primary Examiner*—William R. Korzuch

[57] ABSTRACT

A recording medium cartridge includes a disk-shaped recording medium and a case housing the recording medium. A window is provided in the case to expose a portion of the recording medium. A shutter is provided on the case to close and expose the window. A latch is movable in a direction perpendicular to the direction of relative movement of the shutter and is linked to the shutter by a band such that movement of the band causes the shutter to selectively close or expose the window. In one embodiment, the recording medium cartridge has a non-zero thickness equal to or less than approximately 2.0 mm.

15 Claims, 75 Drawing Sheets

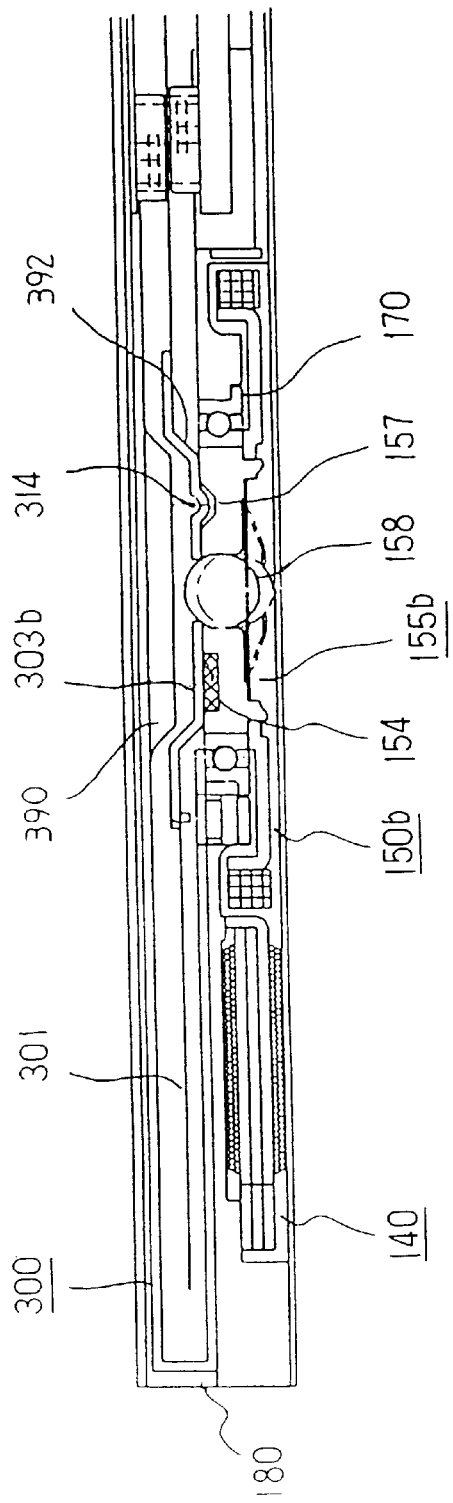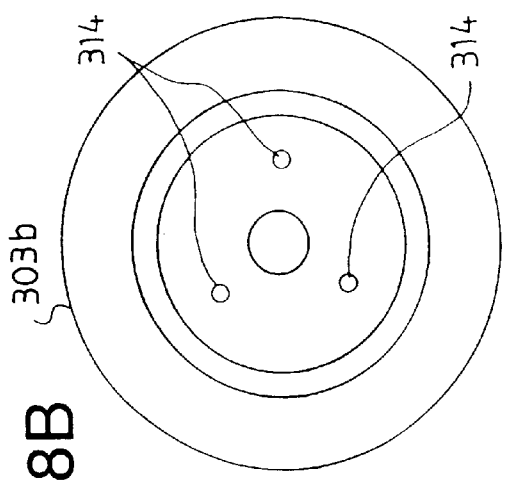

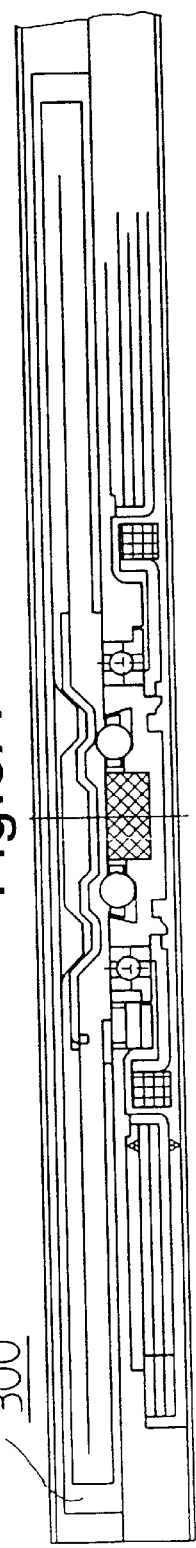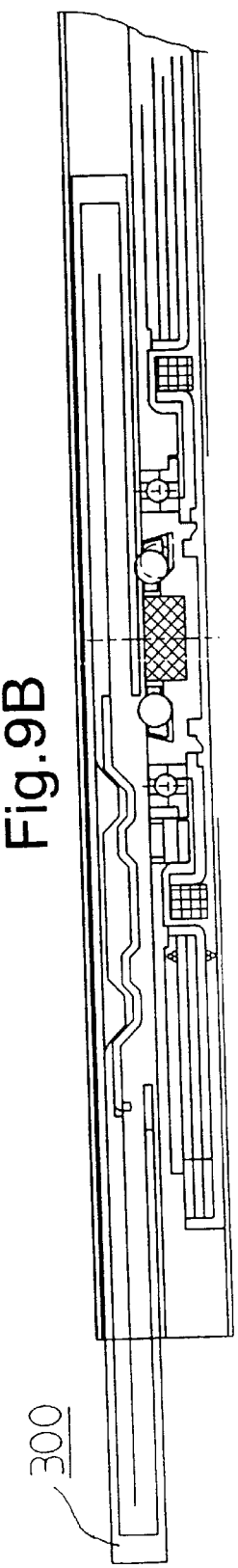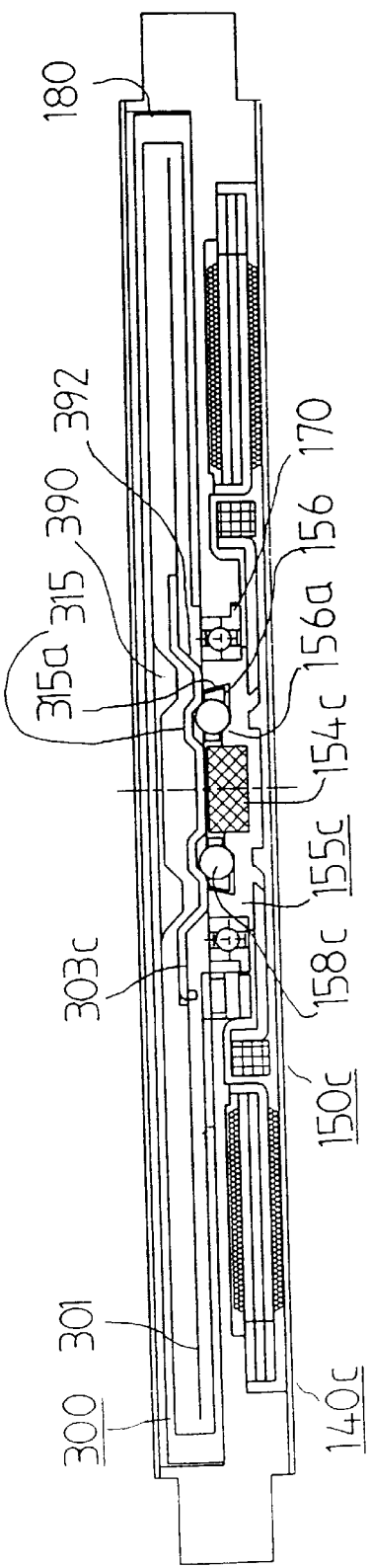

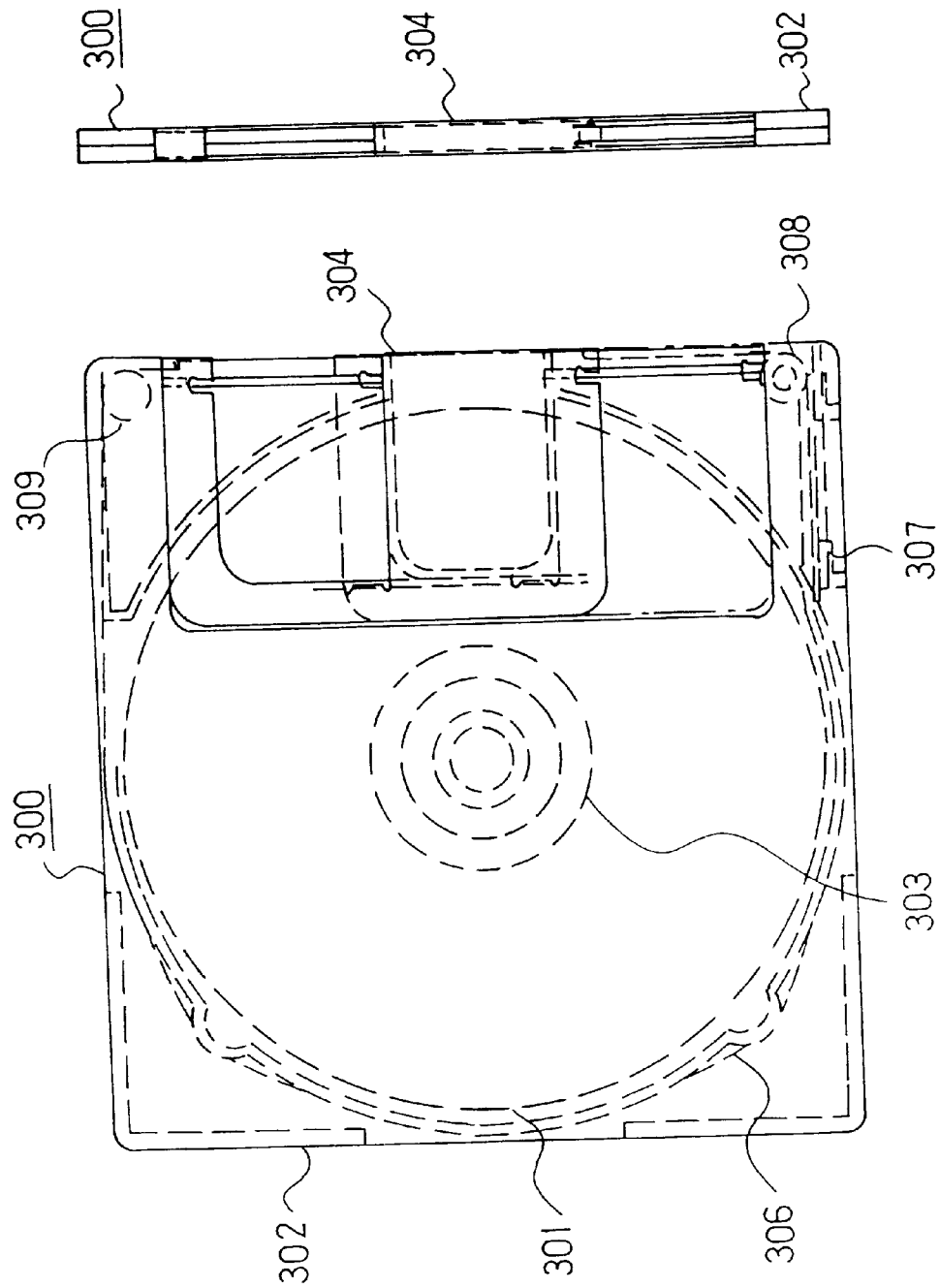

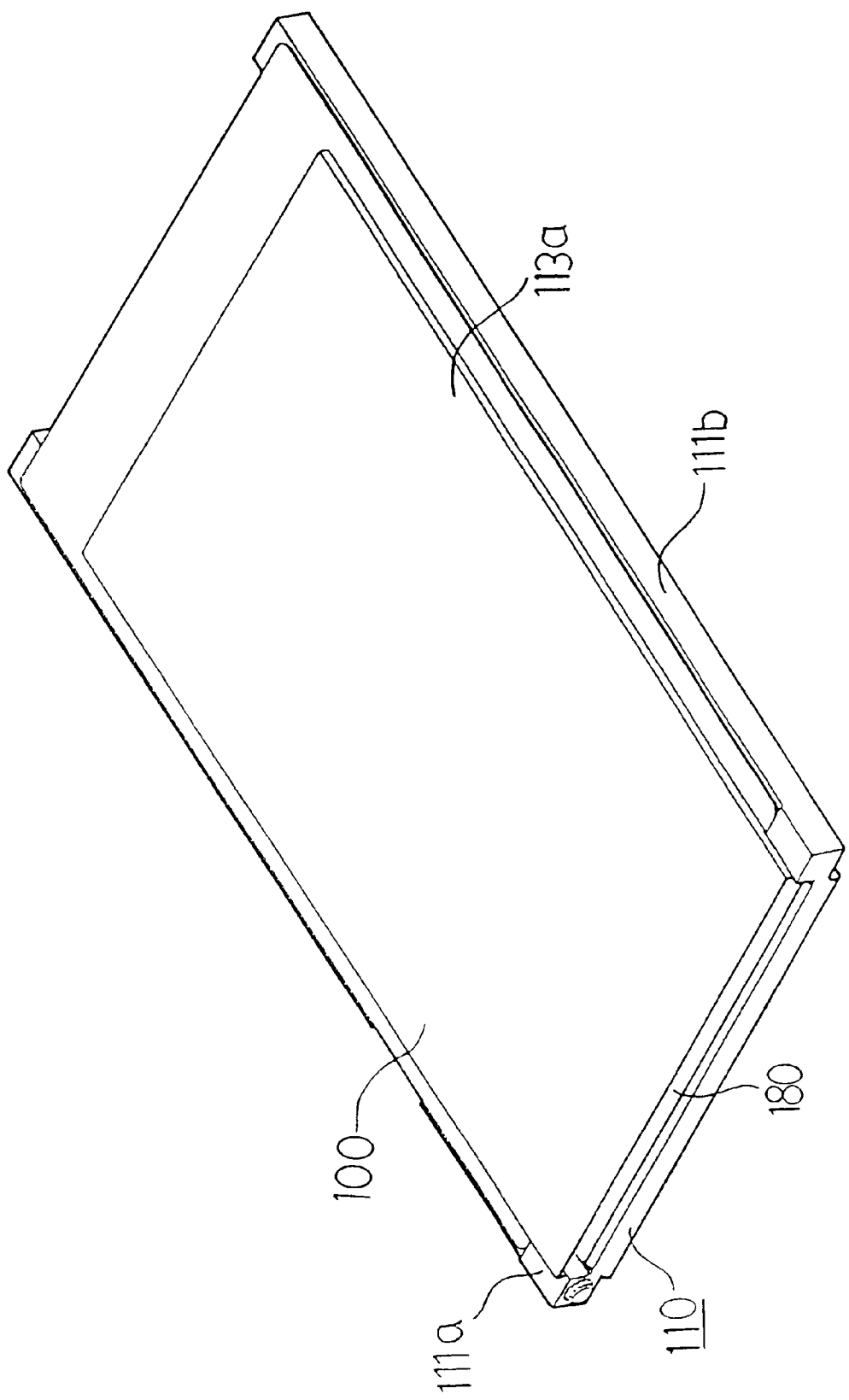

RECORDING MEDIUM WITH A BAND ATTACHED TO BOTH SIDES OF A SHUTTER FOR OPENING/CLOSING THE SHUTTER

This application is a division of application Ser. No. 08/624,306, filed Dec. 26, 1995, entitled EXCHANGEABLE STORAGE APPARATUS, RECORDING MEDIUM DRIVE ACTUATOR, HEAD DRIVE ACTUATOR, AND RECORDING MEDIUM CARTRIDGE and now pending.

BACKGROUND OF THE INVENTION

1. Field of the Invention

This invention relates to an exchangeable storage apparatus with exchangeable recording medium to be used for computers, personal computers, and portable information terminals, and so on. More particularly, this invention relates to a Flexible Disk Drive, a recording medium drive actuator, a head drive actuator, and a recording medium cartridge to be used for the flexible disk drive.

2. Description of the Related Arts

FIG. 80 is part of a cross sectional view showing, for instance, a conventional flexible disk drive (hereinafter referred to as the FDD) disclosed in the Japan Patent Examination Hei 06-119699, of a storage for which a recording medium is exchangeable. Especially, the example given in the figure shows a 3.5-inch FDD wherein a recording medium is housed in a so called recording medium cartridge which is consisting of a hard case with a shutter. Also, FIG. 81 is a cross sectional view of the FDD, and FIG. 82 is a top view of FIG. 81. FIGS. 81 and 82 show the relationship between the recording medium cartridge and a positioning means for positioning the recording medium cartridge.

In the figures, an FDD body 1, a read/write head 2, a carriage 3 supporting read/write head 2, and a head arm 4 are shown. A head drive actuator 5 that drives read/write head 2 by driving carriage 3 is provided with a step motor 6, a lead screw 7, a needle 8, and a guide rod (not shown). This needle 8 is engaged with lead screw 7. A frame 10, a mounting part 11 that mounts an external special slot 80, a guide groove 12, and a cover (shield) 13 are also shown. A circuit board 14, a cartridge holder 15, a cam follower 16, a shutter opener 17 are shown. Cartridge holder 15 gets engaged with cam follower 16 and shutter opener 17, and so on. A slide cam part 20 is made up of a cam groove 21 and an eject button 22 and engaged with an eject lever 23.

A recording medium cartridge 30 is constructed by a recording medium 31 and a cartridge case 32 having an upper shell 32a and a lower shell 32b. Recording medium 31 is supported by a hub 33, and cartridge case 32 is provided with a shutter 34, a window 35, and recording medium 31. The cartridge case 32 has a protect hole 32c so that information would not be erased once it is written. Also in cartridge case 32, a resin slide part material 36 is installed to make write protect when write-protect hole 32c is in open state and to write information in closed state.

A recording medium drive actuator 40 rotates recording medium 31, and composed of a circuit board 14, a stator 41, rotor 42, a drive pin 43, a chucking magnet 44, a housing 45, bearing 46, a stator yoke 47, and a spindle shaft 48. On one part of circumference of rotor 42, an index magnet 39a is attached to detect the position of rotating recording medium 31 as the index signal. An index sensor 39b is installed on circuit board 14 to detect the index signal on the position opposite to index magnet 39a. A disk-in switch 37 to detect that recording medium 31 has been set to read/write position and write protect switch 38 to detect write protect in recording medium 31 are secured as well. For index sensor 39b, normally hole elements and so on are used, and is often mounted on a case (not shown) in which the position of the index sensor can be mechanically adjusted.

For write-protect switch 38, a so-called push switch is often used. When information can be written, switch end 38a of write-protect switch 38 is pushed downward by slide part material 36. Conversely, when data write is inhibited, switch end 38a is in free state and placed higher than when it is pushed down.

Most disk-in switch 37 and write protect switch 38 are of the same shape or uniform shape. When recording medium cartridge 30 is set to read/write position, in the so-called load state, end 37a of disk-in switch 37 is pushed down by lower shell 32b of cartridge case 32 or by slide part material 36 which opens or closes write-protect hole 32c. When recording medium 31 is in read/write disabled state, on the other hand, in the so-called unload state, switch end 37a is lifted up.

The relationship between stator 41 and rotor 42 is the so-called outer rotor type and stator 41 is positioned in the center and rotor 42 is positioned around it. An interface connector 70, an external special slot 80, a mounting screw 81, an external cable 82, an external connector 83 are also shown. Generally, FDD body 1 is secured with mounting screw 81 and so on, for instance, on special slot 80 of a personal computer or an information processing terminal, and so on. Interface connecter 70 is engaged with a connecter 83 connected with a flexible cable 82 from the external part.

Now, operation is explained with figures.

An explanation is given concerning the state transition from the so-called unload state in which data read or write on recording medium 31 is disabled, to the load status in which data read and write is enabled.

When recording medium cartridge 30 is inserted into FDD body 1, it is held by cartridge holder 15 and lifted up by cam groove 21 and cam follower 16 of slide cam part 20. Thus, it is inserted at the height higher than spindle shaft 48 in the center of recording medium drive actuator 40. Next, when the center of recording medium cartridge 30 has come near spindle shaft 48, shutter 34 is opened by shutter opener 17. Further, eject lever 23 is rotated. The latch of slide cam part 20 is released. And cartridge holder 15 is lowered by cam groove 21. At the same time, since head arm 4 having read/write head 2 is pressed on the frame side touching cartridge holder 15, the head arm 4 rotates. When recording medium cartridge 30 is lowered to a certain position, two holes 33a and 33b made in hub 33 which is part of recording medium 31, get engaged with spindle shaft 48 and drive pin 43, thereby positioning of recording medium 31 is performed. The hole 33a that engages with spindle shaft 48 is square, and hole 33b that engages with drive pin 43 is partly extended in the radius direction, eccentricity works in the radius direction shown in the arrow H by the rotation of drive pin 43 to hub 33, thereby eliminating backlash that generates in hole 33a which engages with spindle shaft 48. Also, the hub 33 is made of magnetic material. It is sucked and retained (chucked) by chucking magnet 44. The chucking magnet 44 is a means for transferring recording medium drive force, provided with the recording medium drive actuator 40. After that, carriage 3 holding read/write head 2 is driven by head drive actuator 5. When read/write head 2 is moved to the recording surface of recording medium 31, reading or writing data on recording medium 31 is made possible, thereupon completing load state.

Then, the operation of load state to unload state of recording medium cartridge 30 is explained next.

By pushing eject button 22 down to the predetermined position, cartridge holder 15 lifts up along cam groove 21. On its way upward, when cartridge holder 15 touches and rotates head arm 4, upper and lower read/write head 2 separate from recording medium 31. Together with lifted cartridge holder 15, when recording medium cartridge 30 reaches the position at which it can jump over spindle shaft 48, shutter 34 gets disengaged from shutter opener 17. As shutter 34 is closed, cartridge holder 15 is ejected by shutter opener 17. Cartridge holder 15 is kept from lowering by slide cam part 20 and the latch of eject lever 23. As head arm 4 maintains the open state of both read/write heads 2, unload state has made complete.

FIG. 83 is a cross sectional view showing inside of a conventional head drive actuator 5 of FIG. 80. A step motor 6 in the figure is referred to as the so-called claw-pole type motor. It is constructed with a radially magnetized cylindrical rotor 61, and a claw-pole stator 65 is positioned on the outer circumference of this cylindrical rotor 61, and circular stator coil 66 is wound around further on the outer circumference. To output torque necessary to drive carriage 3 with step motor 6 in such construction, the thickness of step motor 6 must be about 10.0 mm.

FIG. 84 shows another example of related art. It shows exchangeable storage like IC memory card and so on, disclosed in, for instance, Japan Patent Examination HEI 5-181565.

In the figure, an IC memory card 1a, a magnetic disk storage 1b, a slot guide 11b, an interface connector 70a of IC memory card 1a, an interface connector 70b of magnetic disk storage 1b, an IC memory card slot 80a, and a portable information terminal 85a for a personal computer and so on, are shown. Generally, this type of IC memory cards is also called the PC card, and its standard is set by the Personal Computer Memory Card Association (PCMCIA), an organization for extended IC card standardization in the United States. The width of the card by the PCMCIA is uniformly 54.0 mm. For thickness, there are the following sizes:

Type-1: 3.3 mm thick
Type-2: 5.0 mm thick
Type-3: 10.5 mm thick

IC memory card 1a is currently used for general purpose for portable information terminal 85a. For interface connector 70a, the standard corresponding to the type-2 with thickness 5.0 mm is used. Problems to be Solved by the Invention Recently, as the exchangeable storage to be used for portable information terminal 85a, IC memory card 1a is often used as it is compact and convenient to carry with. However, IC memory card 1a has the following problems.

(1) The recording medium in the IC memory card is the IC memory. Because the IC memory itself cannot be replaced, the IC memory card itself must be replaced.

(2) Because the IC memory is expensive at present, the price of IC memory card is also high.

(3) Due to the reasons stated above (1) and (2), using an IC memory card for the replacement of a recording medium results in high cost.

Because of this, there is a movement toward using FDDs, with its low-priced recording medium cartridge 30 and easy replacement of the recording medium, instead of the IC memory cards by making FDDs smaller and thinner.

However, FDDs must be matched to the type-2 standard size (5.0 mm in thickness and 54.0 mm in width) of the PCMCIA standard, and be manufactured according to the size of the slots to which IC memory card 1a of the PCMCIA type-2 standard is to be inserted. The following problems must be tackled.

(1) When inserting recording medium cartridge 30 into the FDD, shutter 34 is opened in the direction of Y by shutter opener 17 as the cartridge 30 is inserted in the direction of arrow X as shown in FIG. 82. At this time, a head arm 4 must move up and down significantly because read/write head 2 jumps over the part shown as S in the figure. It is therefore difficult to make FDDs thinner, as the device thickness of FDD must at least include recording medium cartridge 30, read/write head 2, head arm 4, and carriage 3.

(2) Due to the chucking mechanism of recording medium (disk) 31, in which hub 33 engages with spindle shaft 48 and drive pin 43, recording medium cartridge 30 must be moved up and down more than the engagement length of hub 33 and spindle shaft 48 or drive pin 43 for loading and unloading recording medium cartridge 30. This thickness enabling this perpendicular movement must be secured in FDD. Because total thickness of spindle shaft 48 and recording medium cartridge 30 must at least be secured, the thinning of FDD is difficult.

(3) In order to thin the FDD under the current structure of head drive actuator 5, the turns of stator coil 66 should be reduced. However, it is difficult to obtain torque necessary for driving carriage 3.

(4) In order to thin the FDD under the current structure of recording medium drive actuator 40, the turns of stator 41 should be reduced. However, it is difficult to obtain torque necessary for driving recording medium 31.

(5) It was difficult to thin conventional FDDs and recording medium cartridges because the height as the storage and the height as the recording medium cartridge were required so that ends 37a and 38a of disk-in switch 37 and write-protect switch 38 can move up and down.

(6) In addition, because index sensor 39b is made of hole elements, a certain area was required. Rotor 42 must have an area on which to mount opposing index magnet 39a, making the device compact difficult. And index sensor 39b that detect the mechanical position of recording medium 31 must be assembled and adjusted so that the position of recording magnet 31 and the positions of index magnet 39a and index sensor 39b agree when recording medium 31 is mounted on rotor 42 by chucking magnet 44, and so on.

Accordingly, it is a primary object of this invention to overcome problems associated with making the FDD for which recording media can be exchanged smaller and thinner, and to achieve the FDD by which the IC memory card can be substituted. Furthermore, it is another object of this invention to achieve the recording medium drive actuator, head drive actuator, and recording medium cartridge to be used for the thinned FDD.

SUMMARY OF THE INVENTION

According to one aspect of this invention,
An exchangeable storage apparatus comprising:
  a cabinet to be inserted into and retained by a card slot provided for an information processing apparatus;
  an inserting and ejecting means for freely inserting or ejecting a recording medium cartridge containing a recording medium into or from the cabinet;
  a head built in the cabinet for making an access to the recording medium;
  a head drive actuator built in the cabinet for moving the head and determining a position of the head;

a recording medium drive actuator built in the cabinet for driving the recording medium;

a positioning means built in the cabinet for positioning the recording medium being inserted to the predetermined position;

a driving force transfer means built in the cabinet for transferring a driving force of the recording medium drive actuator to the recording medium; and an information transmission means provided for the cabinet for transmitting information between the information processor and the recording medium.

According to another aspect of this invention,

An exchangeable storage apparatus comprising:

a head which reads and writes data on the recording medium having a driven part for rotation and storing information;

a head drive actuator that moves the head and determines a position of the head;

a recording medium drive actuator that drives the recording medium;

a driving force transfer means for transferring the driving force of the recording medium drive actuator to the driven part of the recording medium;

a positioning means for positioning the recording medium to a predetermined position; and a head unload means for unloading the head toward the direction of the recording medium drive actuator while the recording medium is not being inserted.

According to another aspect of this invention,

An exchangeable storage apparatus comprising:

a head which reads and writes data on the rotating recording medium having a driven part for rotation and storing information;

a head drive actuator which moves the head and determines a position of the head;

a positioning means for positioning the recording medium being inserted to a predetermined position;

a recording medium drive actuator having a stator formed by installing a block inside a stator core, wherein the block is made up of a plurality of center cores equivalent to the number of drive phases and by inserting a cylindrical coil bobbin wound with a coil into the center core, and a rotor provided inside the stator and drives the recording medium; and a driving force transfer means for transferring the driving force of the recording medium drive actuator to the driven part of the recording medium.

According to another aspect of this invention,

An exchangeable storage apparatus comprising:

a head that reads and writes data on a recording medium having a driven part for rotation and storing information;

a recording medium drive actuator that drives the recording medium;

a positioning means for positioning the recording medium being inserted to a predetermined position;

a driving force transfer means for transferring a driving force of the recording medium drive actuator to the driven part of the recording medium; and a head drive actuator including a rotor having a cylindrical rotation part and giving the driving force to the head, and a stator installed at opposite sides of an outer circumference of the cylindrical rotation part of the rotor and having a coil wound cylindrically along an elongated direction of the rotor.

According to another aspect of this invention,

An exchangeable storage apparatus comprising:

a head that reads and writes data on a recording medium having a driven part and storing information, and wherein an unload amount of the head when the recording medium is inserted and ejected is within a thickness of a recording medium cartridge holding the recording medium;

a head drive actuator which moves the head and determines a position of the head;

a recording medium drive actuator which drives the recording medium;

a positioning means for positioning the recording medium being inserted to a predetermined position; and a driving force transfer means for transferring a driving force of the recording medium drive actuator to the driven part of the recording medium.

According to another aspect of this invention,

An exchangeable storage apparatus comprising:

a head that reads and writes data on a recording medium having a positioning part for positioning and having a driven part for rotation and storing information, and wherein an unload amount of the head when the recording medium is inserted and removed is within a thickness of a recording medium cartridge holding the recording medium;

a head drive actuator including a rotor having a cylindrical rotation part and giving the driving force to the head, and a stator installed at opposite sides of an outer circumference of the cylindrical rotation part of the rotor and having a coil wound cylindrically along the elongated direction of the rotor;

a recording medium drive actuator including a stator having a stator core and a block inside the stator core, the block having a plurality of center cores equivalent to the number of drive phases, and a cylindrical coil bobbin wound with a coil inserted into the center core, and a rotor installed inside the stator to drive the recording medium;

a head unload means for unloading the head toward the direction of the recording medium drive actuator while the recording medium is not being inserted;

a positioning means which is retractably projected to the recording medium being inserted for positioning the recording medium to a predetermined position by engaging with the positioning part of the recording medium; and a driving force transfer means for transferring a driving force of the recording medium drive actuator to the driven part of the recording medium.

According to another aspect of this invention,

An exchangeable storage apparatus comprising:

a head that reads and writes data on a recording medium having a positioning part for positioning and having a driven part for rotation and storing information;

a head drive actuator that moves the head and determines the position of the head;

a recording medium drive actuator to drive the recording medium;

a driving force transfer means for transferring a driving force of the recording medium drive actuator to the driven part of the recording medium;

a first frame that supports the head drive actuator and the recording medium drive actuator;

a retaining means for holding the recording medium inserted from outside;

a second frame that supports the retaining means;

a frame rotation part which supports an end of the first frame and an end of the second frame for free rotation and makes the second frame further rotate so as to open the second frame against the first frame;

a head unload means for unloading the head toward the opening direction of the second frame opened against the first frame with the frame rotation part; and a positioning means provided for the first frame for positioning the recording medium inserted to the retaining means to a predetermined position by engaging with the positioning part of the recording medium when the first frame and the second frame are closed.

According to another aspect of this invention,

A recording medium drive actuator comprising: a stator having a stator core and a block inside the stator core, the block having a plurality of center cores equivalent to the number of driving phases and a cylindrical coil bobbin wound with a coil inserted into the center core;, and a rotor installed inside the stator to drive the recording medium.

According to another aspect of this invention,

A head drive actuator comprising:

a rotor having a cylindrical rotation part and that giving a driving force to a head; and a stator installed at opposite sides to an outer circumference of the cylindrical rotation part of the rotor and cylindrically wound with a coil in the elongated direction of the rotor.

According to another aspect of this invention,

A recording medium cartridge comprising:

a disk-shaped recording medium;

a case housing the recording medium;

a window for exposing a part of the recording medium from the case;

a shutter provided for the case for closing and exposing the window;

a latch movable in the direction perpendicular to the closing and opening direction of the shutter; and a band that links the shutter with the latch.

According to another aspect of this invention,

A recording medium cartridge comprising:

a lower shell and an upper shell;

two conductive metal plates exposed on the surface of one of the lower shell and the upper shell; and the slide member for switching connection of two conductive metal plates.

According to another aspect of this invention,

A recording medium cartridge comprising:

a disk recording medium;

a case for storing the recording medium;

means for detecting a fixed position of the recording medium in one rotation, the means for detecting a fixed position being provided in the case.

According to another aspect of this invention,

A recording medium cartridge comprising:

a disk recording medium;

a lower shell and an upper shell for storing the recording medium; and a notch formed at part of the circumference of the recording medium.

According to another aspect of this invention,

A method for using a card type recording medium slot of an information processor comprising steps of:

(a) mounting a storage apparatus, which is able to exchange a recording medium, on the card type recording medium slot under a condition that the storage apparatus can be easily dismount;

(b) inserting the recording medium and setting the position to the storage apparatus;

(c) accessing the recording medium, whose position is set, using a card recording medium interface mounted on the card type recording medium slot.

Other objects features, and advantages of the invention will be apparent from the following description when taken in conjunction with the accompanying drawings.

BRIEF DESCRIPTION OF THE DRAWINGS

The invention will be further described by way of non-limitative example with reference to the accompanying drawings, in which:

FIGS. 8A, 8B, and 8C are cross sectional views showing the FDD in accordance with Embodiment 3 of this invention;

FIGS. 9A, 9B, and 9C are a cross sectional view of the FDD, and top views of the hub and spindle part in accordance with Embodiment 4 of this invention;

FIGS. 37A and 37B show the top view and side view of the recording medium cartridge when the shutter is closed according to Embodiment 15 of this invention;

FIG. 39 shows an FDD according to embodiment 16 of this invention;

DESCRIPTION OF THE PREFERRED EMBODIMENTS

Embodiment 1.

Hereinafter, an embodiment of this invention is explained with reference to figures.

Figure 1:
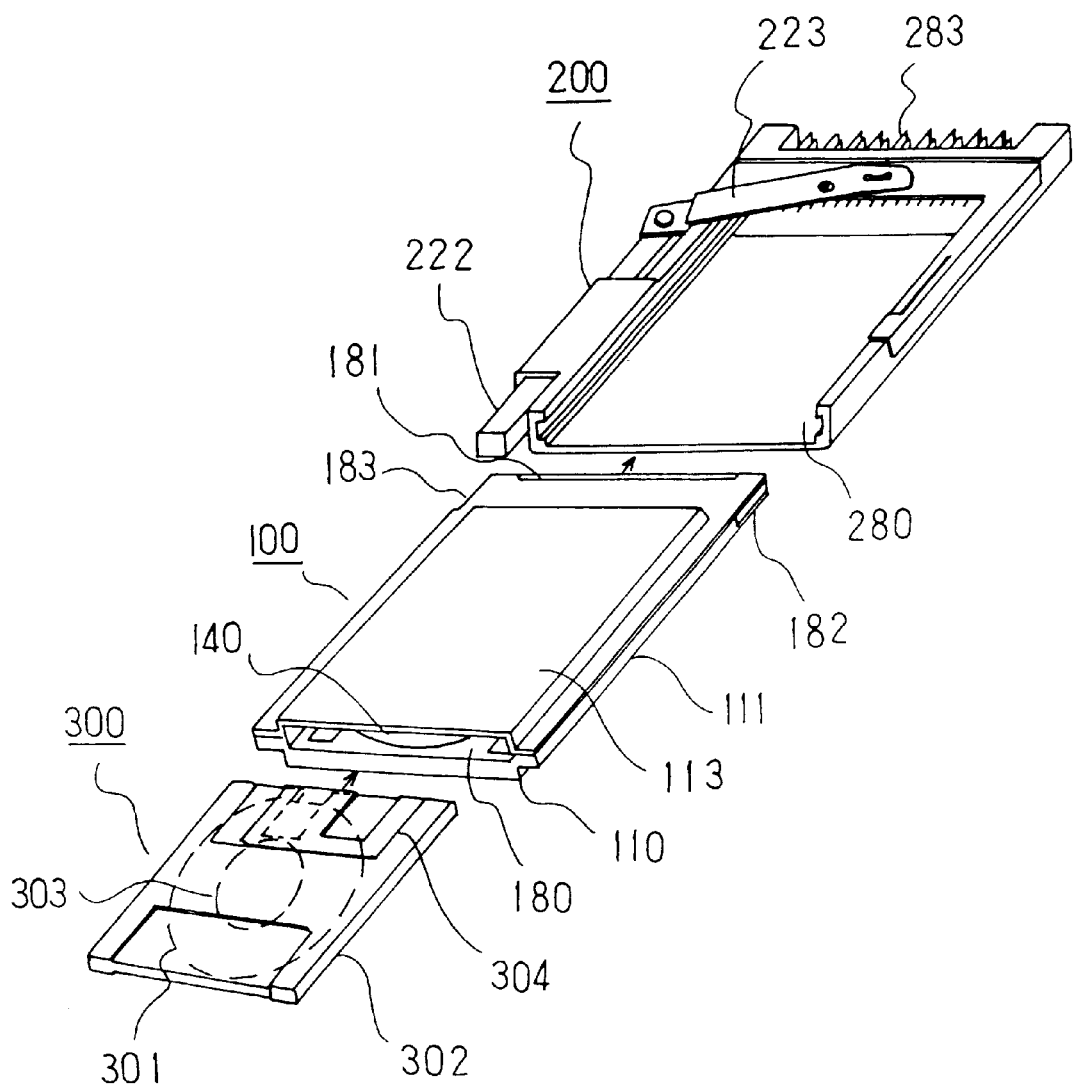
FIG. 1 shows the whole configuration of the FDD, the recording medium cartridge to be inserted into the FDD, and a slot installed on portable information terminal, and so on, to insert the FDD, in accordance with Embodiment 1 of the present invention.
Figure 2:
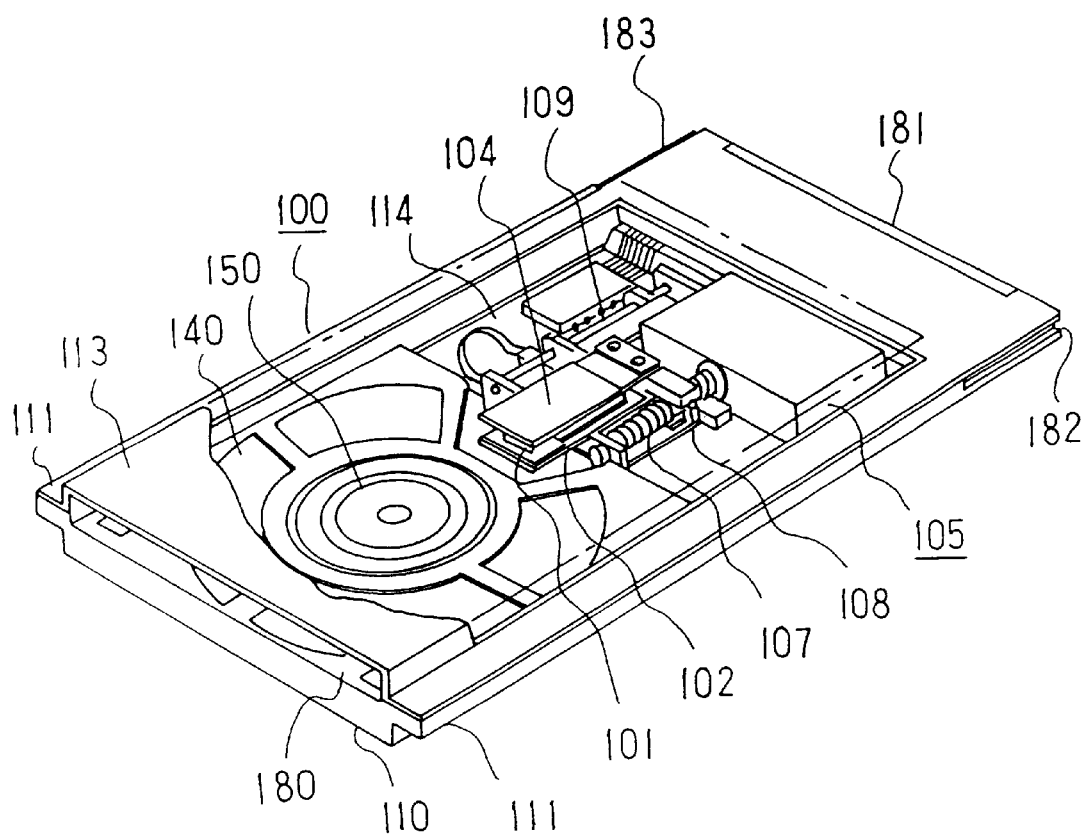
FIG. 2 is a cross sectional view showing part of the FDD according to Embodiment 1 of the present invention.
Figure 3:
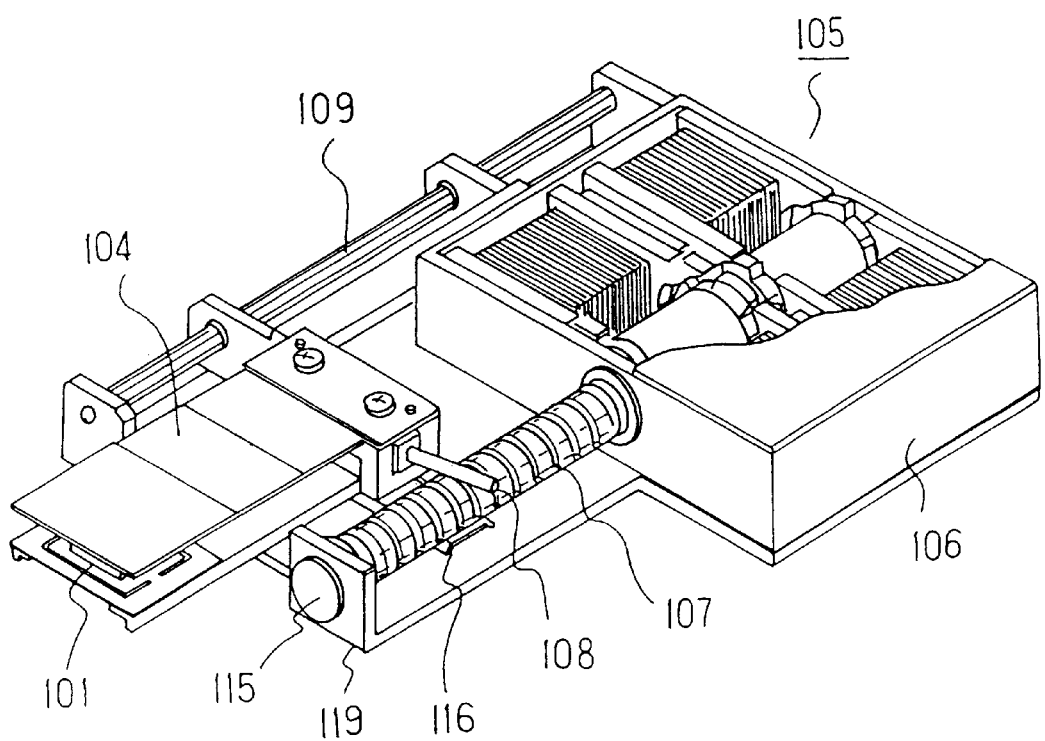
FIG. 3 is a cross sectional view showing part of the head drive actuator for determining the moving position of the head according to Embodiment 1 of this invention.

FIG. 1 shows the whole configuration of an FDD in accordance with Embodiment 1, a recording medium cartridge to be inserted into the FDD, and a slot with which to install the FDD to, for instance, a portable information terminal, and so on. FIG. 2 is a cross sectional view showing part of the FDD. FIG. 3 shows the inside configuration of a head drive actuator to be mounted on the FDD.

Figure 4A:
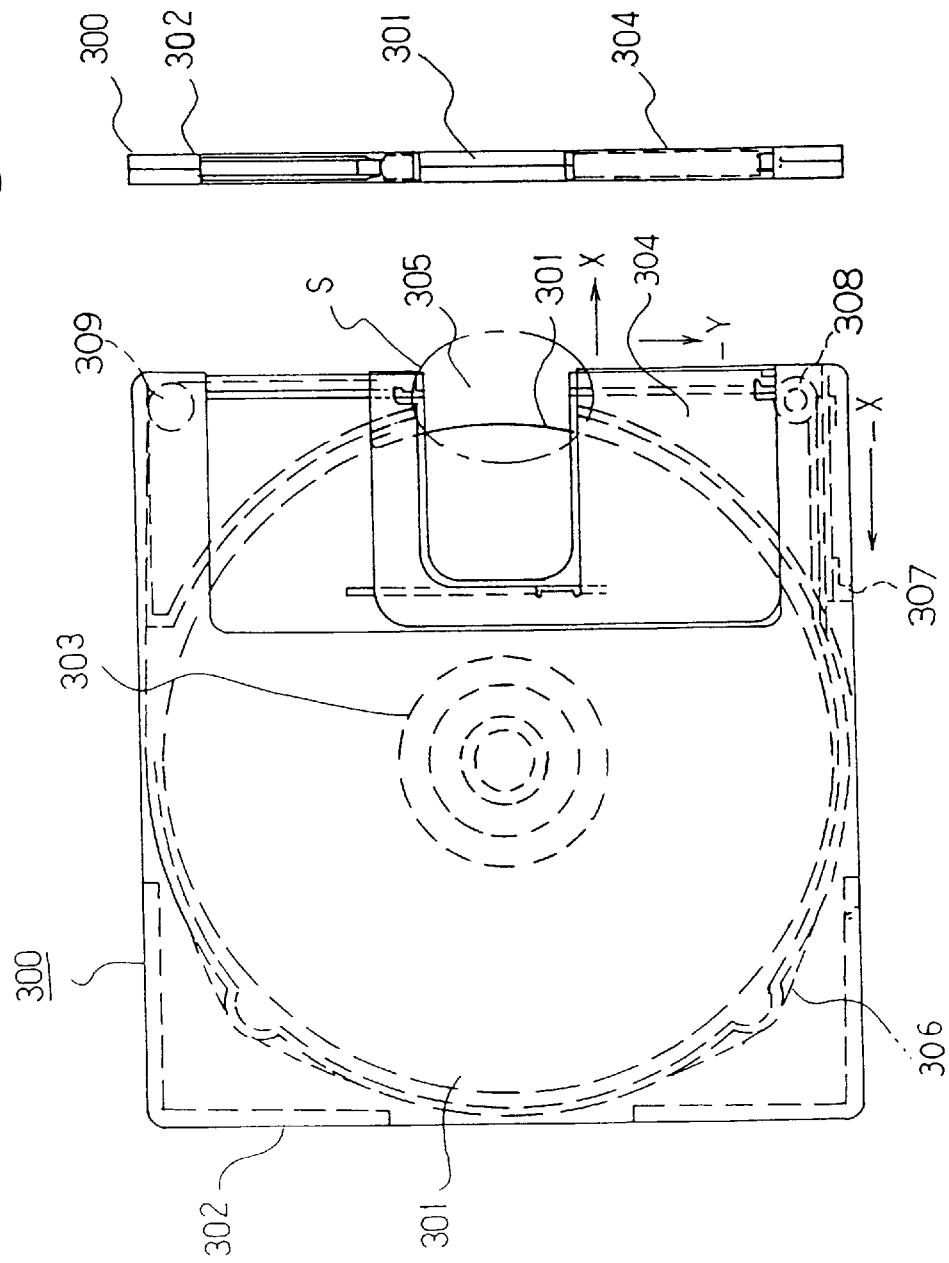
FIG. 4A and FIG. 4B give a top view and a side view of the recording medium cartridge according to Embodiment 1 of this invention.
Figure 4B:
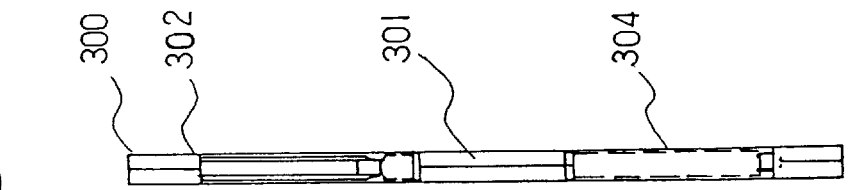
Figure 5:
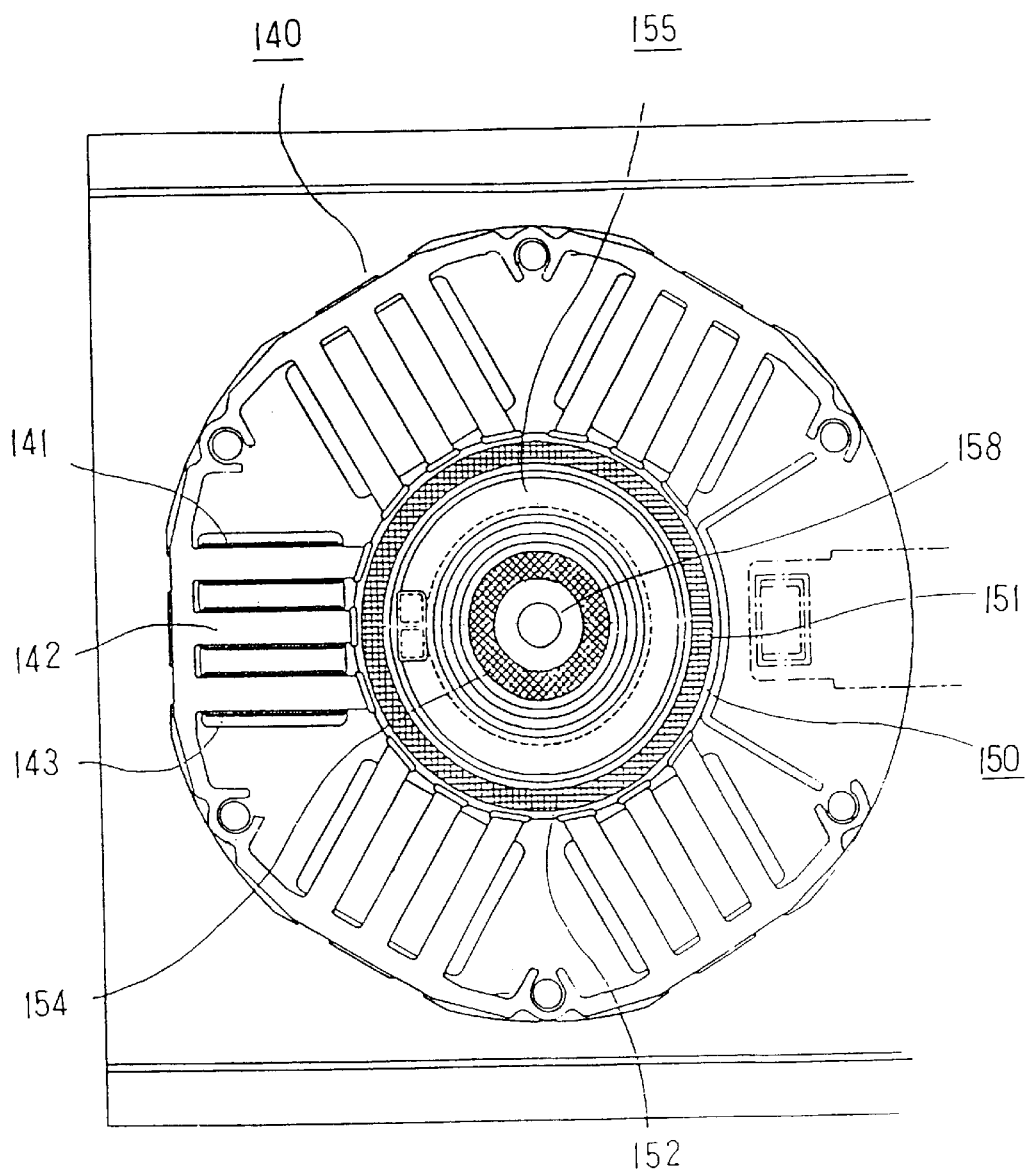
FIG. 5 is a plain cross sectional view showing the recording medium drive actuator according to Embodiment 1 of this invention.
Figure 6:
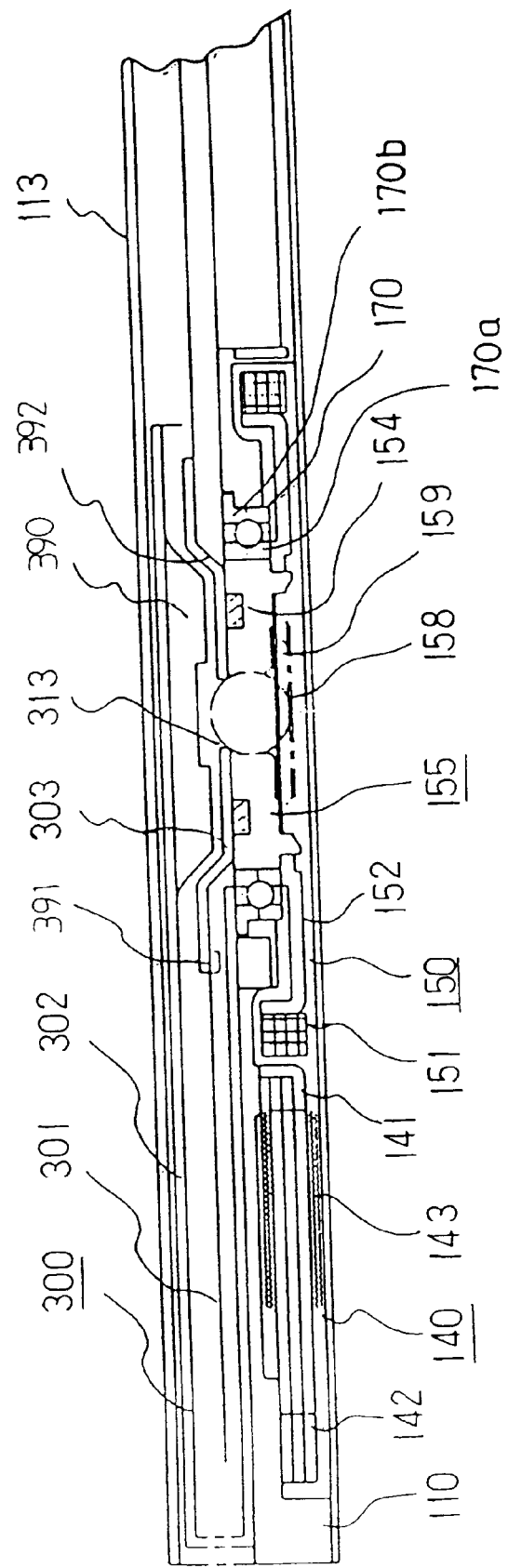
FIG. 6 is a cross sectional view showing the FDD in accordance with Embodiment 1 of this invention.

FIGS. 4A and 4B show the top view and side view of a recording medium cartridge to be inserted into the FDD. FIG. 5 is the top view showing a recording medium drive actuator that drives a recording medium inside the FDD. FIG. 6 is a cross sectional view showing one side of the FDD in a load status with a recording medium cartridge being inserted in the FDD.

In the figures, an FDD unit 100, a read/write head 101, a carriage 102, and a head arm 104 are shown. A head drive actuator 105 determines the moving position of read/write head 101, and is made up of a step motor 106, a lead screw 107, a needle 108, and a guide rod 109. Needle 108 is engaged with lead screw 107. A frame 110, a slot guide 111, a cover shield 113, and a circuit board 114 are also shown.

A recording medium drive actuator 140 is made up of a stator 141, a teeth 142, a coil 143, and a rotor 150. Rotor 150 is made up of a rotor magnet 151, a rotor yoke 152, a chucking magnet 154 which is a driving force transfer means, and a spindle part 155, a recording medium positioning means. In the center of spindle part 155, a centering ball 158, and a ball preload spring 159 which is pressure means are arranged. Bearing 170, the bearing part, is secured by frame 110 on its secured side cartridge, and its rotating side is supported by rotor yoke 152. Accordingly, spindle part 155 is supported so as to freely rotate. Spindle part 155 is connected with rotor yoke 152, for example, by means of a caulk. Further, an insertion and ejection port 180 of recording medium cartridge 300, an interface connector 181 complying with standard type-2 of the PCMCIA, and reversed-insertion preventive grooves 182 and 183 are shown.

A slot 200 is general standard type-2 of the PCMCIA, which is provided by, for instance, a portable information terminal, and so on. An eject button 222 of FDD unit 100, an eject lever 223, an insertion port 280, and a connector 283 are shown.

A recording medium cartridge 300, a recording medium 301, a cartridge case 302, a hub 303, a shutter 304, a window 305, an opener band 306, an opener latch 307, and guide rollers 308 and 309 are shown. Although not included in the figure, tension is applied to at least part of opener band 306 to prevent slack in opener band 306. For instance, opener band 306 is structured as to be pressed toward the outer circumference of cartridge case 302. Also, both ends of opener band 306 are fixed to shutter 304. Opener band 306 is bonded with opener latch 307 in its halfway. In FIG. 6, a sensor pad 390, an index mark 391, and a taper part 392 attached to hub 303 are shown as well.

Figure 83:
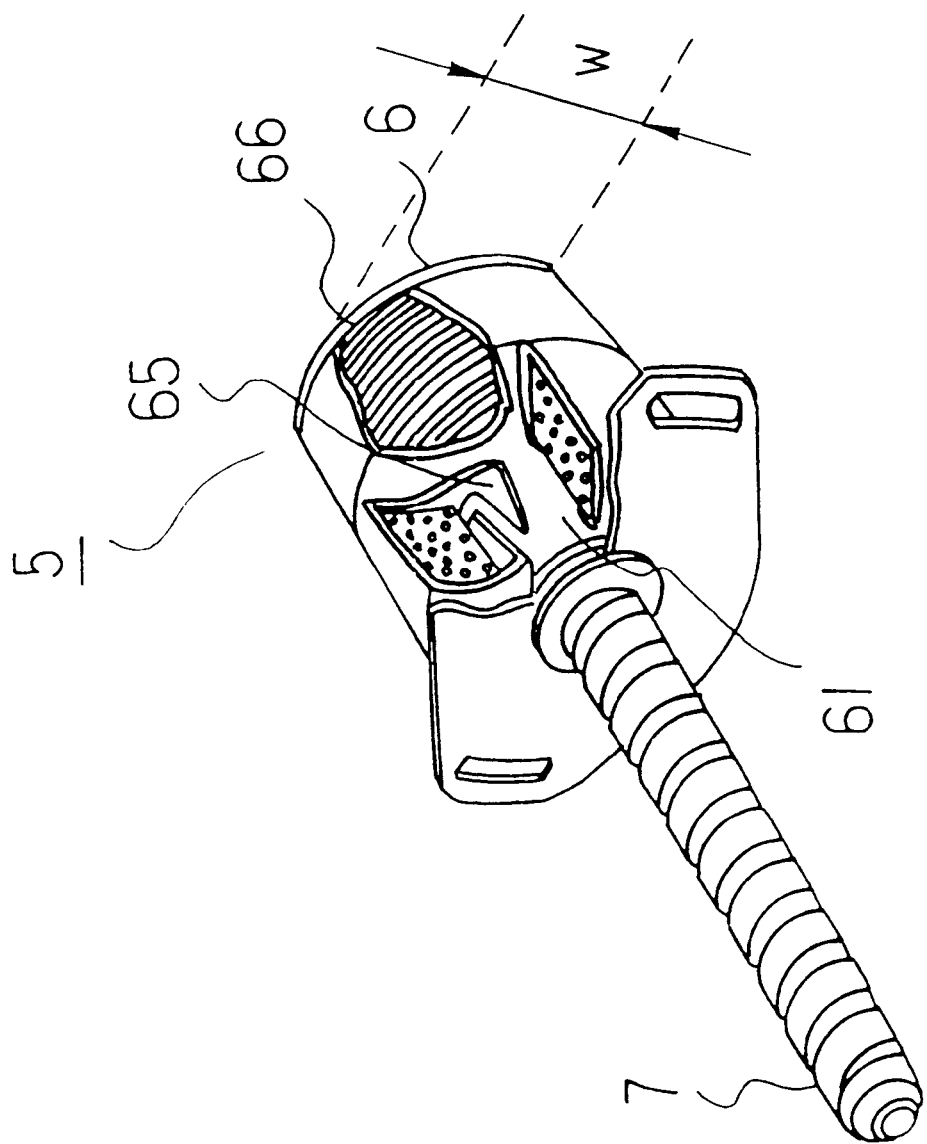
FIG. 83 is a slanted cross sectional view showing part of the conventional head drive actuator; and, FIG. 84 shows the construction of the conventional IC memory card and personal computer.
Figure 84:
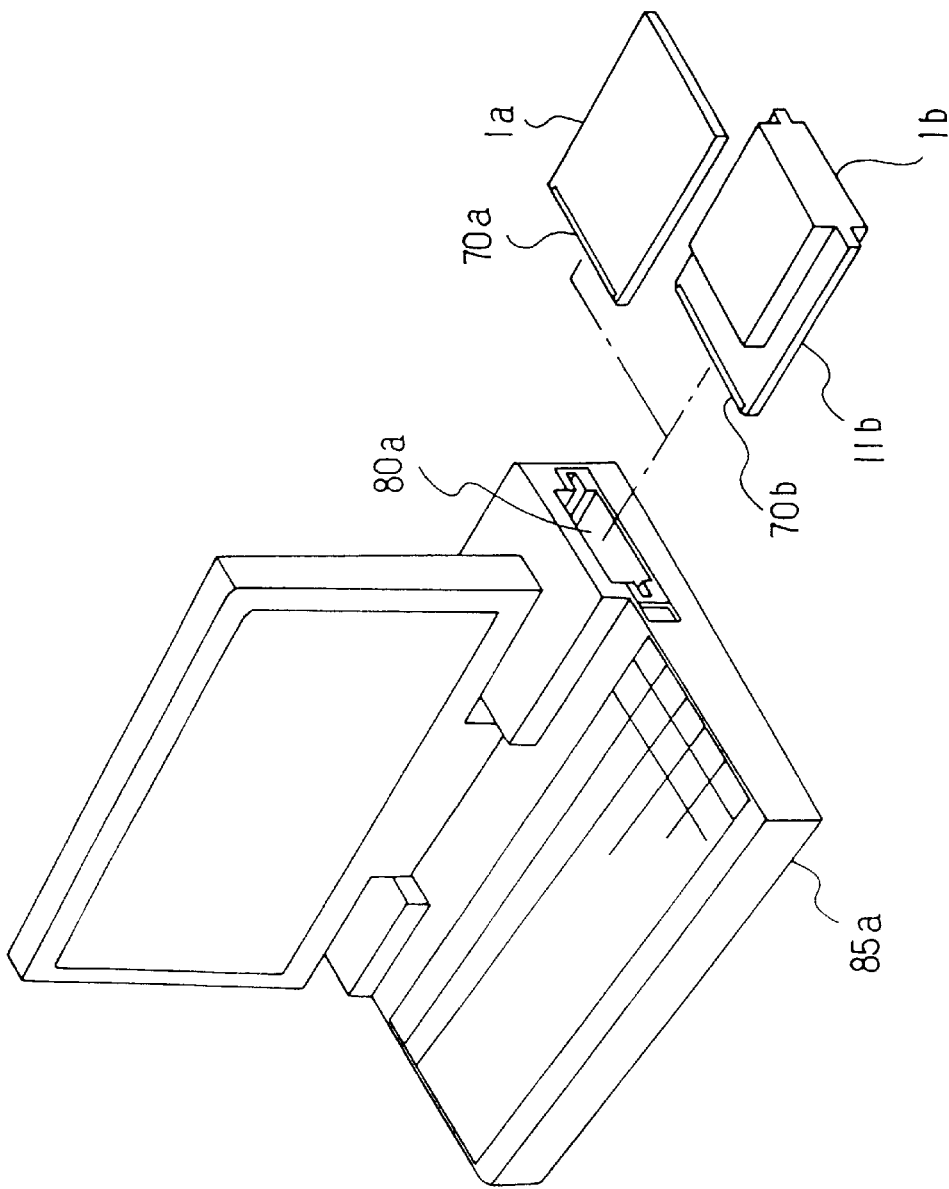

Here, it can be seen that the structure of step motor 106 of head drive actuator 105 of FIG. 3 is made thinner than the conventional structure shown in FIG. 83, by placing the coils on both sides of the rotor.

Figure 81:
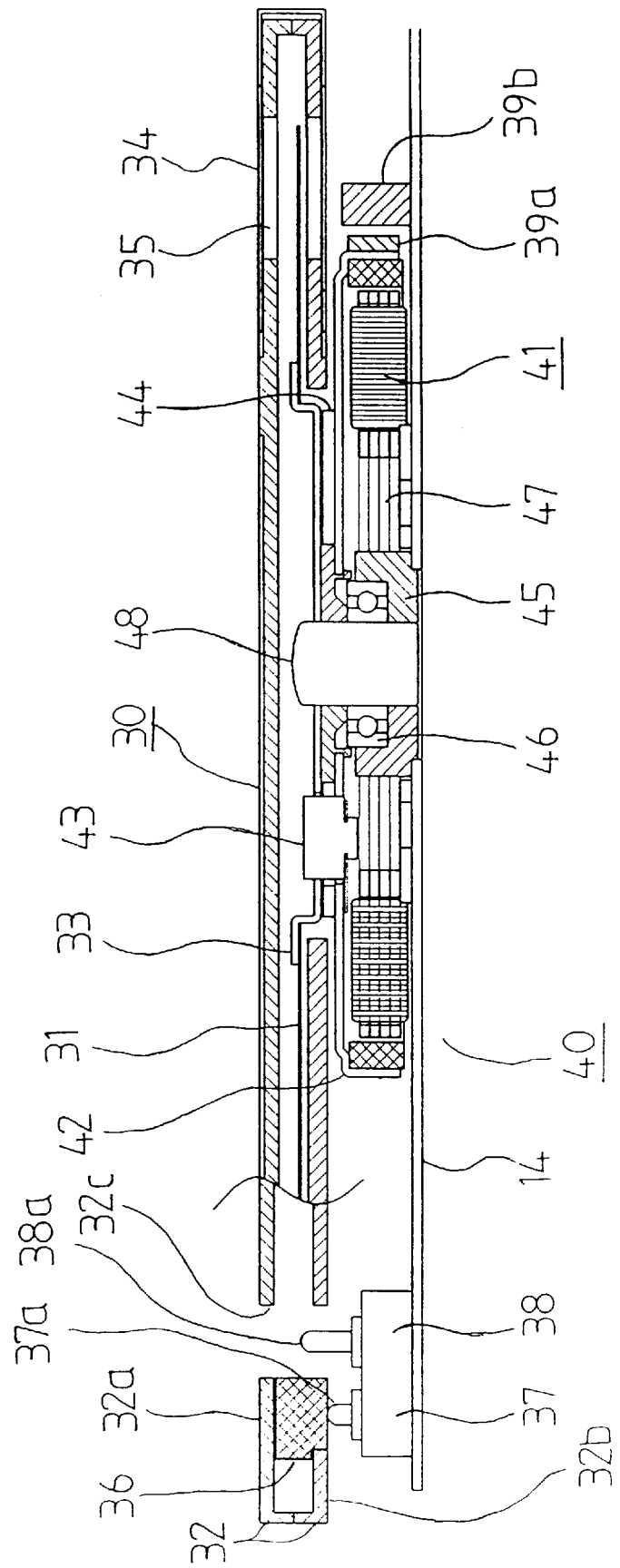
FIG. 81 is a cross sectional view showing the conventional FDD.
Figure 82:
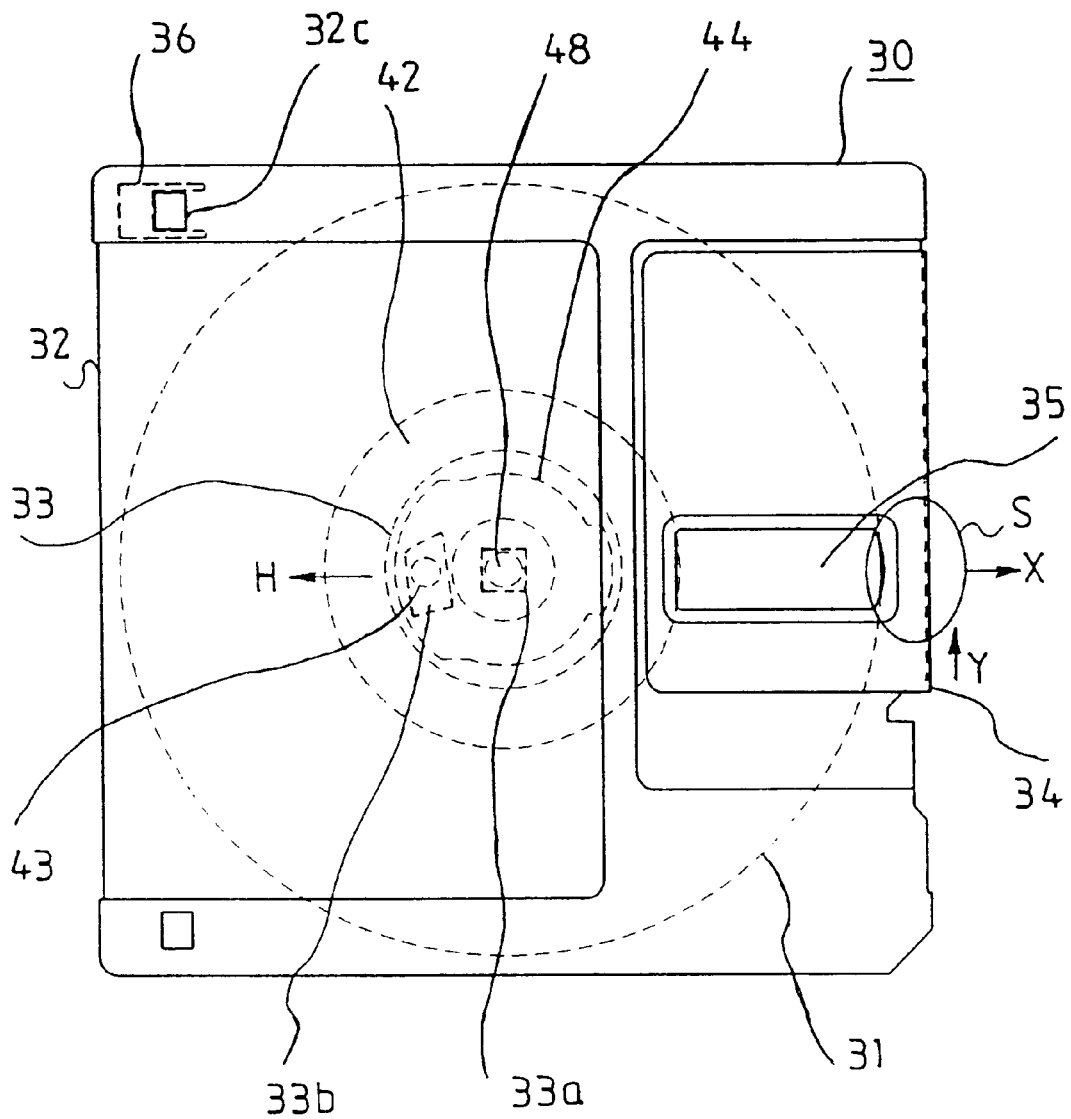
FIG. 82 gives a top view of the conventional recording medium cartridge.

The structure of recording medium drive actuator 140 of FIG. 5 is a so-called inner rotor type for which rotor 150 is placed inside stator 141 as opposed to the conventional outer rotor type illustrated in FIG. 81. Further, as is explained later, at least multiple blocks, one block being the polarity having the number of coils equivalent to the number of phases of drive current, are arranged for stator 141. The turns per coil is reduced and the thinning of recording medium drive actuator 140 is attempted by this structure.

An operation explanation is given for a transitional state from which FDD unit 100 is not possible to read or write on recording medium 301, the so-called unload state into the load state in which read and write is made possible.

For FDD unit 100 of this embodiment, a cover shield 113 is secured to frame 110 which is combined with interface connector 181. Recording medium cartridge 300 is inserted from insertion and ejection port 180. That is, when this recording medium cartridge 300 is inserted into FDD unit 100, recording medium cartridge 300 is inserted as being held at the uniform height toward the insertion direction from insertion and ejection port 180.

As recording medium cartridge 300 is inserted, the end of this recording medium cartridge 300 touches centering ball 158 which is retractably located in the center of spindle part 155. Then, recording medium cartridge 300 pushes down centering ball 158 pressed in the direction of recording medium cartridge 300 by ball preload spring 159, thereby enabling recording medium cartridge 300 to get further inserted. When centering ball 158 passes over shutter 304, and before the end of recording medium cartridge 300 reaches the head, the opener lever (not shown) installed on the side wall of insertion and ejection port 180 and opener latch 307 get engaged with so as to slide shutter 304 and to open window 305 to which read/write head 101 makes an access to exposed recording medium 301. The operation of recording medium cartridge 300 at this time is explained in detail. The exposed states of recording medium 301 are shown in FIG. 4A and FIG. 4B. As shown in FIG. 4A, as recording medium cartridge 300 is getting inserted in the direction X, opener latch 307 moves in the direction of –X by the opener lever (not shown) installed inside the wall of insertion and ejection port 180 of FDD unit 100. As shutter 304 engaged with opener latch 307 by opener band 306 is pulled to the direction of –Y, window 305 is opened and recording medium 301 is exposed. At this time, any parts or any materials for cartridge case 302 and shutter 304 do not exist in area S shown in the figure. The unload operation of read/write head 101 is saved, thereby making the thickness necessary for FDD unit 100. The thickness of the FDD unit 100 can be total thickness of read/write head 101, carriage 102, head arm 104, and recording medium 301. Namely, with respect to the conventional recording medium cartridge, read/write head 101 had to avoid the amount for jumping over the cartridge case or shutter. In this embodiment, however, the avoidance amount is required only for jumping over recording medium 301.

When this recording medium cartridge 300 is further inserted, at the position where recording medium cartridge 300 has been completely inserted, e.g., hole 313 of hub 303 comes close to centering ball 158, this centering ball 158 gets pushed up by ball preload spring 159. Recording medium 301 is centered and positioned when ball preload spring 159 is engaged with hole 313. Because the hub 303 is made of magnetic material, the hub 303 is sucked and retained (chucked) by chucking magnet 154 which is a recording medium drive force transfer means. Accordingly, the load state is completed.

In this way, FDD unit 100 thinner than the conventional type is achieved by configuring head drive actuator 105, recording medium drive actuator 140, and recording medium cartridge 300 as explained above. Therefore, FDD unit 100 less than 5.0 mm, the thickness by which insertion into slot 200 is permitted for the standard type-2 of the PCMCIA can be obtained. To obtain FDD unit 100 of thickness 5.0 mm or less, it is desirable that the thickness of recording medium drive actuator 140 be made less than about 2.5 mm and the thickness of recording medium cartridge less than about 2.0 mm. Further, to make the width of FDD unit 100 less than 54. 0 mm, it is desirable that the width of recording medium cartridge 300 be made less than 48.0 mm and the diameter of recording medium 301 be less than 1.8 inch.

Embodiment 2.

In embodiment 1, an example of chucking magnet 154 fixedly secured to spindle part 155 is shown. In this embodiment, an example of chucking magnet 154 that is freely movable within the predetermined distance is indicated.

Figure 7:
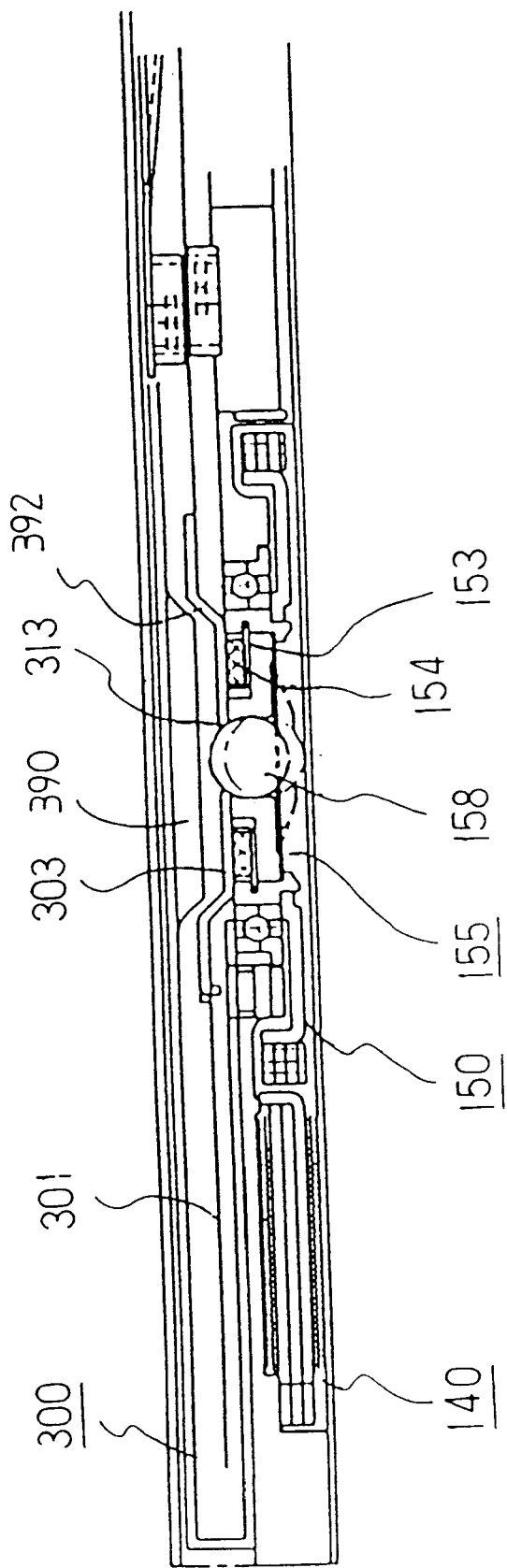
FIG. 7 is a cross sectional view showing the FDD in accordance with Embodiment 2 of this invention.

FIG. 7 is a side cross sectional view showing the chucking construction of recording medium cartridge 300 and spindle part 155 of Embodiment 2.

In the figure, a magnet holder 153 connects chucking magnet 154 with spindle part 155. Magnet holder 153 is installed on spindle part 155 in such a way that it can move freely in the radial direction up to a predetermined movement distance.

According to this embodiment, because chucking magnet 154 moves to a right position to be chucked by means of chucking holder 153, a phenomenon in which chucking magnet 154 sucks and secures hub 303 before centering ball 158 completes the centering of recording medium 301 can be avoided, resulting in more accurate centering. Moreover, always correct centering operation allows chucking magnet 154 to have larger sucking force than the construction of embodiment 1, which further enables recording medium 301 to be held more firmly. Furthermore, energization of centering ball 158 by ball preload spring 159 is reduced, rendering the insertion of recording medium cartridge 300 easier.

Embodiment 3.

In this embodiment, other examples of chucking mechanism for the recording medium drive actuator are shown.

FIG. 8A is a side cross sectional view showing the chucking structure of recording medium cartridge 300 and spindle part 155*b* of this embodiment. FIG. 8B is a top view of the hub and FIG. 8C is a top view of the spindle part.

In the figure, a convexity 314 installed in hub 303*b*, and a concavity 157 installed at spindle part 155*b* of the rotor and formed so as to engage with convexity 314. Convexity 314 and concavity 157 that engage with each other are installed at three different parts of hub 303*b* and spindle part 155*b* respectively.

As shown above, recording medium cartridge 300 with hub 303*b* constructed as indicated above is inserted into insertion and ejection port 180 of FDD unit 100, the cartridge slides over chucking magnet 154 by convexity 314 of the hub 303b, jumps over centering ball 158, and then the hole 313 and centering ball 158 get engaged with. Because hub 303b in this state has a tiny gap from spindle part 155b due to convexity 314, sucking force of chucking magnet 154 for hub 303b is small. Next, spindle part 155b rotates. As the convexity 314 and concavity 157 and get engaged with, the chucking magnet 154 and the hub 303b overlay, strengthening sucking force of chucking magnet 154, performing centering of recording medium 301 correctly, and completes chucking. Because the sucking force of the chucking magnet does not get strengthened until centering operation is complete, chucking mechanism with high centering performance of recording medium 301 can be achieved according to this embodiment.

Although concavity 157 and convexity 314 are placed on three different parts in this example, it is possible to install more than three. An example of placing concavity 157 on spindle part 155b and convexity on hub 303b is given, but the relationship of concavity and convexity may be reversed. It goes without saying that shapes other than that can be also applied so long as they engage with each other.

Embodiment 4.

This Embodiment shows another example regarding the chucking mechanism of the recording medium drive actuator.

FIG. 9A and FIG. 9B are cross sectional views showing a case of inserting a recording medium cartridge into FDD unit 100. FIG. 9C is a cross sectional view showing the top of FDD unit 100.

Figure 10A:
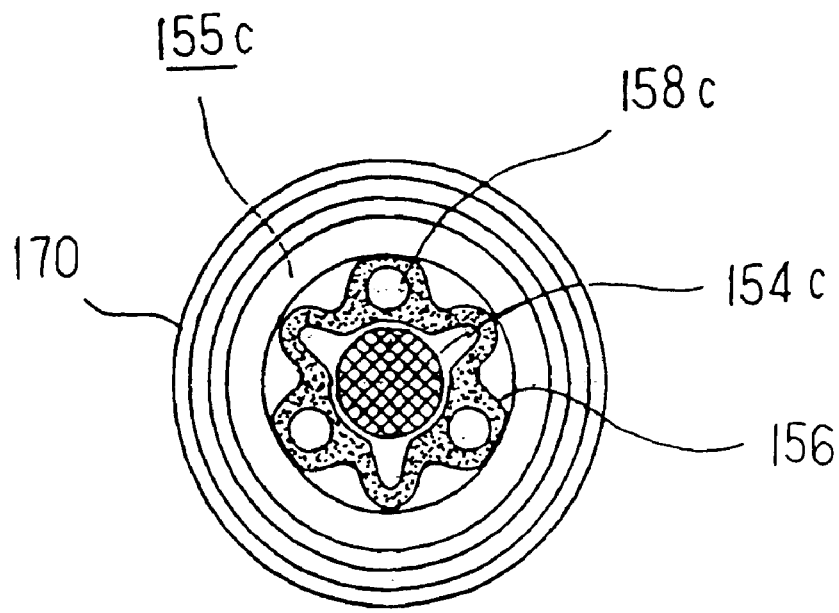
FIGS. 10A and 10B are magnified views of positioning means and driving force transfer means of the FDD.
Figure 10B:
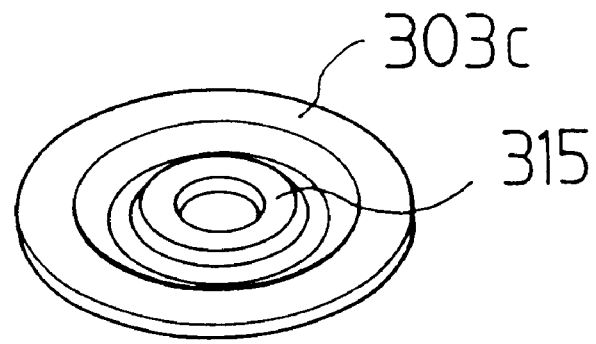

FIG. 10A shows a top view of spindle part 155c. FIG. 10B shows a slanted view of the hub.

In the figure, an elastic and modifiable retainer 156 is holding three centering balls 158c. Also, a concave groove 315 is installed around the circumference of hub 303c. Chucking magnet 154c is placed in the center of spindle part 155c. In Embodiment 3, convexity 314 is placed on hub 303b of recording medium 301. The center is centering hole 313 of magnetic material. But, the center of hub 303c of this embodiment is covered. Concave groove 315 is installed around the circumference of hub 303c and three centering balls 158c that are to be engaged with the concave groove 315 are placed for spindle part 155c. Also, spindle part 155c has a taper part 156a which is to be connected with the inner circumference of the centering ball 158c. The centering balls 158c are positioned between taper part 315a outside of concave groove 315 and taper part 156a of spindle part 155c. When recording medium cartridge 300 is inserted into insertion and ejection port 180 of FDD unit 100, the hub 303c gets engaged in with the centering balls 158c and slides over centering balls 158c, getting inserted separately from chucking magnet 154c.

As recording medium cartridge 300 is further inserted, and the center of hub 303c comes close to chucking magnet 154c, all three centering balls get engaged with concave grooves 315, upon which hub 303c and chucking magnet 154c are sucked and retained, completing positioning and load state.

Because positioning, sucking, and retaining are not performed until the center of hub 303c comes close to chucking magnet 154c in this embodiment, more accurate centering can be performed. Moreover, an initial operation to rotate spindle part 155c for sucking and retaining is not required, this embodiment is advantageous in shortening load time.

Embodiment 5.

This embodiment shows yet another example regarding the positioning means of the recording medium drive actuator.

Figure 11:
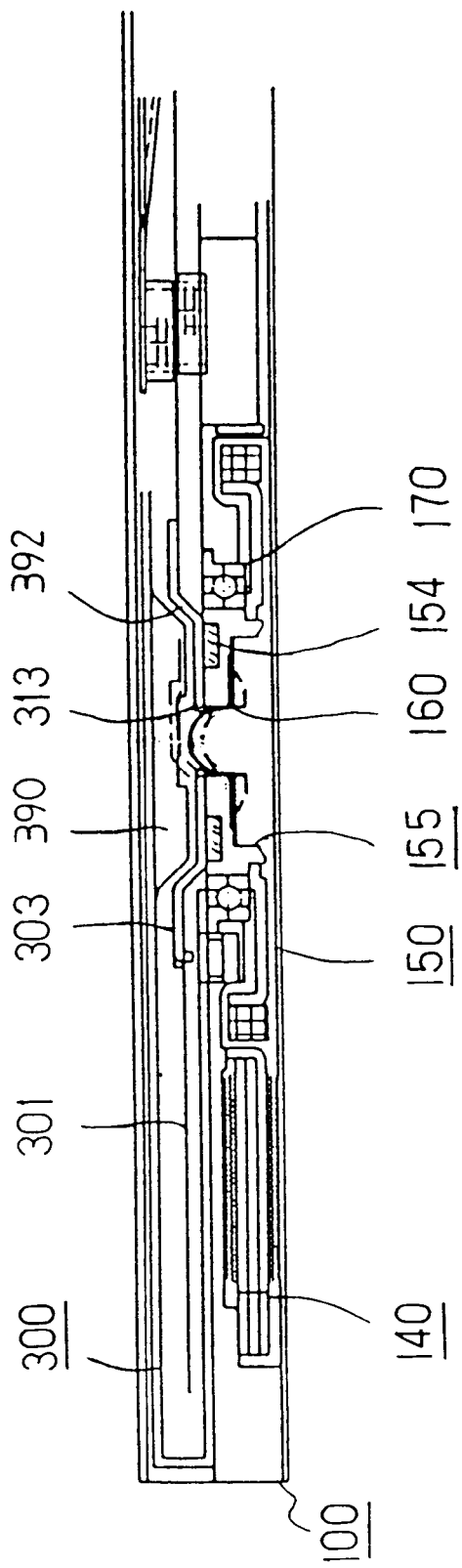
FIG. 11 is a cross sectional view showing the FDD in accordance with Embodiment 5 of this invention.

FIG. 11 is a cross sectional view showing a side of FDD unit 100. In the figure, a spring 160 has a projection and has a function of positioning recording medium 301. Examples of positioning recording medium 301 using centering balls have been given in previous examples. In this embodiment, however, as shown in FIG. 11, spring 160 is engaged with the center hole in the center of spindle part 155 to perform centering of recording medium 301. This embodiment has an advantage in reducing the number of parts as centering balls and ball preload springs which is an energization means are combined in one structure. It is also advantageous in that enough avoidance space can be taken for the spring 160 while inserting or removing recording medium cartridge 300.

Embodiment 6.

Figure 12:
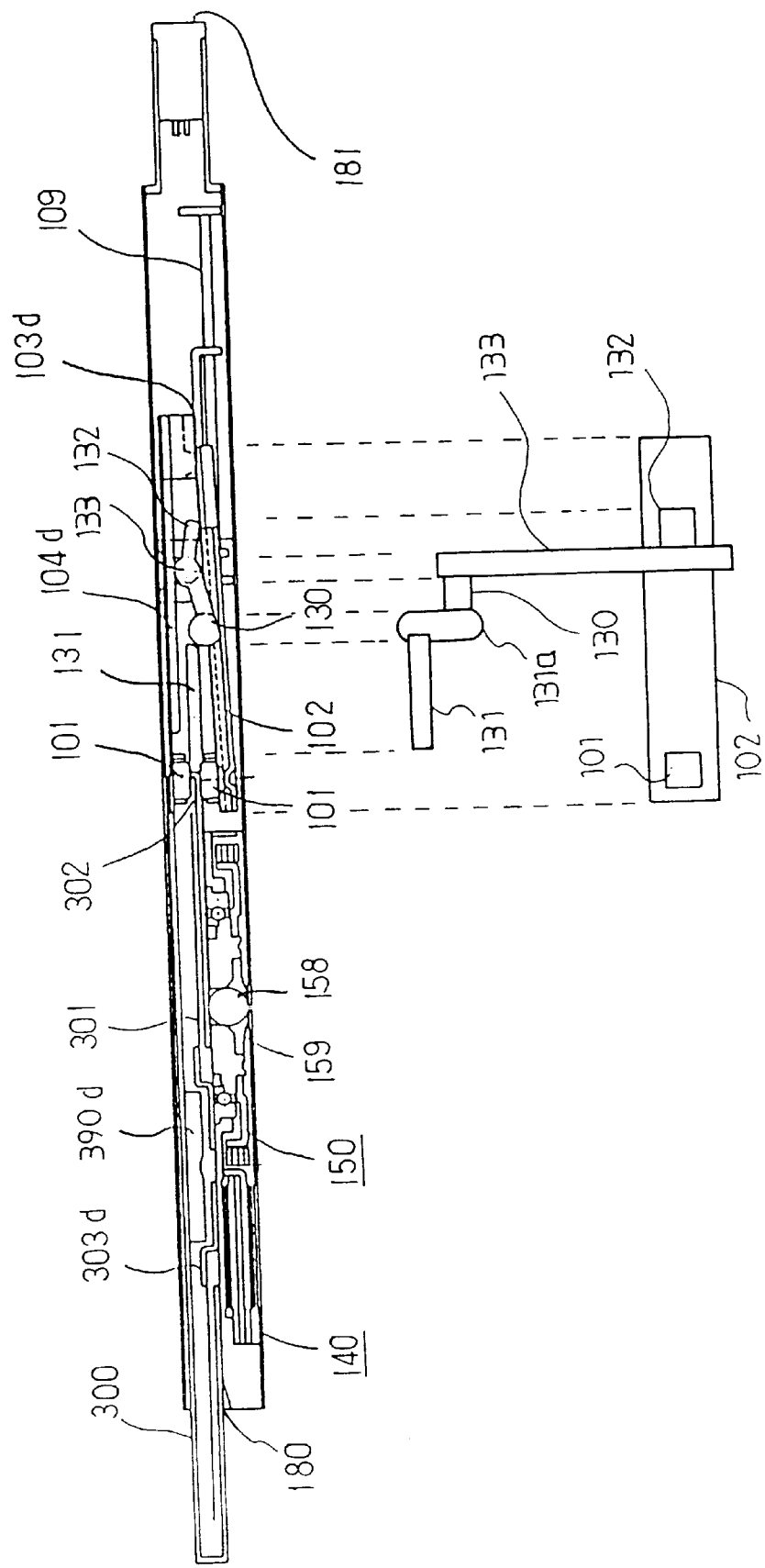
FIG. 12 is a cross sectional view showing the FDD before a recording medium is inserted in accordance with Embodiment 6 of this invention.
Figure 13:
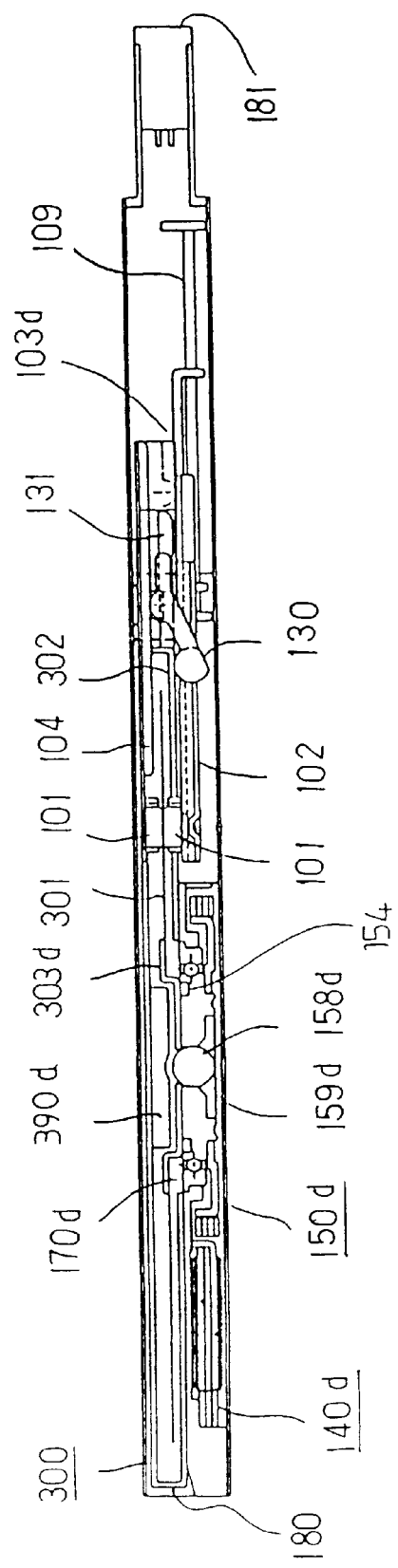
FIG. 13 is a cross sectional view showing the FDD after a recording medium is inserted in accordance with Embodiment 6 of this invention.

FIG. 12 and FIG. 13 are cross sectional views showing the sides of FDD unit 100 according to another example of this invention. Of them, FIG. 12 shows the insertion of recording medium cartridge 300 in progress from insertion and ejection port 180. FIG. 13 shows the completed load state as recording medium cartridge 300 has been inserted.

In the figure, a head avoidance lever 130, an extension lever 131, a head energization lever 132 are shown. Head avoidance lever 130 and head energization lever 132 are secured on the ends by the same shaft 133 and operate in uniform. Although not shown in the figures, the lower head of read/write head 101 is energized in the upward direction so that recording medium 301 can be sandwiched between the lower and upper heads. Also, extension lever 131 is energized in the direction of insertion and ejection port 180 with springs and so on. In addition, a cylindrical end 130a of avoidance lever 130 is energized in the direction of extension lever 131 (upward) with springs and so on. Therefore, head energization lever 132 is pushing down on the lower head of read/write head 101 toward downward direction.

Next, operation is explained with reference to figures.

When the recording medium cartridge 300 is inserted from insertion and ejection port 180, shutter 304 of recording medium cartridge 300 opens. When recording medium 301 comes close to read/write head 301, the end of recording medium cartridge 300 gets engaged with extension lever 131, which is pushed into the insertion direction of recording medium cartridge 300. Then, the end opposite to the end engaged with recording medium cartridge 300 gets engaged with the head avoidance lever 130 and pushes it. Head avoidance lever 130 rotates counter-clockwise with shaft 133 as the center. As head avoidance lever 130 rotates counter-clockwise, head energization lever 132 also rotates counter-clockwise, thereupon releasing the force pushing down the lower head of read/write head 101. The lower head moves upward and gets engaged with the inserted recording medium 301.

Because the lower head can be avoided at least as much as the thickness of the recording medium drive actuator by using the avoidance means of read/write head 101 of this embodiment, there is no need of taking extra thickness for head avoidance. This allows the thinner construction of FDD unit 100 in terms of the device thickness.

Although the above embodiment illustrates the avoidance means of the lower head under the construction of a recording medium to be sandwiched by two heads, it goes without saying that this head avoidance means can be used for the construction in which only one head is provided beneath a recording medium.

Embodiment 7.

The previous embodiments show the cases in which FDD unit 100 is a box-type frame. Insertion and ejection port 180 is provided on one side of the box. Recording medium cartridge 300 is inserted horizontally from this insertion and ejection port. This embodiment, however, shows the construction of the FDD, where the frame of FDD unit 100 is separated into two frames, an upper frame and a lower frame. A rotation shaft is provided at the end of this separated frame, and the upper frame opens with this rotation shaft as the pivot.

Figure 14:
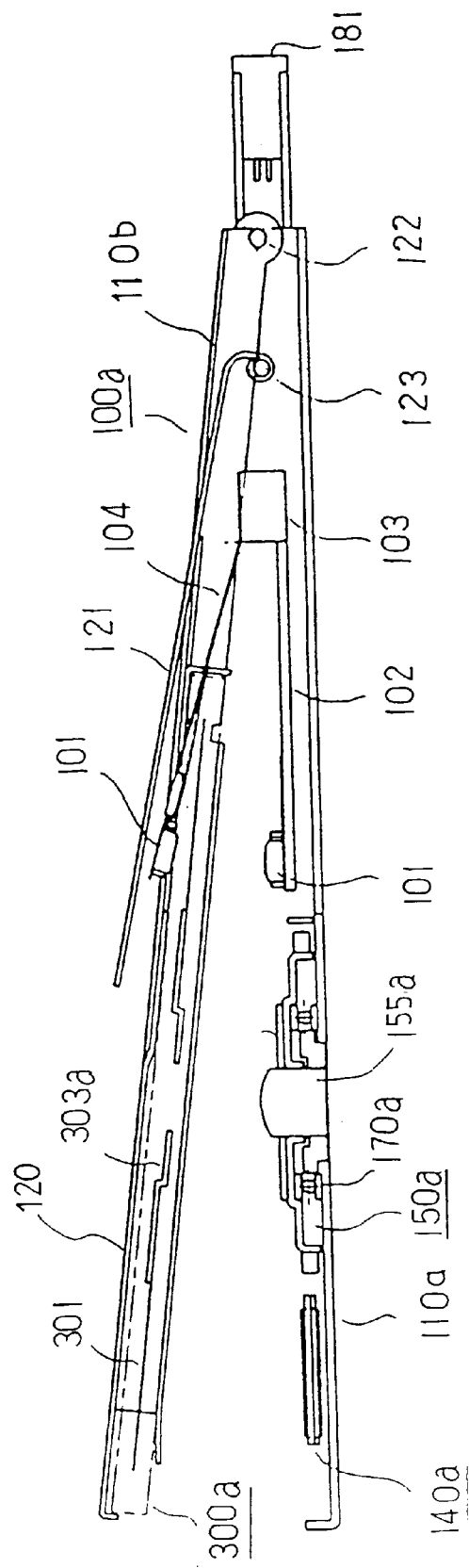
FIG. 14 is a cross sectional view showing the FDD before a recording medium is inserted and when the head is positioned on the inner circumference of the recording medium in accordance with Embodiment 7 of this invention.
Figure 15:
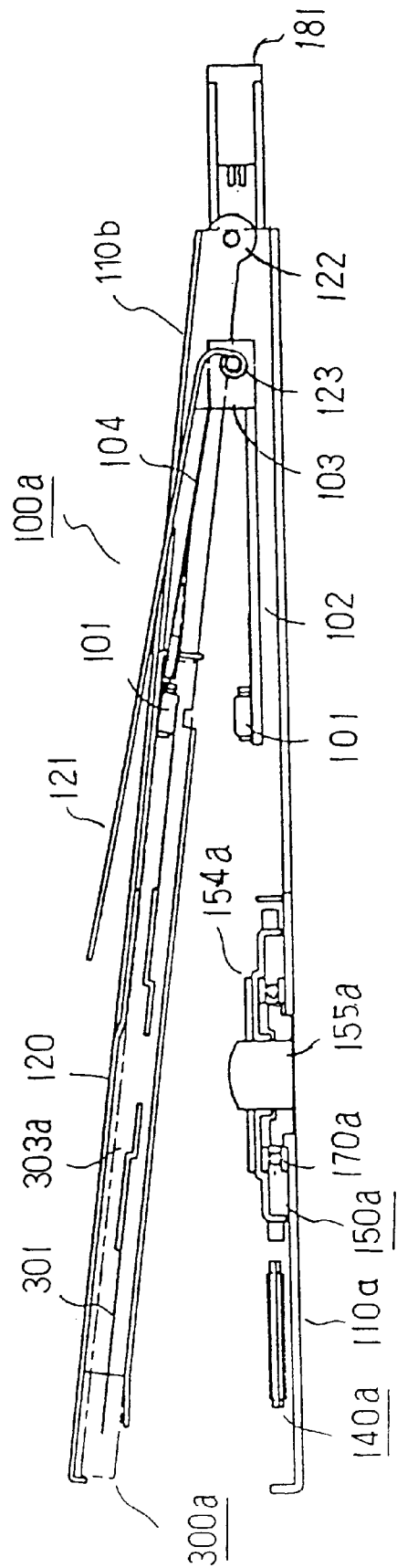
FIG. 15 is a cross sectional view showing the FDD before a recording medium is inserted and when the head is positioned on the outer circumference of the recording medium in accordance with Embodiment 7 of this invention.
Figure 16:
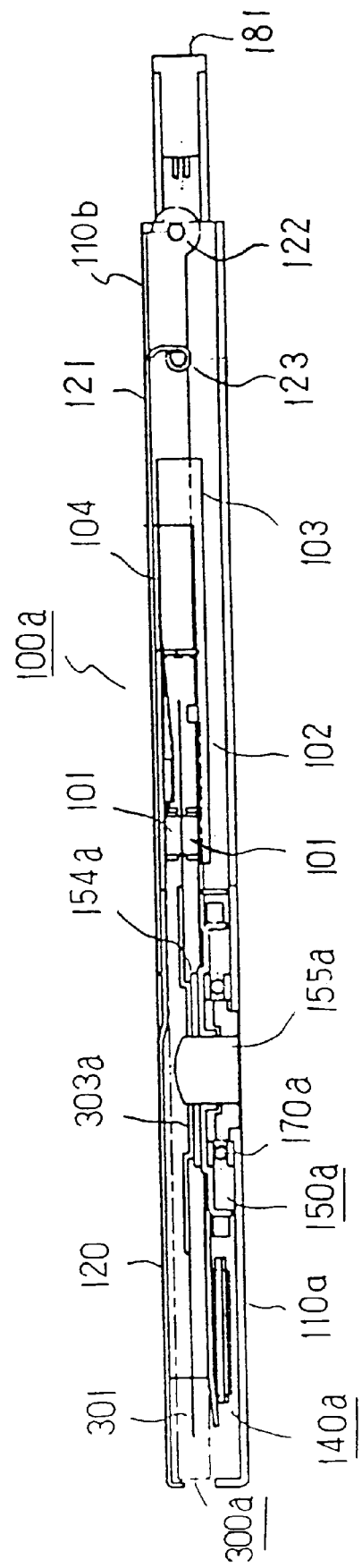
FIG. 16 is a cross sectional view showing the FDD after a recording medium is inserted in accordance with Embodiment 7 of this invention.

FIGS. 14, 15, and 16 show the construction of FDD unit 100a in accordance with Embodiment 7. FIGS. 14 and 15 show the unload states and FIG. 16 shows the load state. Furthermore, FIG. 14 indicates that read/write head 101 is positioned on the end of inner circumference of recording medium 301 and FIG. 15 indicates that read/write head 101 is positioned on the end of outer circumference of recording medium 301.

In the figure, 100a is a modified version of the FDD unit. A lower frame 110a, an upper frame 110b, a cartridge holder 120 mounted on upper frame 110b, a subcover (sub-frame) 121, and upper frame 110b and sub-frame 121 are engaged with at a certain supporting point (not shown). A rotation pivot 122 supports the rotation of upper frame 110a and lower frame 110b, and rotation pivot 123 supports the rotation of sub-frame 121 up. Rotation pivot 123 of sub-frame 121 is placed inside rotation pivot 122 that rotates the frames. A rotor 150a, spindle shaft 155a are also shown. The relationship between this rotor 150a and spindle shaft 155a is the same as the prior art. With rotor 150a as the center shaft, spindle shaft 155a is supported to freely rotate by lower frame 110a via bearing 170.

Next operation is explained.

In order to insert recording medium cartridge 300 from FDD unit 100a, and when FDD unit 100a is, for instance, being inserted into a general-purpose slot 200 shown in FIG. 1, first of all, eject button 222 must be pressed to eject FDD unit 100a outside in order to make this FDD unit 100a a unit. Then, as FDD unit 100a has been made a unit, upper frame 110b is rotated with rotation pivot 122 as the center so as to open the upper frame slantly against lower frame 110a of FDD unit 100a. Sub-frame 121 opens in linkage, but because rotation pivot 123 of sub-frame 121 is inside rotation pivot 122 of the frame, the angle of opening sub-frame 121 becomes wider than the opening angle of upper frame 110b. Therefore, the upper head of read/write head 101 is avoided higher than upper frame 110b. Next, recording medium cartridge 300 is inserted into cartridge holder 120. Because the upper head of read/write head 101 is being avoided higher than cartridge holder 120 at this time, it does not have to make contact with recording medium cartridge 300 being inserted.

After recording medium cartridge 300 has been inserted into cartridge holder 120, upper frame 110b gets engaged with lower frame 110a, thereupon closing the frame. Recording medium 301 is positioned by spindle shaft 155a and sucked and retained by chucking magnet 154. At the same time, the upper head of read/write head 101 is energized by sub-frame 121, engaged with the top surface of recording medium 301, thereby completing load state.

According to this embodiment, upper frame 110 is opened in order to retain recording medium 301. Because its positioning in relation to recording medium drive actuator 140 is performed by closing upper frame 110b, the thickness to avoid spindle shaft 155a is no longer required even when the construction of spindle shaft 155a is the same as the related art. Because of this, even when the construction of rotor 150a and spindle shaft 155a is as simple as the related art, FDD unit 100b can be made thinner. Moreover, by providing sub-frame 121 that engages with upper frame 110b, the upper head of read/write head 101 can be protected under an unload state.

Embodiment 8.

This embodiment gives a modified example of Embodiment 7.

Figure 17:
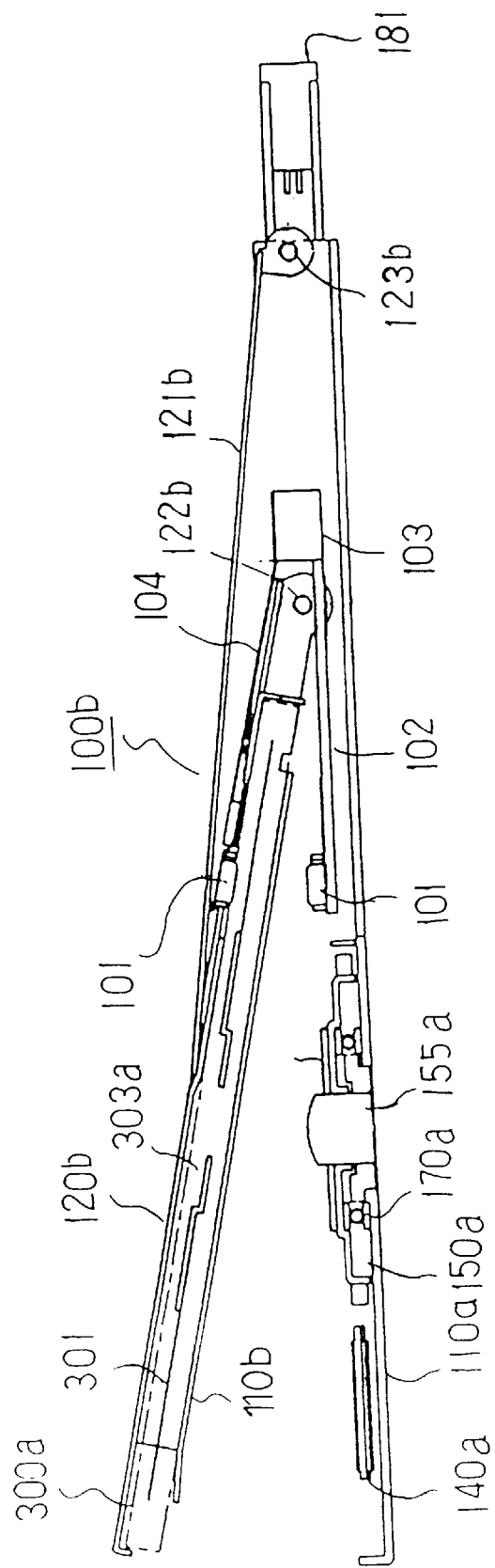
FIG. 17 is a cross sectional view showing the FDD before a recording medium is inserted and the head is positioned on the inner circumference of the recording medium in accordance with Embodiment 8 of the invention.
Figure 18:
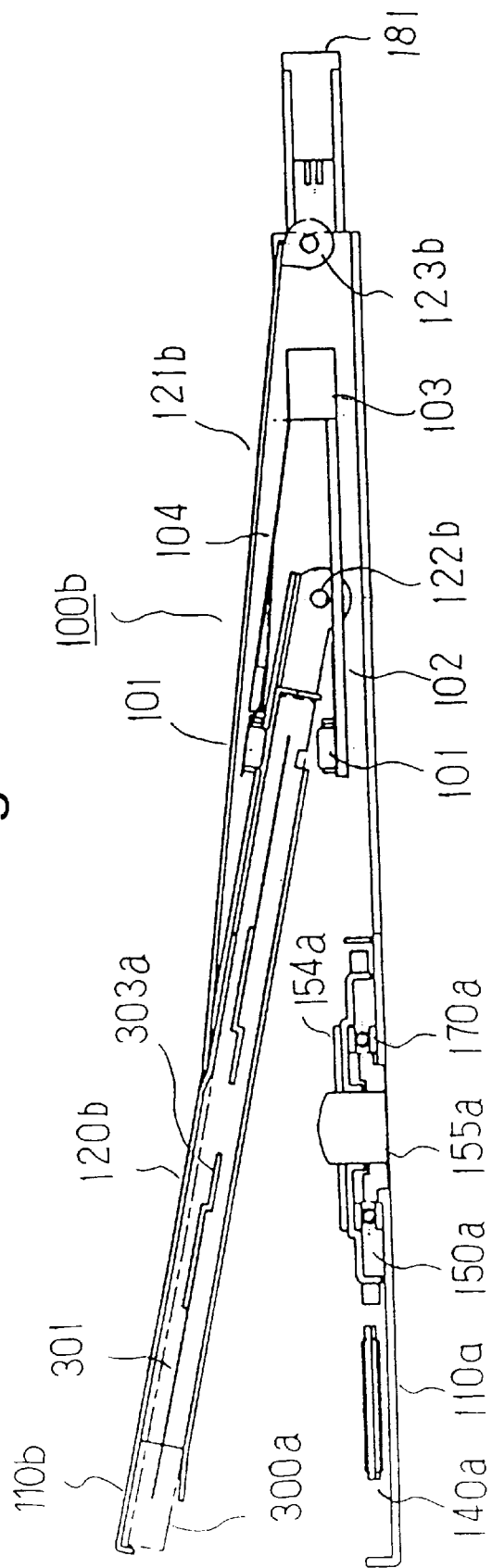
FIG. 18 is a cross sectional view showing the FDD before a recording medium is inserted and the head is positioned on the outer circumference of the recording medium in accordance with Embodiment 8 of this invention.
Figure 19:
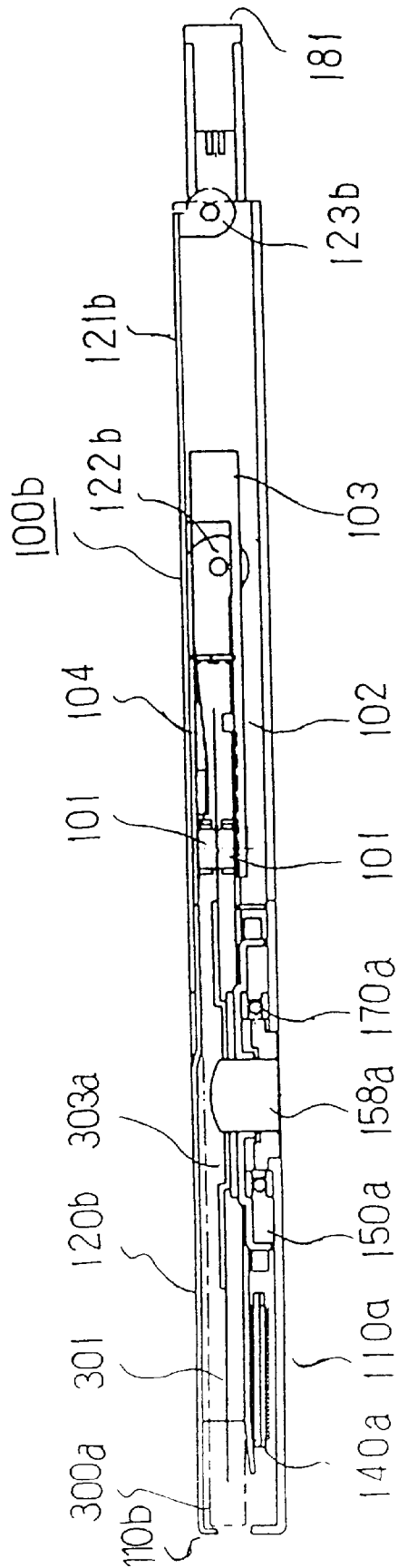
FIG. 19 is a cross sectional view showing the FDD after a recording medium is inserted in accordance with Embodiment 8 of this invention.

FIG. 17, FIG. 18, and FIG. 19 show the construction of FDD unit 100b in accordance with Embodiment 8. FIG. 17 and FIG. 18 show the unload state, and FIG. 19 shows load state. FIG. 17 is an illustration of read/write head 101 positioning on the end of inner circumference of recording medium 301, and FIG. 18 shows that read/write head 101 is positioned on the end of outer circumference of recording medium 301.

In the figure, a modified example of FDD unit 100b, cartridge holder 120b, and rotation pivot 122b of cartridge holder 120b are shown. The difference from the previous Embodiment 7 is that the rotation pivot 122b of the upper frame 110b is provided on the inside of the rotation pivot 123b of the sub-frame 121b.

Next, operation is explained with reference to figures.

It is the same as Embodiment 7 in that FDD unit 100b must be made a unit in order to insert recording medium cartridge 300. Next, as FDD unit 100a has been made a unit, upper frame 110b is rotated with rotation pivot 122 as the center so as to open the upper frame slantly against lower frame 110a of FDD unit 100a. Cartridge holder 120b opens in linkage. Because rotation pivot 122b of cartridge holder 120b is inside of rotation pivot 123b at this time, the angle of opening cartridge holder 120b becomes wider than the opening angle of sub-frame 121b. Therefore, the upper head of read/write head 101 is avoided outside of cartridge holder 120b. Next, recording medium cartridge 300 is inserted into cartridge holder 120. Because the upper head of read/write head 101 is avoided outside of cartridge holder 120b at this time, it does not have to make contact with recording medium cartridge 300 being inserted.

After recording medium cartridge 300 is inserted into cartridge holder 120b, upper frame 110b gets engaged with lower frame 110a, thereupon closing the frame. Recording medium 301 is positioned by spindle shaft 155a and sucked and retained by chucking magnet 154. At the same time, the upper head of read/write head 101 is energized to lower frame 110b, and engaged with the top surface of recording medium 301, and the load state has been complete.

According to this Embodiment, the effect not only the same as the Embodiment 7 can be achieved but also the number of parts can be reduced.

Embodiment 9.

An example regarding the invention of the recording medium drive actuator will be explained.

Figure 20A:
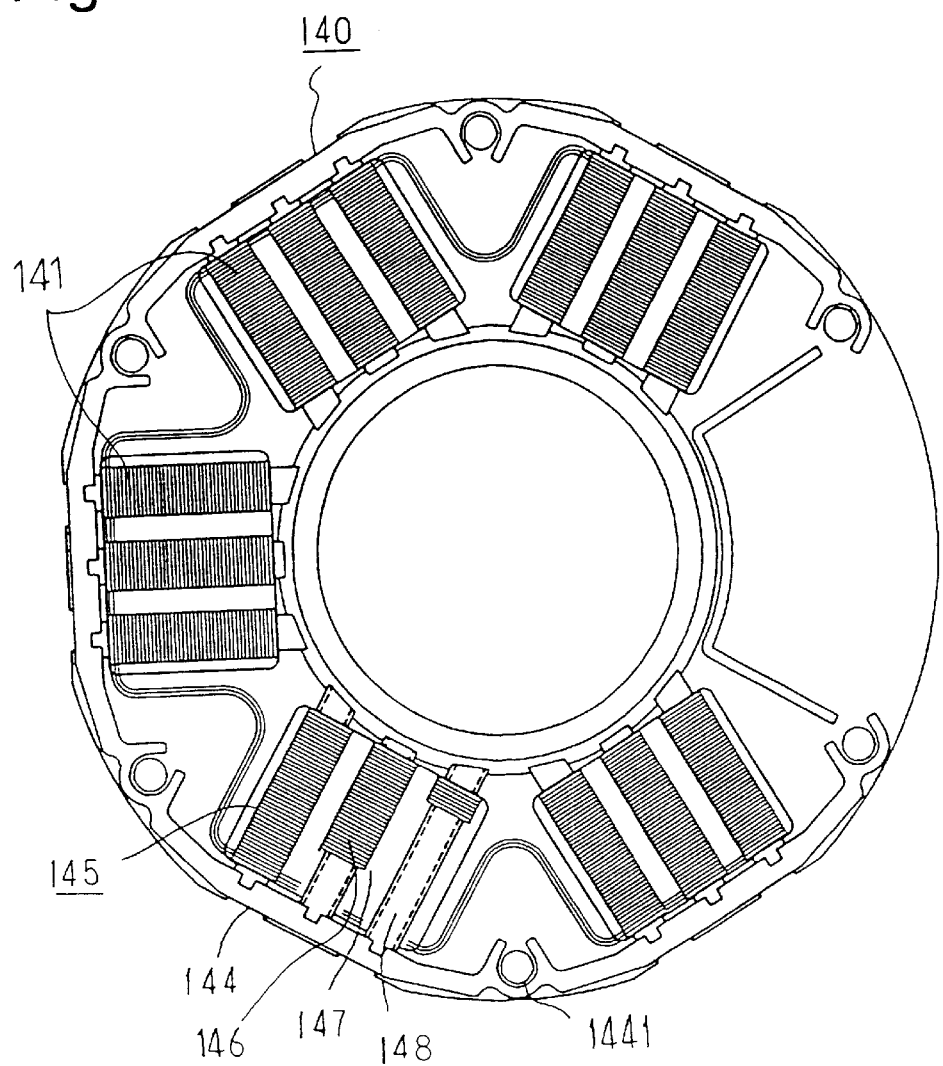
FIGS. 20A and 20B are a top view and a cross sectional view showing the construction of recording medium drive actuator in accordance with Embodiment 9 of this invention.
Figure 20B:
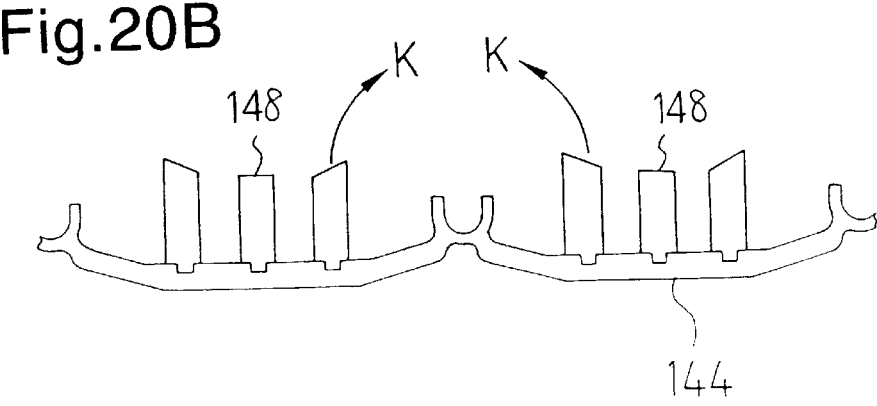
Figure 21:
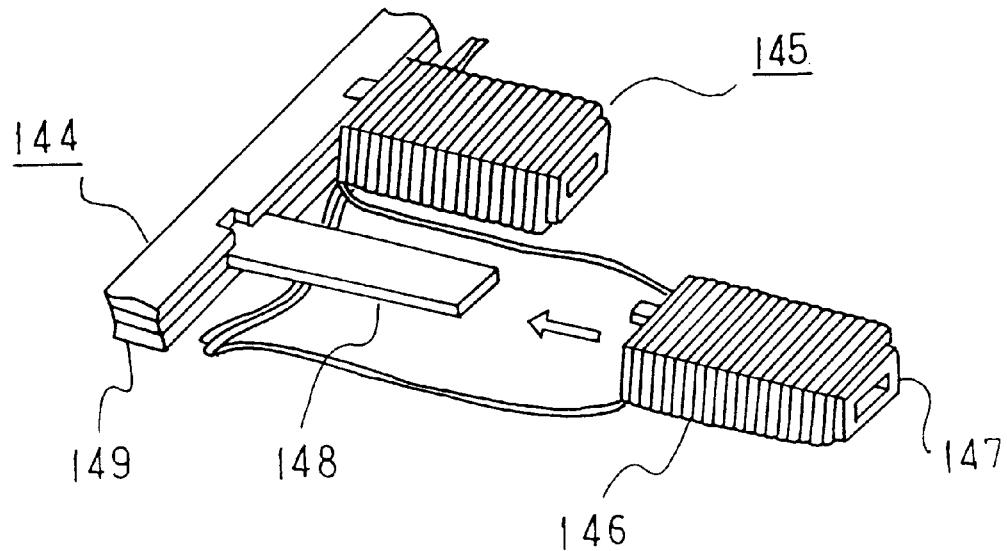
FIG. 21 explains the construction of the stator element in accordance with Embodiment 9 of this invention.

FIG. 20A is a top view showing the part of the recording medium drive actuator. FIG. 20B shows the construction of the stator core before being bent. FIG. 21 shows a slanted view of the construction of the stator which is a part of the recording medium drive actuator.

In the figures, recording medium drive actuator 140, and stator core 144 are secured with stator core supporting pin 1441. The construction of stator 141 has so far been structured with the teeth and coil. But in this embodiment, stator 141 is divided into multiple stator elements 145. Coil 146 is wound around coil bobbin 147. Stator element 145 is made up of coil bobbin 147, center core 148 which is the core of coil bobbin 147. When mounting coil bobbin 147 on center core 148, it is mounted by welding, or secured with caulk. This embodiment shows an example of the recording medium drive actuator driven by three phases. One block is made up of three stator elements 145 of phases U, V, and W. The midpoint of each block of stator core 144, or the vicinity of the supporting point by stator core supporting pin 1441 is dented to make bending possible. As stator core 144 is bent in the direction of arrow K from the state shown in FIG. 20B, stator core 144 in the shape shown in FIG. 20A can be easily produced. Although not shown in the figure, the winding of each stator element 145, from the opposite direction from the direction of inserting coil bobbin 147 into center core 148, coil bobbin 147 in inserted into the handle (not shown) of the winding machine so as to enable to perform winding concurrently with the construction of recording medium drive actuator 140. Two or more handles are aligned on the winding machine. By taking wider space between the coil bobbins 147 inserted into the handles, winding can be performed simultaneously and at high speed for each coil bobbin 147. As a winding method, the uniform phases of U, V, and W can be performed at the same time, or they can be sequentially performed in order of U, V, and W.

Due to the above construction, recording medium drive actuator 140 can be made thinner as a whole. In addition, by winding coils on the coil bobbins, and by mounting these coil bobbins on the center core, winding of coils becomes easier. Moreover, pitches between each stator of recording medium drive actuator 140 can be made shorter than the distance incapable of automatic winding when automatic winding machine is used for winding coils directly on the teeth. Therefore, compact and high output recording medium drive actuator 140 is realized.

Embodiment 10.

This embodiment shows another example of the construction of stator element 145 of recording medium drive actuator 140 set forth in Embodiment 9.

Figure 22:
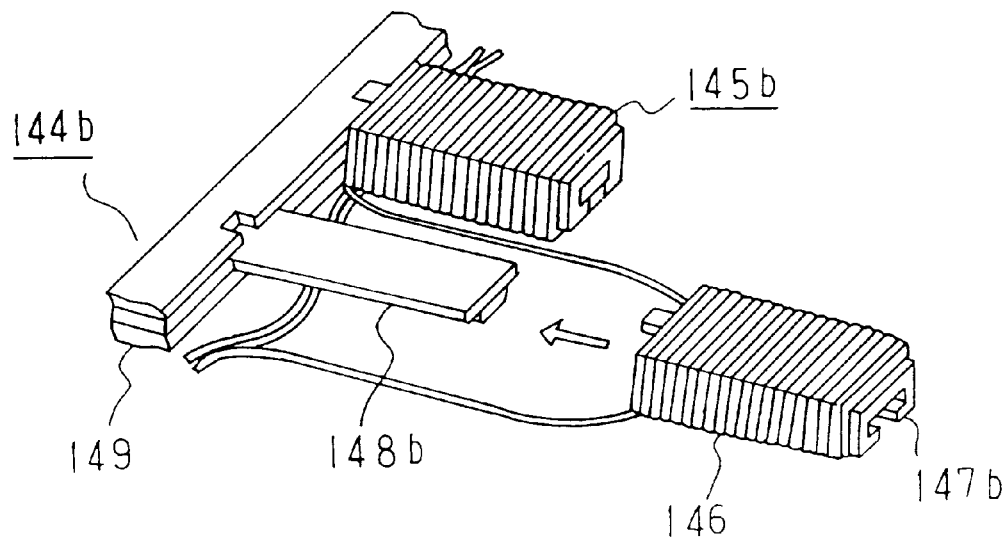
FIG. 22 explains the construction of the stator element in accordance with Embodiment 10 of this invention.
Figure 23:
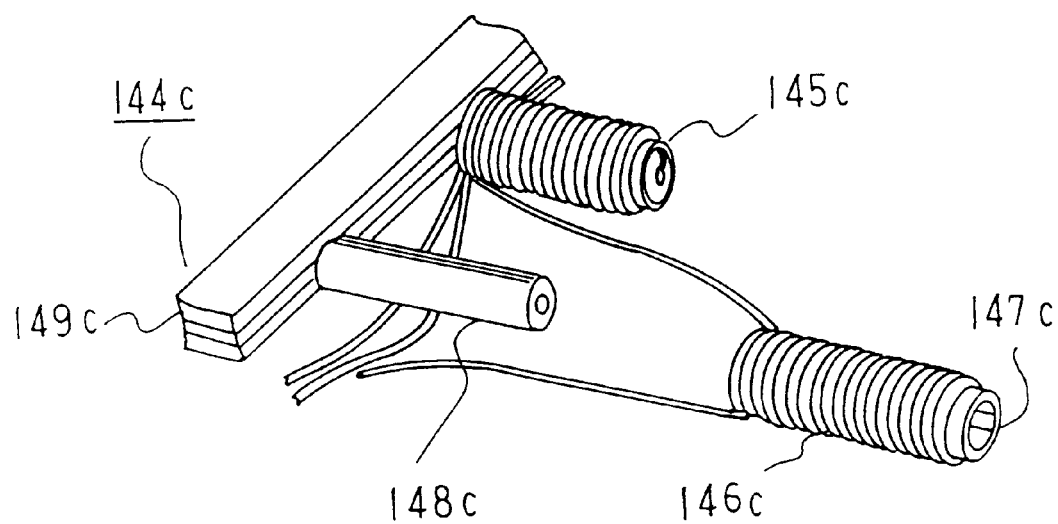
FIG. 23 explains another example of the stator element construction in accordance with Embodiment 10 of this invention.

FIG. 22 and FIG. 23 show another example of FIG. 21. In the previous embodiment 9, the cross section of coil bobbin 147 is presented as a square cylinder. However, coil bobbin 147b illustrated in FIG. 22 is provided with a slit which is connected in horizontal direction from one end to the other of the square cylinder type of coil bobbin. In this case, center core 148b is shaped so that it gets engaged with coil bobbin 147b. Coil bobbin 147b shaped in this way is advantageous because it can be manufactured easily from the magnetic material sheet using the sheet metal press.

It is also possible to use cylindrical coil bobbin 147c as shown in FIG. 23. Similarly to the case of FIG. 22, center core 148c is formed so that it gets engaged with coil bobbin 147c. Cylindrical coil bobbin 147c is advantageous in obtaining stator element 145c of stable quality because it is easy to keep wire tension uniform in winding coil in this way.

Embodiment 11.

This embodiment explains another example regarding the construction of the recording medium drive actuator.

Figure 24:
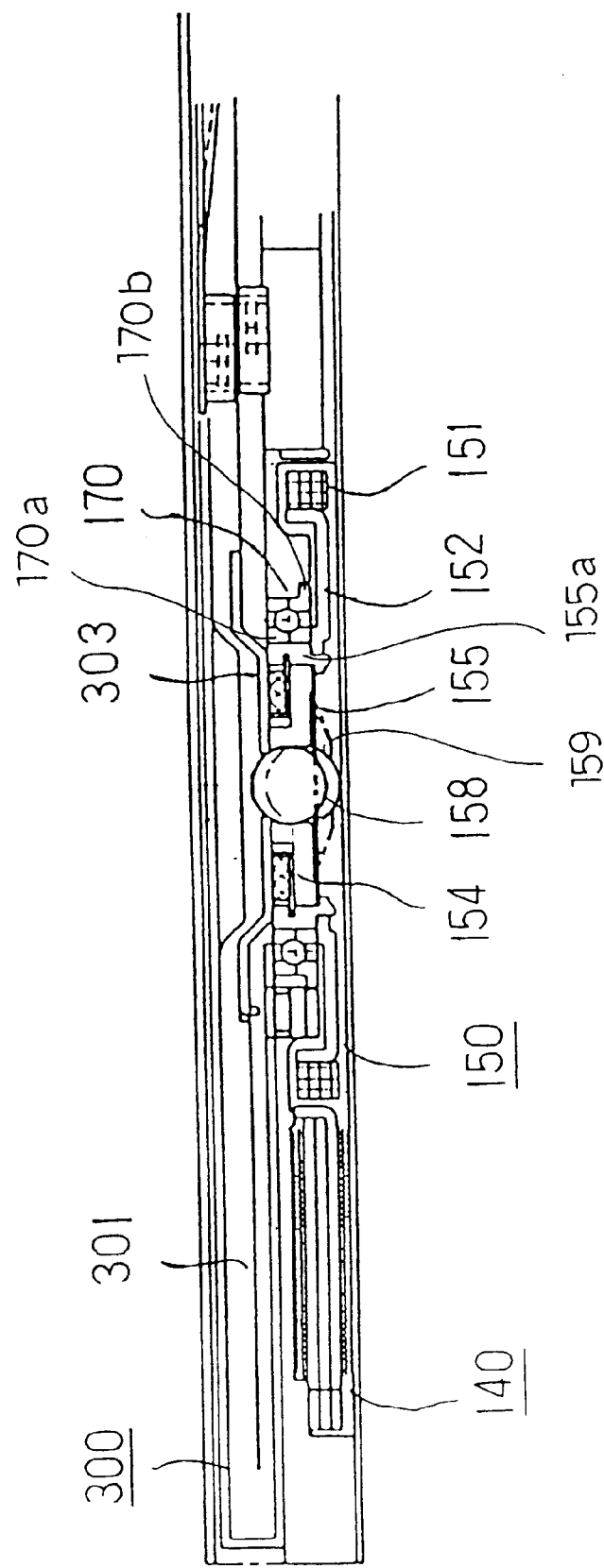
FIG. 24 is a cross sectional view showing the construction of recording medium drive actuator in accordance with Embodiment 11 of this invention.

FIG. 24 is a cross sectional view of FDD unit 100. The construction of the recording medium drive actuator of this example is instead of spindle shaft 48, which works as positioning means and supporting shaft in the related art of FIG. 81, a cylindrical bearing 170 is provided as the supporting shaft. Spindle part 155 is placed on the inner circumference to freely rotate. A hole is provided in the center of this spindle part 155. Centering ball 158 which is the positioning means and ball preload spring 159 are mounted on the hole. In this example, the spindle part 155 is connected with rotor yoke 152 by means of a, for instance, caulk, and so on.

According to this embodiment, because a hole is provided in the center of spindle part 155, centering ball 158 which is the positioning means and ball preload spring 159 shown, for instance, in Embodiment 1 can be placed in the center.

Embodiment 12.

This embodiment shows another example concerning the construction of the recording medium drive actuator.

Figure 25:
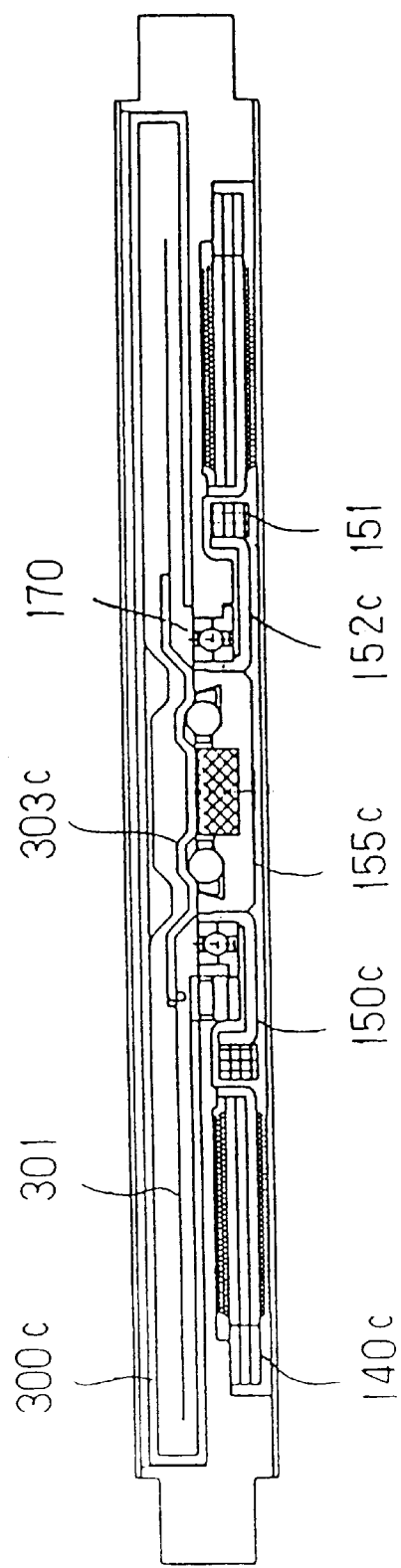
FIG. 25 is a cross sectional view showing the construction of recording medium drive actuator in accordance with Embodiment 12 of this invention.

FIG. 25 is a cross sectional view of FDD unit 100.

In the figure, an another example of rotor 150c, another example of rotor yoke 152c, and another example of spindle part 155c are shown. The difference from Embodiment 11 is in that rotor yoke 152c is combined with the part material (material 155a in FIG. 24) for securing it on the rotating side 170a of the bearing part (bearing 170), placing spindle part 155c inside combined rotor yoke 152c.

According to this embodiment, because rotor yoke 152c is placed so as to freely rotate against the bearing, rotor yoke 152c can be rotated without setting spindle part 155c inside rotor yoke 152c, thus enabling a unit testing to be performed only for this rotor yoke 152c.

Embodiment 13.

This embodiment shows an example of the head drive actuator of this invention.

Figure 26:
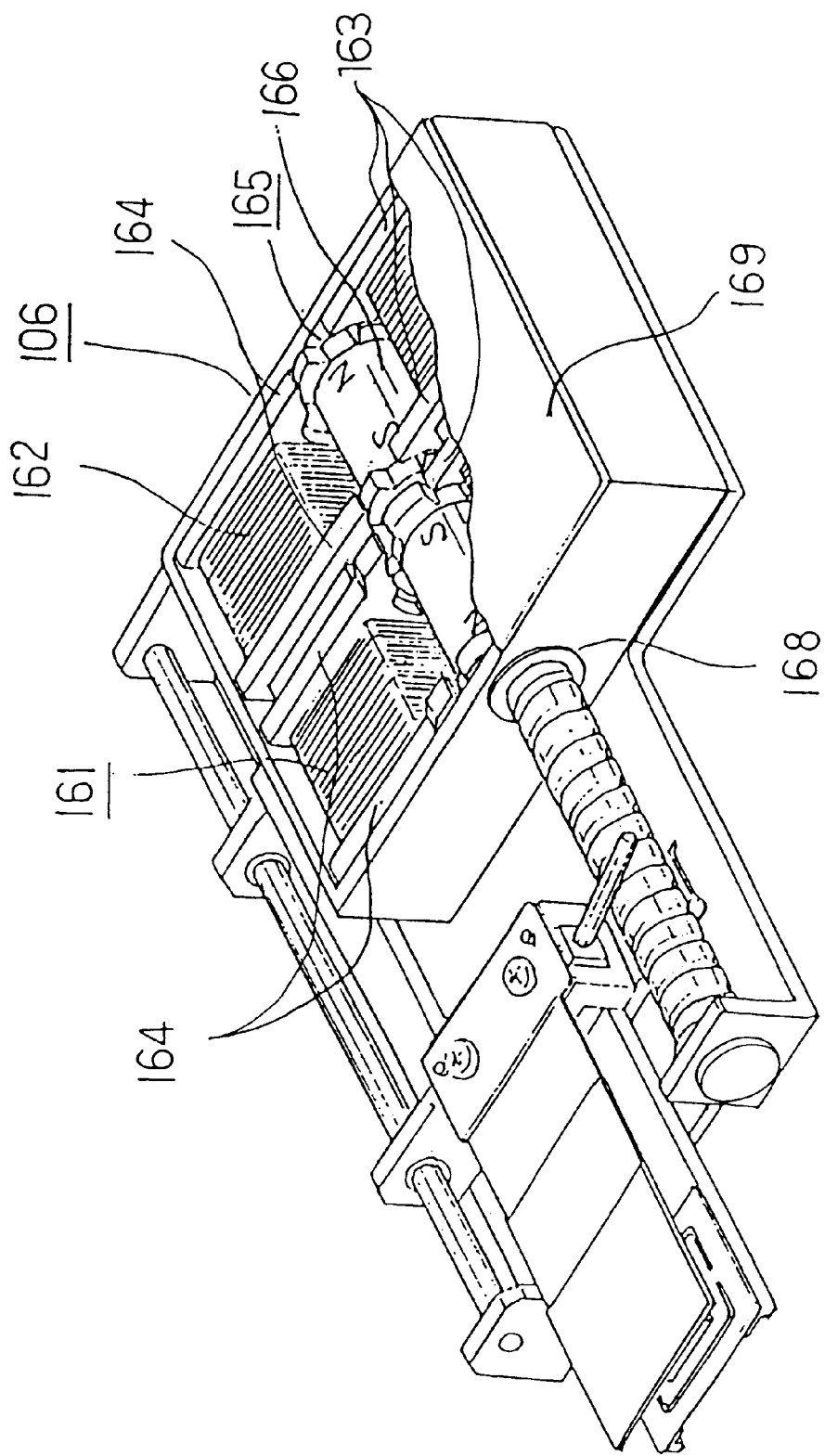
FIG. 26 shows a cross sectional view showing part of the construction of head drive actuator in accordance with Embodiment 13 of this invention.
Figure 27:
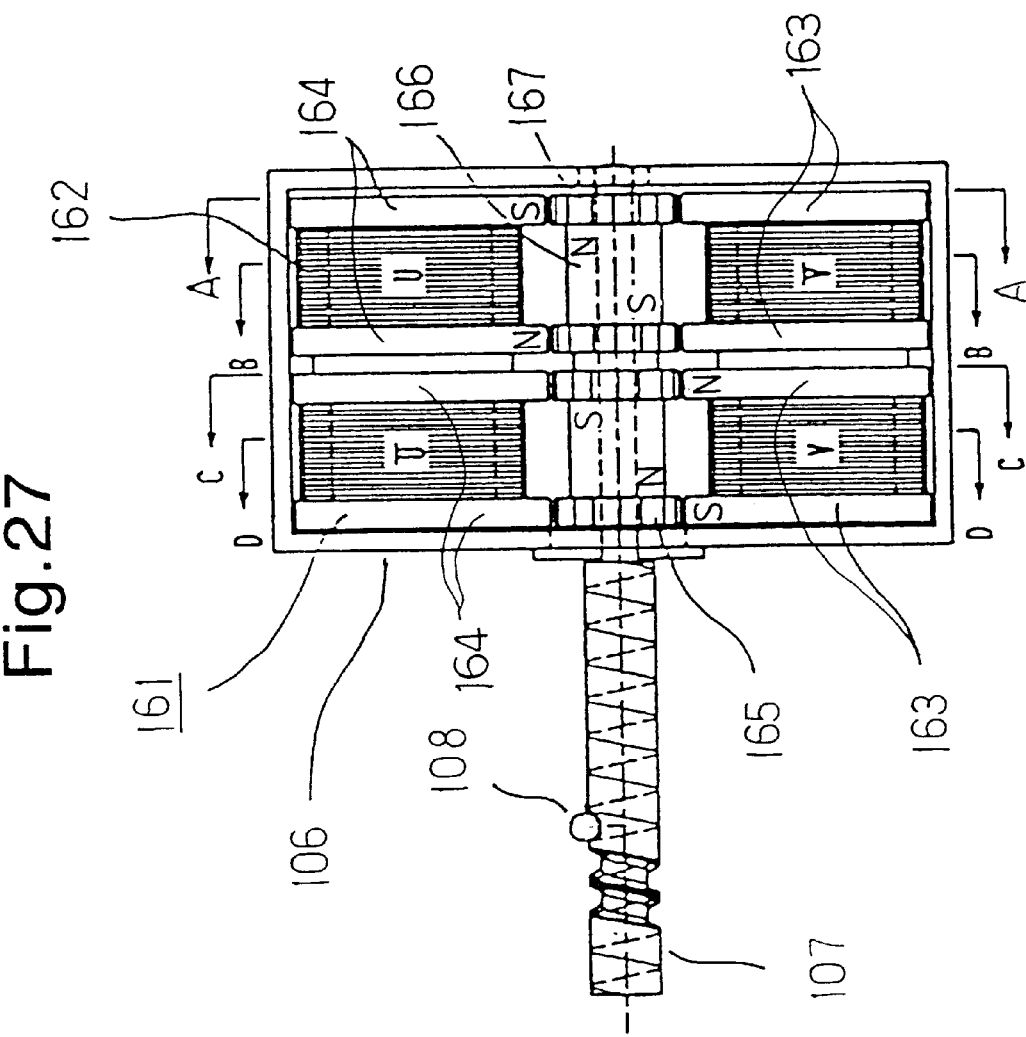
FIG. 27 is a top view showing the construction of head drive actuator in accordance with Embodiment 13 of this invention.
Figure 28:
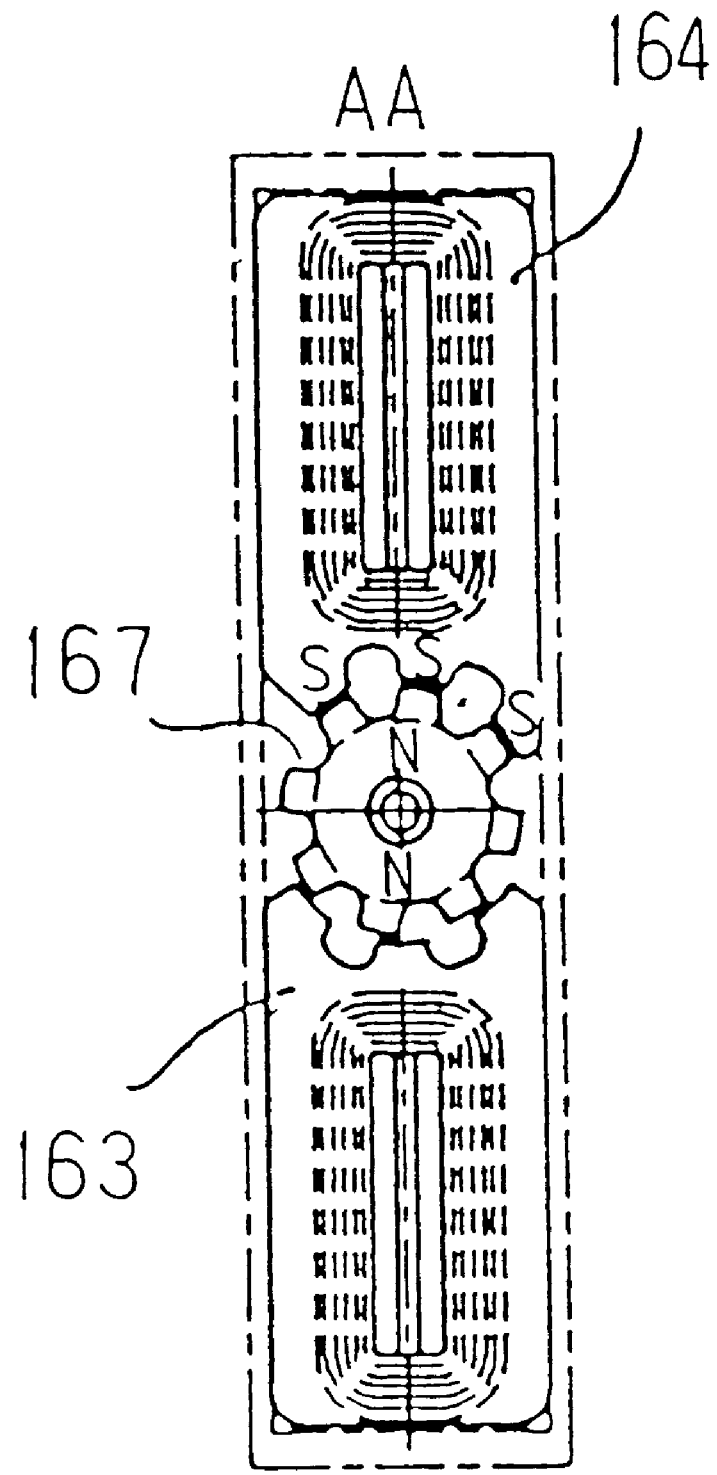
FIG. 28 shows a side sectional view in A—A direction indicated in the top view of head drive actuator of FIG. 27 in accordance with Embodiment 13 of this invention.
Figure 29:
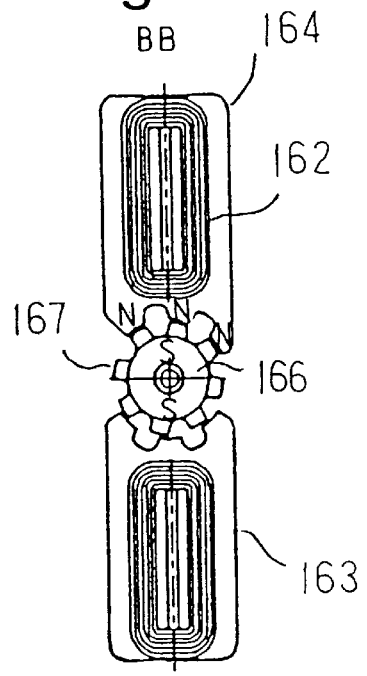
FIG. 29 shows a side sectional view in B—B direction indicated in the top view of head drive actuator of FIG. 27 in accordance with Embodiment 13 of this invention.
Figure 30:
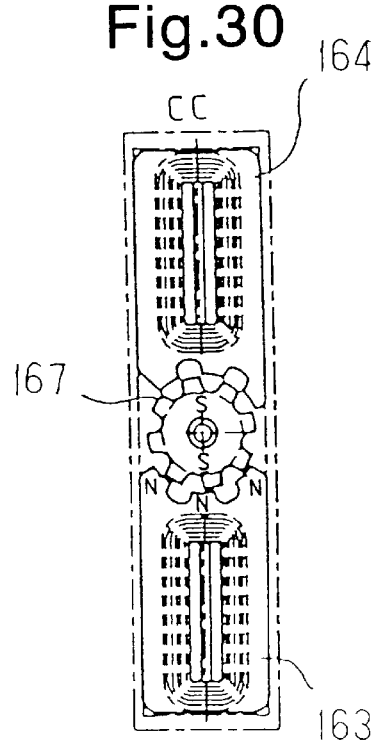
FIG. 30 shows a side sectional view in C—C direction indicated in the top view of head drive actuator of FIG. 27 in accordance with Embodiment 13 of this invention.
Figure 31:
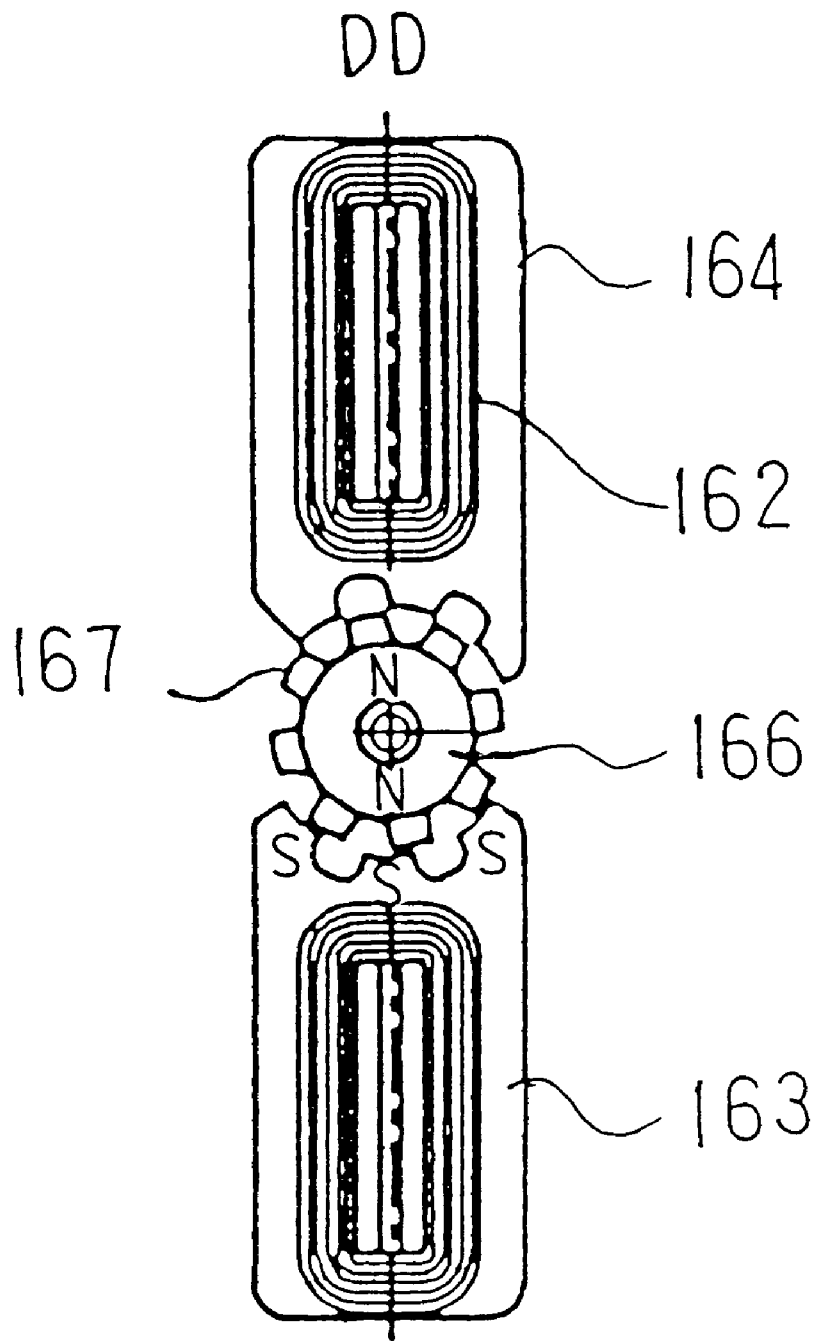
FIG. 31 shows a side sectional view in D—D direction indicated in the tope view of head drive actuator in FIG. 27 in accordance with Embodiment 13 of this invention.

FIG. 26 is a slanted view showing part of step motor 106 which is a main part of head drive actuator 105. FIG. 27 shows a top view omitting a shield cover shown in FIG. 26, and shows the construction of the rotor and stator. In addition, FIG. 28 is a cross sectional view seen from A—A point shown in FIG. 27 to the direction of arrow. FIG. 29 is a cross sectional view seen from B—B point in FIG. 27 to the direction of arrow. FIG. 30 is a cross sectional view seen from C—C point shown in FIG. 27 to the direction of arrow. FIG. 31 is a cross sectional view seen from D—D point shown in FIG. 27 to the direction of arrow.

In the figure, stator 161 is made up of coil 162, a first stator yoke 163, and a second stator yoke 164. As shown in FIG. 28 through FIG. 31, three teeth are provided to the opposite side of rotor 165, which is discussed later. The position of these teeth differs from phase angle of 90°, namely 11.25° in machine angle. Furthermore, coil U and coil U bar of coil 162 shown in FIG. 27 are formed with coils having the phase angle different in 180°. Similarly, coil V and coil V bar are formed with coils having the phase angle different in 180°. Also, rotor 165 is magnetized at different poles on one end and the other in the horizontal direction. Namely, rotor magnet 166 is bipolared as a whole and four rotor yokes 167 having eight radial convexities on one end and the other of this rotor magnet make up the rotor. Four rotor yokes 167 are all the same form. But rotor yoke 167 on the side shown in FIG. 28 and FIG. 29 and rotor yoke 167 on the side shown in FIG. 30 and FIG. 31 are structured so as to differ by 180° in phase angle, namely 22.5° in terms of machine angle. Based on the above construction, the drive method is unipolar method, and a step motor that drives at step angle 11.25° at the time of driving one phase excitation can be achieved.

According to this embodiment, because coil 162 is placed on both sides of rotor 165, the turns of the coil can be increased. This is advantageous in outputting torque required to perform carriage drive and in making the head drive actuator itself thinner than 5.0 mm, the PCMCIA standard type-2. Furthermore, rotor magnet 166 used for this embodiment is bipolared, and a magnet like this can be produced at relatively low cost, thereby enabling the entire cost of head drive actuator to be lowered.

Embodiment 14.

Figure 32:
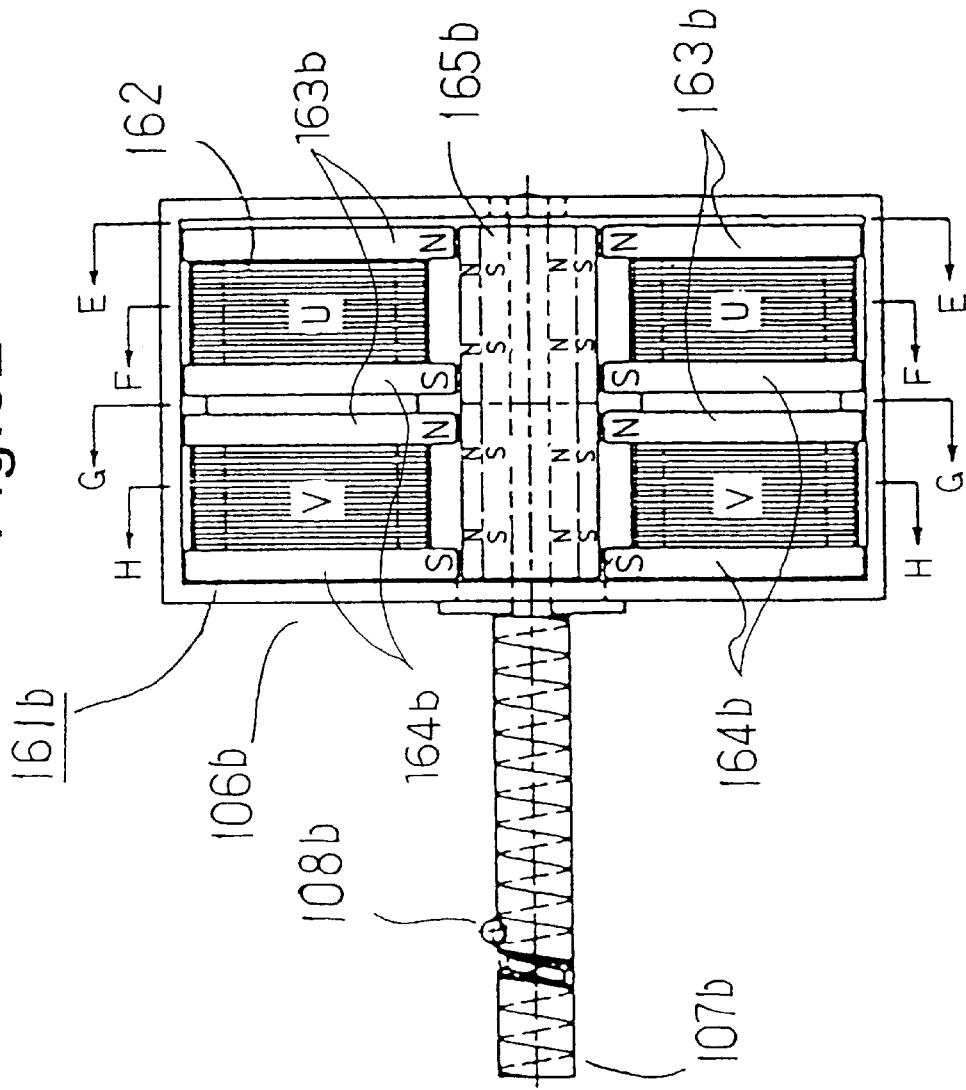
FIG. 32 shows a top view showing the construction of head drive actuator in accordance with Embodiment 14 of this invention.
Figure 33:
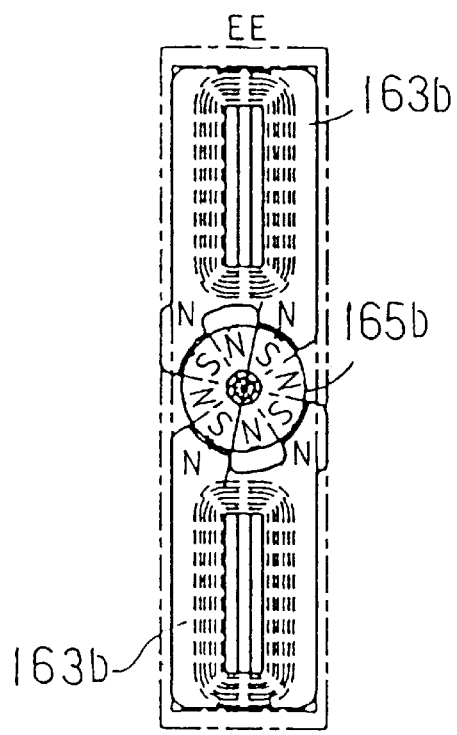
FIG. 33 shows a side sectional view in E—E direction indicated in the top view of head drive actuator of FIG. 32 in accordance with Embodiment 14 of this invention.
Figure 34:
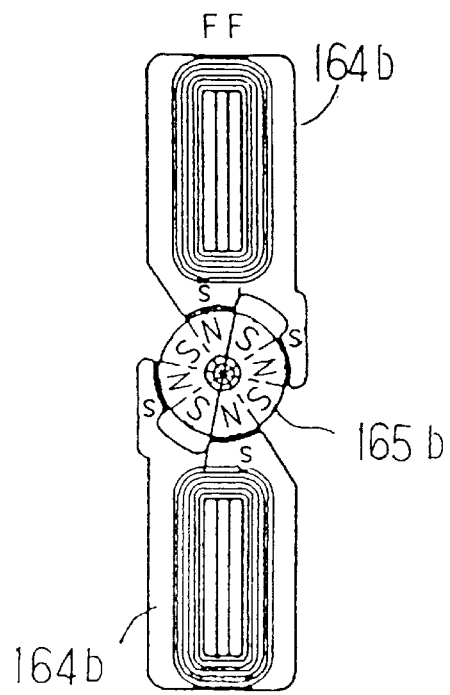
FIG. 34 is a side sectional view in F—F direction indicated in the top view of head drive actuator of FIG. 32 in accordance with Embodiment 14 of this invention.
Figure 35:
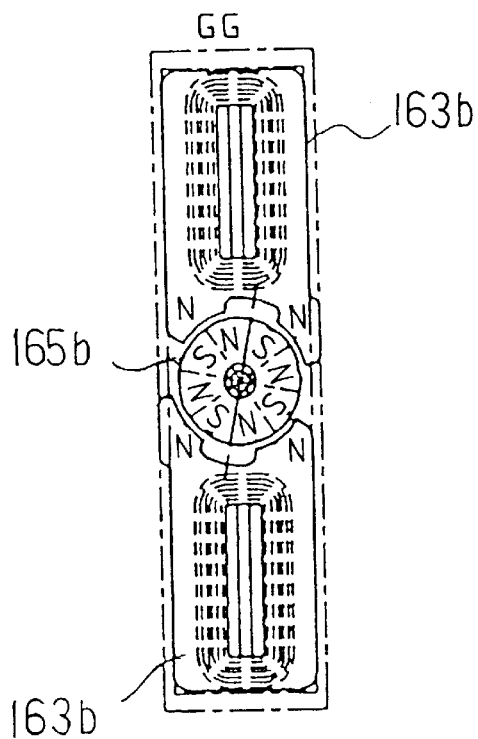
FIG. 35 is a side sectional view in G—G direction indicated in the top view of head drive actuator of FIG. 32 in accordance with Embodiment 14 of this invention.
Figure 36:
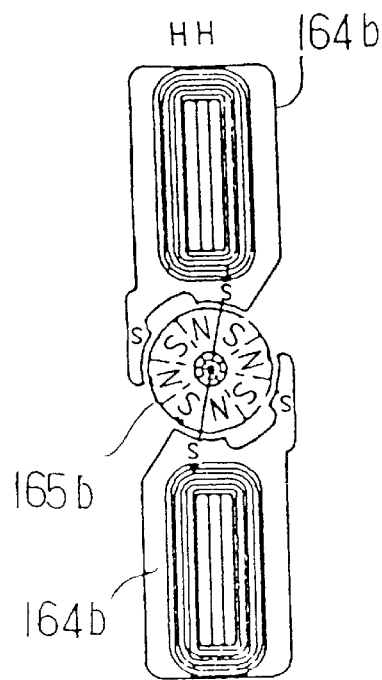
FIG. 36 is a side sectional view in H—H direction indicated in the tope view of head drive actuator of FIG. 32 according to Embodiment 14 of this invention.

This embodiment shows another example of the head drive actuator described in Embodiment 13. FIG. 32 shows a top view of step motor 106b of this embodiment with shield cover 169 removed, and indicates the construction of the rotor and the stator. Furthermore, FIG. 33 is a cross sectional view seen from E—E point shown in FIG. 32 to the direction of arrow. FIG. 34 is a cross sectional view seen from F—F point shown in FIG. 32 to the direction of arrow. FIG. 35 is a cross sectional view seen from G—G point shown in FIG. 32 to the direction of arrow. FIG. 36 is a cross sectional view seen from H—H point shown in FIG. 32 to the direction of arrow.

In the figure, stator 161b is made up of coil 162, and a first stator yoke 163b, and a second stator yoke 164b. First stator yoke 163b and second stator yoke 164b are provided with two teeth on the surface opposite to rotor 165b which is explained later as shown in FIG. 33 through FIG. 36. The position of teeth of stator yoke 163b in FIG. 33 and that of stator yoke 163b in FIG. 35 are symmetrically arranged. Similarly, the teeth of stator yoke 164b of FIG. 34 and those of stator yoke 164b in FIG. 36 are arranged symmetrically. Therefore, first stator yoke 163b differs from second stator yoke 164b by 180° in phase angle and 45° in machine angle. Stator yoke 163b in FIG. 33 differs from stator yoke 164b in FIG. 34 by 90° in phase angle and by 22.5° in machine angle because they are arranged to be symmetrical when they are reversed. Unlike rotor 165 of Embodiment 13, rotor 165b is radially magnetized at 8 polers toward the direction of circumference. Among coils 162 shown in FIG. 32, coil U and coil V are not shown in the figure, but coil U bar and coil V bar having a phase angle different by 180° from each other can be formed by running reverse current to them. Based on the construction explained above, the drive method of Embodiment 14 is a bipolar method and a step motor driven at 22.5° in step angle at the time of driving with one phase excitation can be achieved.

According to this embodiment, because coils 162 are arranged on both sides of rotor 165b similarly to Embodiment 13, the turns of the coil can be increased. It is therefore advantageous in that the torque required to perform carriage drive is outputted and the head drive actuator itself can be made thinner. Moreover, because the step motor of this embodiment applies a general bipolar method as its drive method, a drive circuit on the market can be employed.
Embodiment 15.

This embodiment shows one example of the recording medium cartridge of this invention.

Figures 38A, 38B:
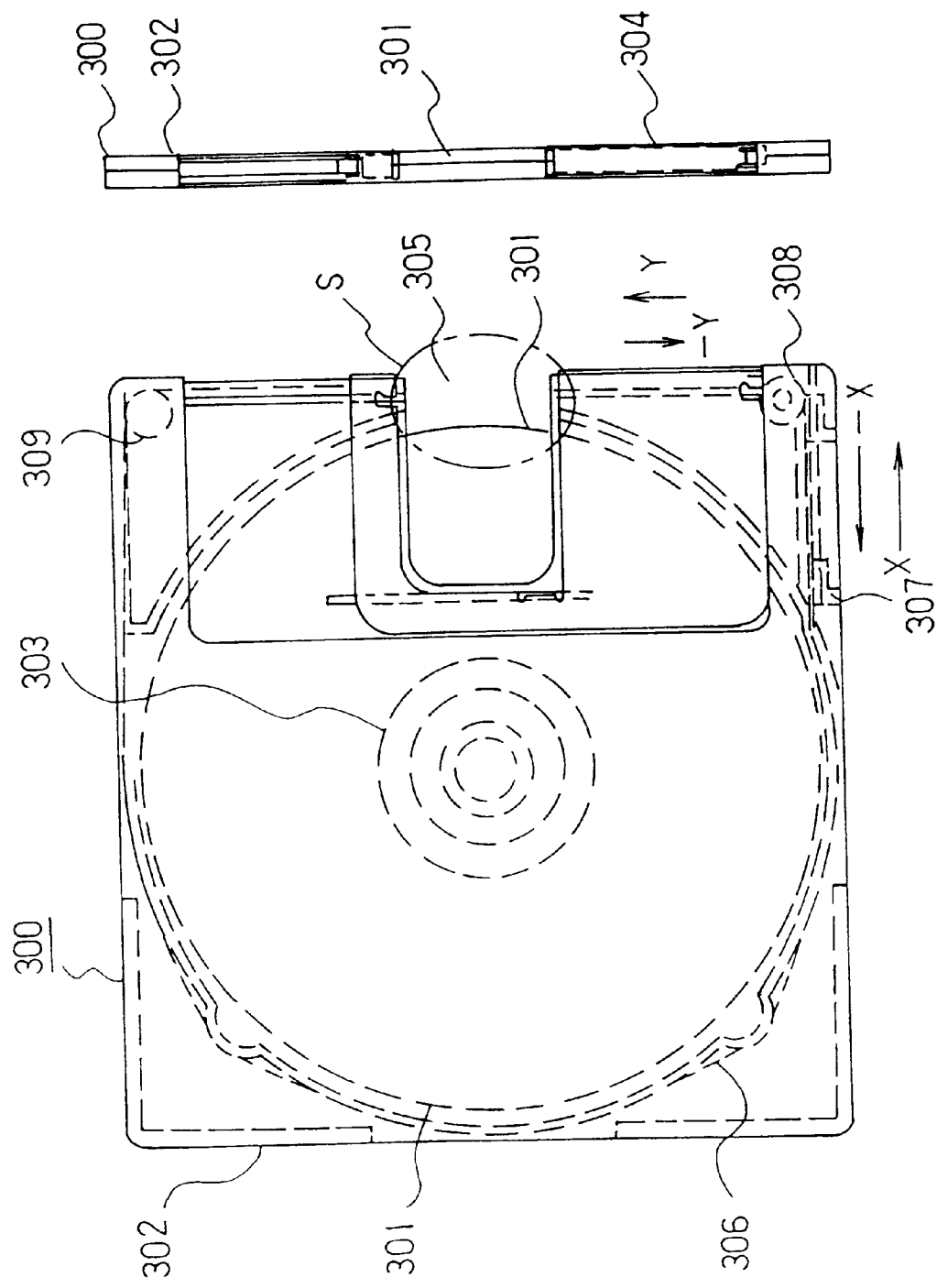
FIGS. 38A and 38B show the top view and side view of the recording medium cartridge when the shutter is opened according to Embodiment 15 of this invention.

FIG. 37A and FIG. 37B show the state in which a shutter is being closed. FIG. 37A gives its top view and FIG. 37B is the side view. FIG. 38A and FIG. 38B show the opening state of the shutter. FIG. 38A is the top view, and FIG. 38B is the side view.

In the figures, an opener band 306, an opener latch 307, guide rollers 308 and 309 are shown. Although not shown in the figures, this construction is possible to apply tension to at least one point of opener band 306. Opener band 306 is connected with shutter 304 on its both ends and connected with opener latch 307 in halfway. As shown in FIG. 38A, when recording medium cartridge 300 is inserted into the direction of X, opener latch 307 is moved toward the direction of –X by the lever provided to the storage device. As this opener latch 307 and shutter 304 connected with each other by opener band 306 are pulled in the –Y direction, window 305 is released, thereupon exposing recording medium 301. At this time, no part material for cartridge case 302 nor part material for shutter 304 exist in area S. In order to pull out recording medium cartridge 300 in the opposite direction, opener latch 307 is moved in the X direction by the lever of the storage device, and shutter 304 is moved in the Y direction by the connected opener band 306, and window 305 closes.

According to this embodiment, shutter 304 can be opened or closed by opener band 306. When shutter 304 is in the opened state or closed state, by keeping this state with opener latch 307, malfunction of shutter opening and closing can be prevented. In addition, when shutter 304 is in the opened state, area S is exposed entirely, thus making it possible to reduce the avoidance operation of the read/write head of the FDD using this recording medium cartridge. It is therefore advantageous in getting thinner FDDs. On top of that, effects indicated above can be achieved by means of relatively simple construction so far set forth.

The FDD of this invention is a device which is compatible with a card type storage that can be inserted into and removed from an information processing device. The recording medium or recording medium cartridge are to be replaced. The FDD of the present invention is characterized by the recording medium drive actuator to rotate the recording medium, the head to read or write data on the recording medium, the carriage on which to mount the heads, the head drive actuator to determine the moving position of the heads, the mechanism to insert or remove the recording medium from the storage, the circuit to control the read/write operation and the recording medium drive actuator, and so on, and the connector that connects or disconnects the storage.

Another prime characteristics is that the thickness and the width of the device are less than 5 mm and 54.1 mm, respectively.

Moreover, the recording medium is characterized in that it is contained in the cartridge of less than 1.8" in diameter, less than 2 mm in thickness, and less than 54 mm in width.

In addition, the recording medium or recording medium cartridge is loaded or unloaded by inserting or removing it in the same direction to the FDD.

With respect to the center of the rotor of the recording medium drive actuator, it has a function of centering the recording medium and determining the rotation center. It is supported by springs, and so on, and preloaded, and has one or more balls which can be floated or sunk or rotated. The rotor has a chucking magnet to suck the hub supporting the recording medium, and the hub is provided with taper surface on its outer circumference. The rotor has the hole or dent to be connected to the ball in the center.

With respect to the vicinity of the rotor center of the recording medium drive actuator, it is provided with three or more balls or needles having the function of centering the recording medium and determining the rotation center. There is also a retainer which retains and engages rotating balls or needles freely. The center of the rotor is provided with a chucking magnet to suck the hub connected with the recording medium.

With respect to the rotor of the recording medium drive actuator, it has a spring material with a projection or a hole having the function of centering the recording medium or determining the rotation center, and the space for the displacement of spring materials and so on. The recording medium has the hole or projection which engages with the above mentioned projection or hole.

Part of the carriage can be rotated. At the end of the carriage, the head is held by means of the arm, which rotates in line with the insertion or removal of the recording medium or recording medium cartridge. The head, therefore, touches or leaves from the recording medium. That is, the head touches the recording medium when the recording medium or recording medium cartridge is inserted, and the head leaves from the recording medium when the recording medium or recording medium cartridge is removed.

In addition, it is characterized in that the recording medium or recording medium cartridge is inserted or removed from the recording medium cartridge holder which opens or closes slantly against the cabinet of the storage device.

Moreover, it is characterized in that it is provided with the recording medium cartridge holder which contains the recording medium cartridge to be inserted slantly and works as a protective cover of the storage, and the sub cover which covers the recording medium cartridge holder from the top surface.

Furthermore, the recording medium cartridge holder and the sub cover have their independent rotation pivots. The rotational radius of the sub cover is smaller than the rotational radius of the recording medium cartridge holder. The rotational pivot of the sub cover is inside the rotational pivot of the recording medium cartridge holder, and it rotates in line with the rotation of the recording medium cartridge holder. When the recording medium is inserted, a space is created between the sub cover and the recording medium cartridge holder so that the avoidance of the head is made possible.

It is also characterized in that the rotation radius of the sub cover is larger than the rotation radius of the medium holder, as the rotation pivot of the sub cover is outside of the rotation pivot of the recording medium cartridge holder. The sub cover rotates in line with the rotation of the medium holder. When the recording medium is inserted, a space is created between the recording medium cartridge holder and the sub cover so that the avoidance of the head can be made possible.

In addition, part of the carriage on which to mount the read/write head can be rotated. The arm is provided according to the rotation of the recording medium cartridge holder, and the head is provided at the end of the arm by means of spring materials and so on.

In addition, the recording medium drive actuator of this invention is characterized in that it is provided with the stator, drive coil wound around the teeth of the stator, and the rotor, where, the coil is wound by bobbins of magnetic material and fixedly inserted to the stator.

It is also characterized in that the stator is provided with one block or more, one block being made up of the teeth the number of which is equivalent to the number of drive phases. The coil is wound by bobbins of magnetic material and fixedly inserted to the stator.

The bobbins are characterized in that they are shaped in the abbreviated form of Japanese katakana ko, or ro, or abbreviated circular.

The bearing of the recording medium drive actuator is characterized in that it is placed on the outer circumference of the rotor connected with the rotor yoke supporting the rotor magnet, and an avoidance space is created at the rotor center for the centering balls.

The bearing of the recording medium drive actuator is characterized in that it is made up of the cylinder with a built-in part of the rotor yoke supporting the rotor magnet, and the balls or the ball bearing.

The head drive actuator of this invention is made up of the rotor of abbreviated cylinder magnet supported for free rotation or the rotor consisted of the magnet and the rotor yoke, the stator yoke provided horizontally as opposed to the rotation shaft of the rotor as the symmetry shaft, and drive coil, to perform a step drive by a certain angle.

The head drive actuator of this invention is characterized in that it has the lead screw having spiral grooves that connect and slide against the cylindrical needles set on the carriage on which to mount the head, and the rotor connected with the lead screw, and the pivot bearing that accepts the end of the lead screw at the end of the lead screw, and the spring that provides preload from the other end of the lead screw. By performing a step rotation by a certain angle, the drive position of the carriage is determined.

The head drive actuator of this invention is characterized in that it has the thickness of less than 5 mm.

It is also characterized in that it has the rotor magnet magnetized in the direction of rotation shaft of the rotor, and the rotor yoke, and the stator yoke that opposes these rotor yokes from a certain gap.

The rotor magnet is also characterized in that it is magnetized in the radial direction of the rotation shaft.

The stator and rotor are characterized in that they are constructed by paired parts or more.

The recording medium cartridge of this invention is characterized in that it has the case and the shutter, and the shutter is set to open and close in the direction perpendicular to the insertion of the cartridge into the storage, and the latch for opening and closing the shutter is provided on the side of the cartridge, and the latch and the shutter are connected with a band.

The recording medium cartridge is characterized in that the insertion direction side, or part of materials of the outer circumference of the shutter for opening or closing the window through which the read/write head makes an access and the cartridge case into the storage, are removed.

Embodiment 16.

Figure 40:
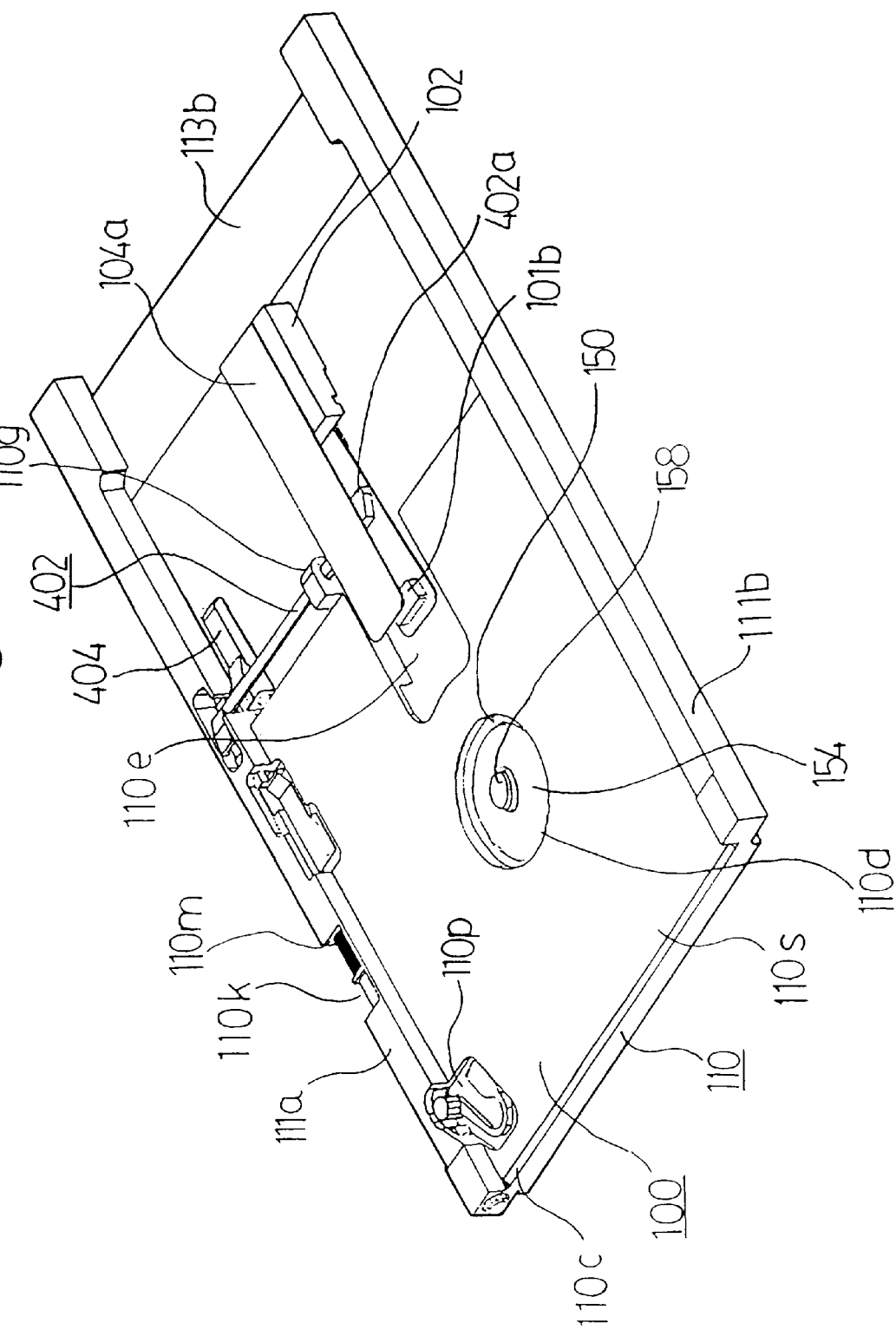
FIG. 40 shows an inner structure of the FDD according to embodiment 16 of this invention.
Figure 41:
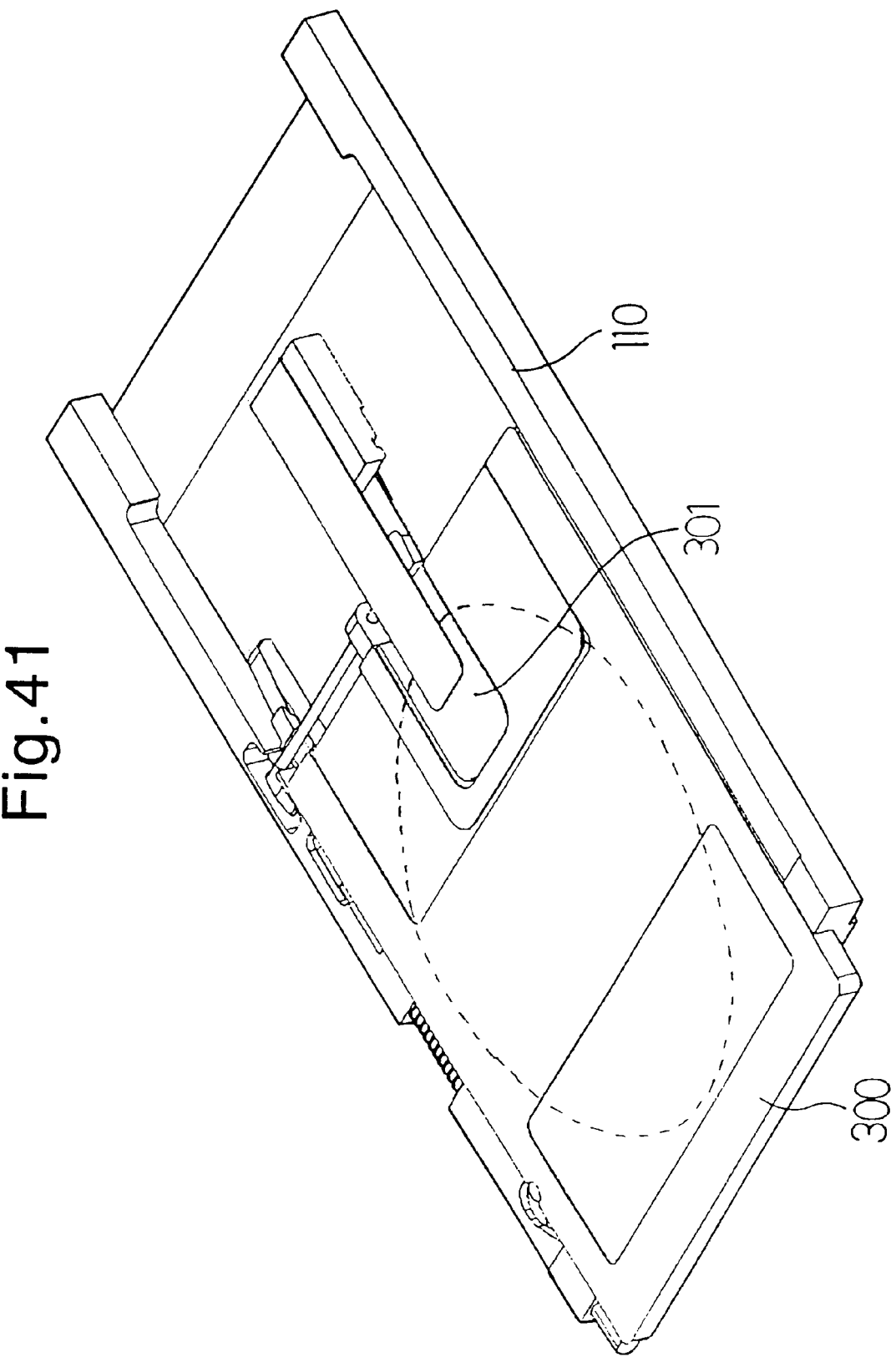
FIG. 41 shows a perspective view of the FDD according to embodiment 16 of this invention.
Figure 42:
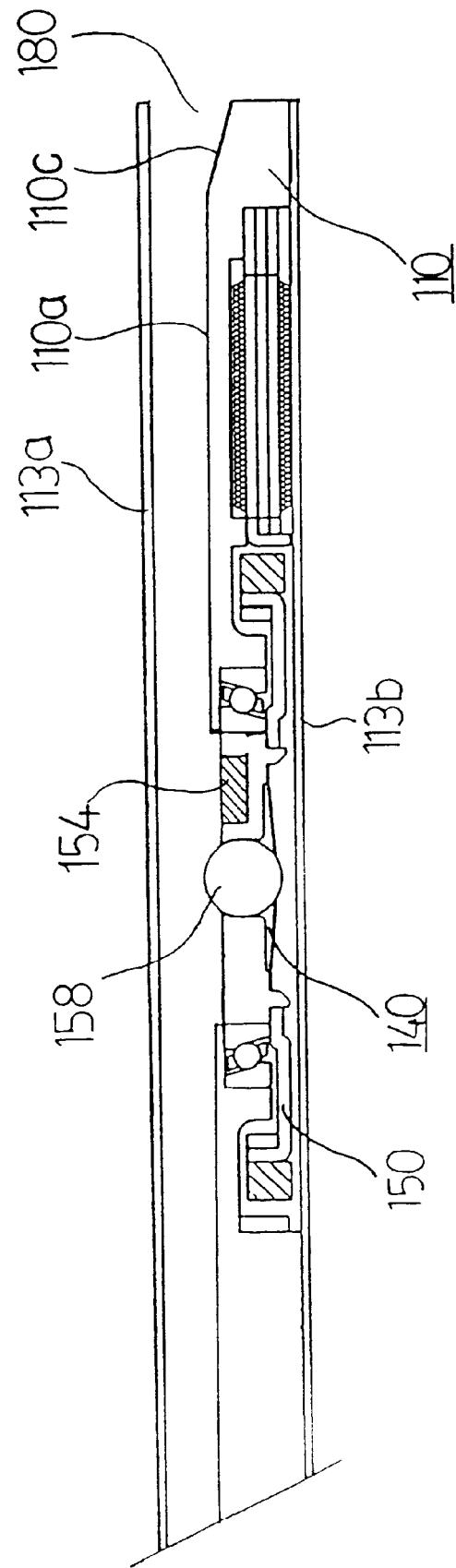
FIG. 42 shows a side cross sectional view of the FDD according to embodiment 16 of this invention.

Hereinafter, an embodiment of the present invention will be described with reference to the attached figures. FIG. 39 shows a perspective view of an external sight of the FDD unit 100. FIG. 40 shows a perspective view of the structure of the internal of the FDD unit 100 in which the upper cover 113*a* is removed. FIG. 41 shows a perspective view of the FDD unit 100 in which the upper cover 103*a* is removed and the recording medium cartridge 300 is mounted. FIG. 42 shows a part of the cross sectional side view of the FDD unit 100.

In the figure, a frame 110 supports the whole of the FDD unit 100. In the frame 110, a cartridge receiving face 110*s* is a face to mount the recording medium cartridge 300 horizontally. Side wall parts 111*a* and 111*b* extend in the longish direction of the unit and are mounted in the vertical direction to the cartridge receiving face 110*s*. The frame 110 is opened forwardly and a taper face 110*c* is provided so that the recording medium cartridge 300 is inserted easily. An insertion and ejection port 180 of the cartridge protects the internal of the frame 110 and the FDD unit 100. The insertion and ejection port 180 is composed of the upper cover 113*a* mounted on the top face of the FDD unit 100. The center of the cartridge receiving face 110*s* has a circular center hole 110*d*. On the other side of the insertion and ejection port 180 from the center hole 110*d*, a rectangular head access portion 110*e* which extends in the longish direction is provided. The frame 110 is sandwitched between the upper cover 113*a* and the lower cover 113*b*. The external shape of the FDD unit 100 covered by both of the covers 113*a* and 113*b* is in accordance with type 2 of PCMCIA. Under the frame 110, the recording medium drive actuator 140 for rotating and driving the recording medium 301 in the recording medium cartridge 300 is located. The recording medium drive actuator 140 is composed of a dishing shape of rotor 150, the chucking magnet 154 to absorb a metal hub, not shown in the figure, fixed in the recording medium 301 the centering ball 158 which is the center of rotation of the rotor 150 and so on. The centering ball 158 and the chucking magnet 154 are facing to the upper side of the cartridge receiving face 110*s* through the center hole 110*d* of the frame 110.

Figure 43:
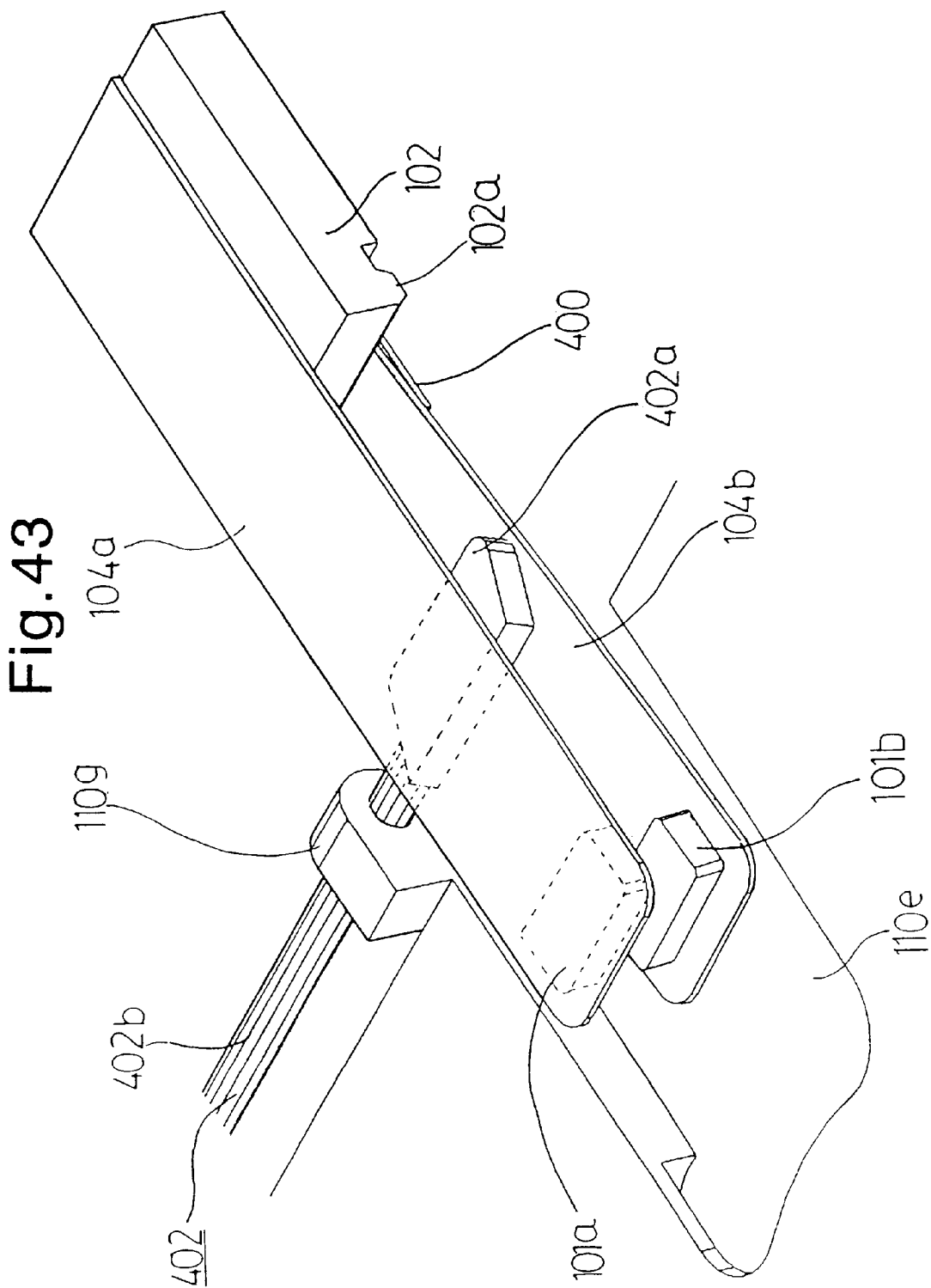
FIG. 43 shows a perspective view seen from the direction of the top face of the storage around a read/write head according to embodiment 16 of this invention.
Figure 44:
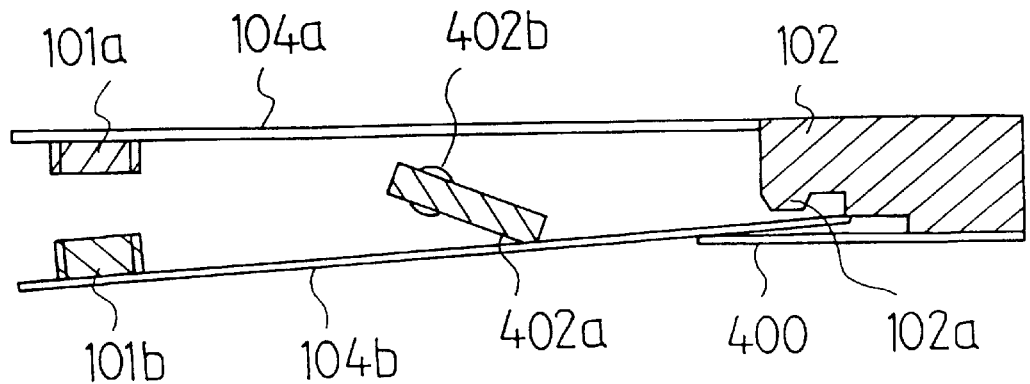
FIG. 44 shows a cross sectional side view of an outskirts of the read/write head according to embodiment 16 of this invention.
Figure 45:
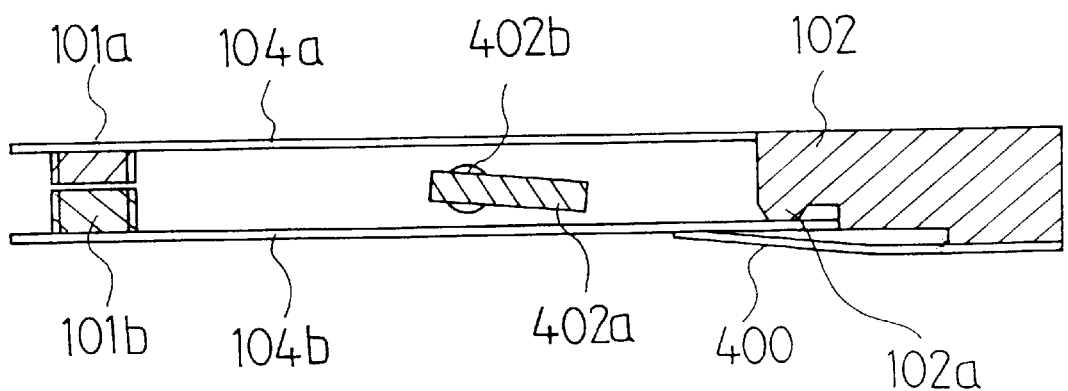
FIG. 45 shows a cross sectional side view of the outskirts of the read/write head according to embodiment 16 of this invention.
Figure 46:
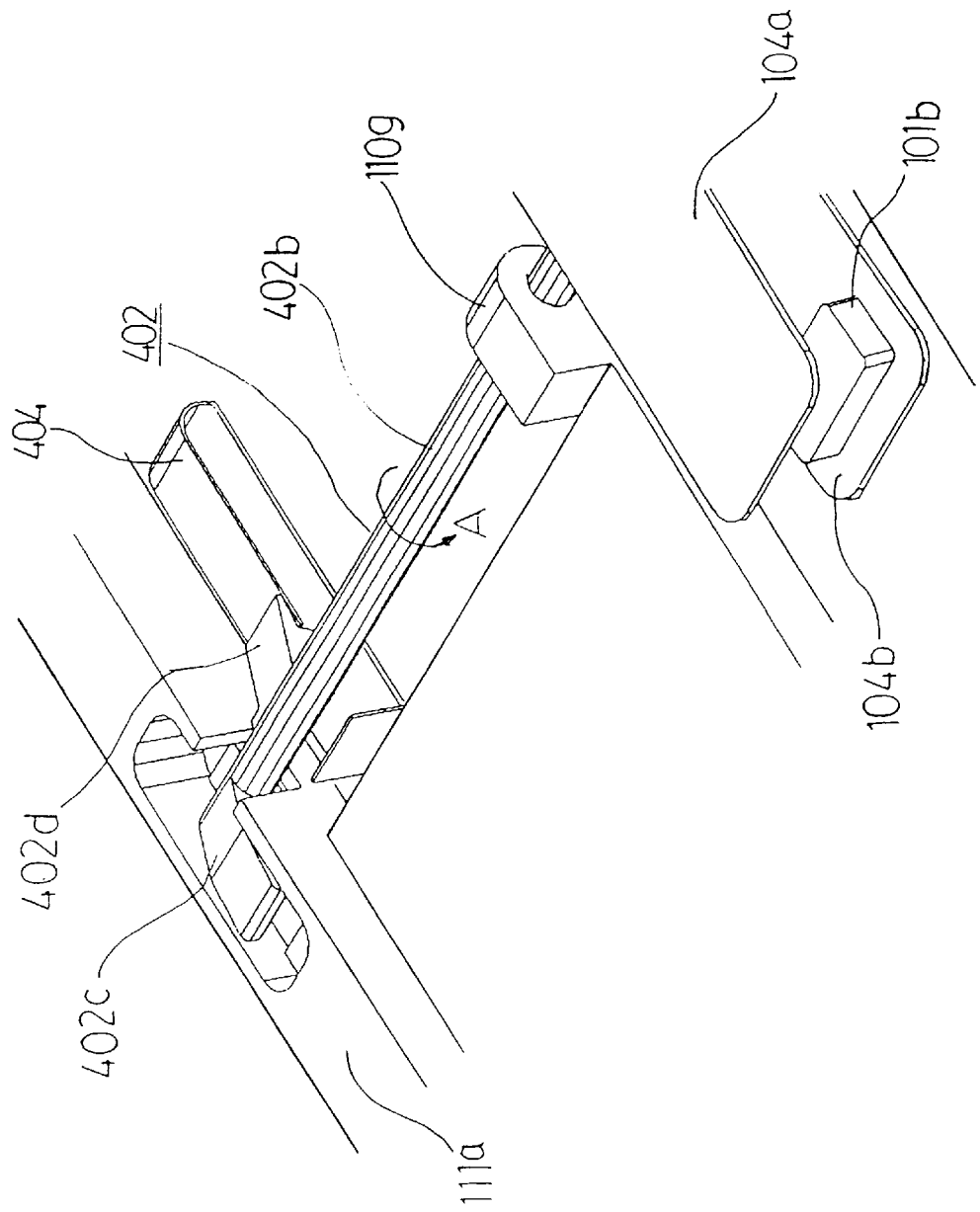
FIG. 46 shows a perspective view of the outskirts of the read/write head and a head unload mechanism according to embodiment 16 of this invention.
Figure 47:
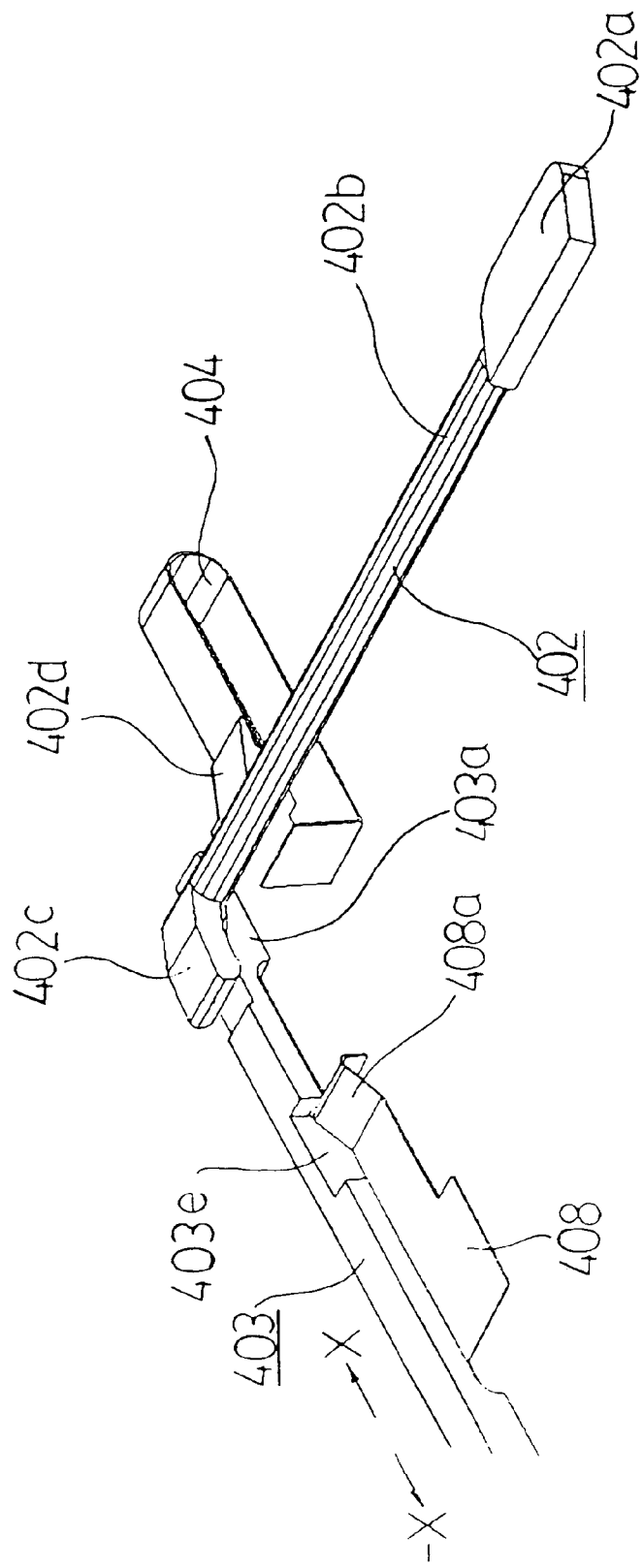
FIG. 47 shows a perspective view of the read/write head and the head unload mechanism according to embodiment 16 of this invention.

FIG. 43 shows an enlargement of the outskirts of the head access portion 110e of the frame 110 and a perspective view seen from the top face of the FDD unit 100. FIG. 44 shows a side cross sectional view of unload state in which the read and write procedure cannot be performed and the head 101 is unloaded. FIG. 45 shows a side cross sectional view of the load state in which read/write procedure is possible. FIG. 46 shows a perspective view of a head unload mechanism. FIG. 46 shows a perspective view seen from the top face of the FDD unit 100. FIG. 47 shows a perspective view of the FDD unit 100 wherein the frame 110, head frames 104a and 104b in FIG. 46 are removed and only the head unload mechanism is left.

In the figure, at the head access portion 110e, a read/write head 101 is located to read and write the information for the recording medium 301. An upper head 101a is situated on the side of the cartridge receiving face 110s and a lower head 101b is situated on the side of the bottom. Further, both of the heads 101a and 101b are positioned respectively against each of the ends of the upper arm 104a and the lower arm 104b extending in the longish direction. The other ends of the arms 104a and 104b are situated on the carriage 102. With the carriage 102, both of the arms 104a and 104b move back and forth by the head drive actuator (not shown in the figure). The end of the upper arm 104a is fixed on the carriage 102 and the lower arm 104b has a rotation support at the carriage 102. By using the lower arm spring 400 composed of flexible plate material whose end is fixed at the carriage 102, the lower arm 104b is always given a tension in the direction of being shut with the upper arm 104a. The carriage 102 has a peaking shape of arm stopper 102a, which regulates the rotation angle of the lower arm 104b toward the side of the upper arm 104a. The lower arm 104b is restricted to rotate within a range of a defined angle. A head lifter 402 is composed of a lifter 402a, an unload lever 402b, a rotating force receiver 402c, and a tension receiver 402d. In order to make the lower head 101b enter to the load state or the unload state, the lifter part 402a rotates when the unload lever 402b rotates. Then, by moving the lower arm 104b up and down, the load state or the unload state is achieved. The unload lever 402b is supported to be rotatable freely by a lever supporter 110g. The lever supporter 110g is mounted on the frame and sticking out from the frame 110.

The other end of the lifter 402a of the head lifter 402 has the rotating force receiver 402c. The rotating force receiver 402c receives the transmission force from the eject shaft 403 and rotates the unload lever 402b. An tension receiver 402d is positioned a little nearer the lifter part 402a than the rotating force receiver 402c and always give the rotating force to the unload lever 402b. The tension receiver 402d receives the tension from almost U-shaped rotating force spring 404 whose end is fixed on the frame 110. By giving the force in the direction to which both faces of the U-shape encounters are separating, the tension receiver 402d always tends to rotate to the side of the upper cover 113a, namely, in the direction of an arrow A in the figure. The rotating force receiver 402c is located in the side wall part 111a of the frame 110. The rotating force receiver 402c has a top bent on the side of the lower cover 113b. The top contacts an end part 403a of the eject shaft 403.

Figure 48:
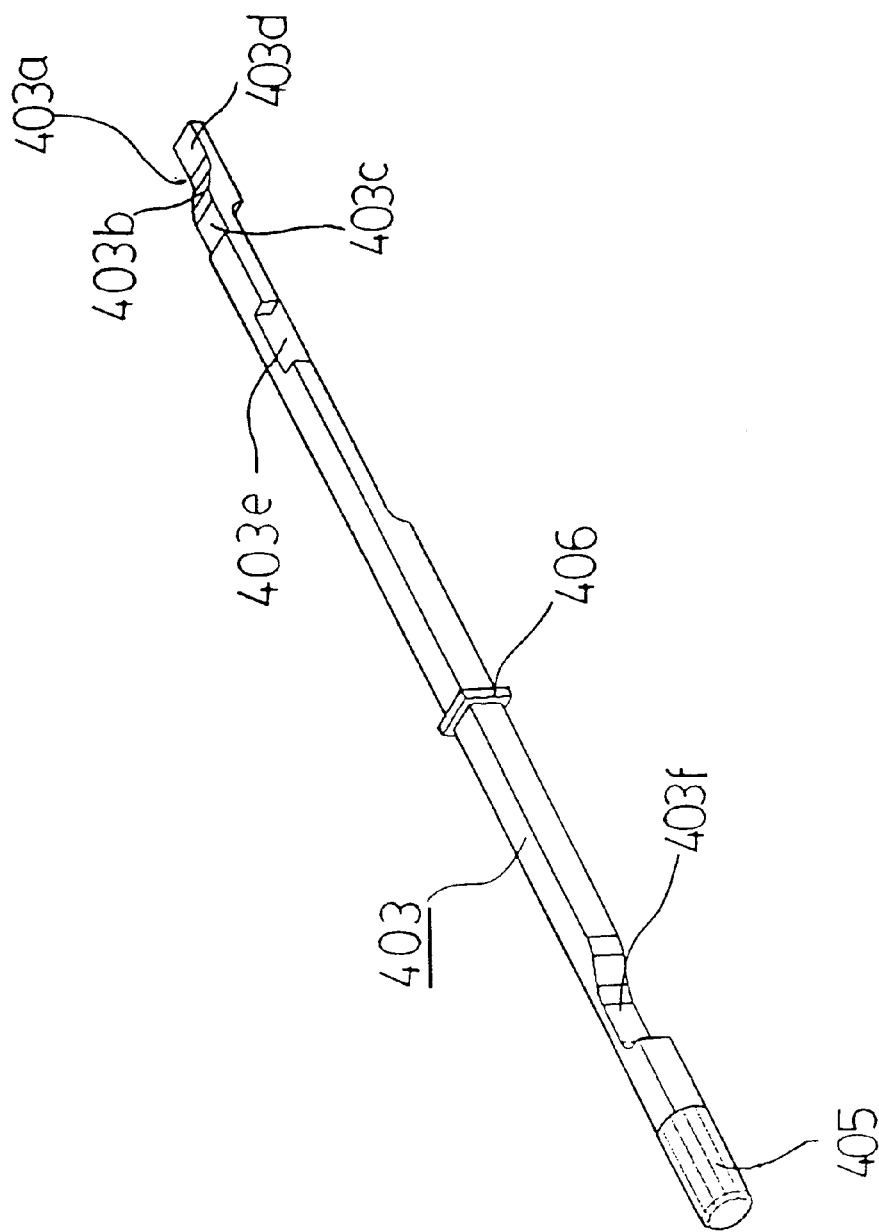
FIG. 48 shows an external perspective view of an eject shaft according to embodiment 16 of this invention.

FIG. 48 shows an external perspective view of the eject shaft 403. The eject shaft 403 is able to slide in the longish direction in the side wall part 111a of the frame 110. An eject button 405 is fixed at an end of the eject shaft 403 on the side of the insertion and ejection port 180. The other end is a terminate part 403a by decreasing the thickness of the eject shaft 403 to the end part. The eject shaft 403 has a spring stopper 406 a at almost center part of the longish body. The spring stopper 406 engages with a coil spring around the eject shaft 403.

Figure 49:
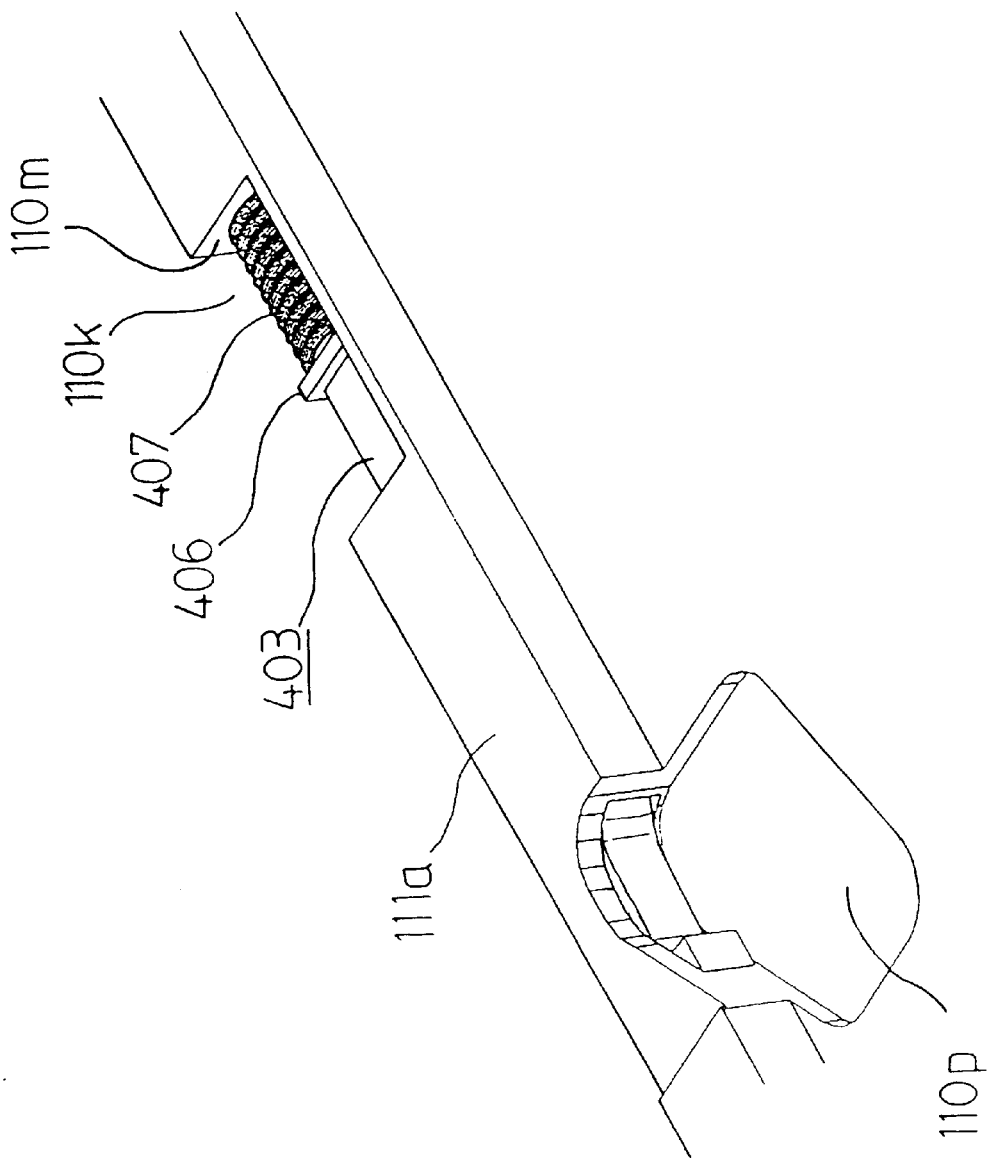
FIG. 49 shows a perspective view of the outskirts of the eject coil spring of the frame side wall part according to embodiment 16 of this invention.

FIG. 49 shows a perspective view of the side wall part 111a having a notch 110k. The notch 110k gives an open port from outside. In the notch 110k, the eject shaft 403, the spring stopper 406 and a coil spring 407 are exposed. The eject shaft 403 is placed inside of the coil spring 407. An end of the coil spring 407 contacts the spring stopper 406. The other end of the coil spring 407 contacts the spring stopper face 110m of the frame 110 on the opposite side of the insertion and ejection port 180. The length of the open port of the notch 110k is more than the length for which the coil spring 407 can heap extension operation. Therefore, the coil spring 407 extends from the spring stopping face 110m as a base position and always gives the tension to the eject shaft 403 in the direction of the insertion and ejection port 180 through the spring stopper 406.

Figure 50:
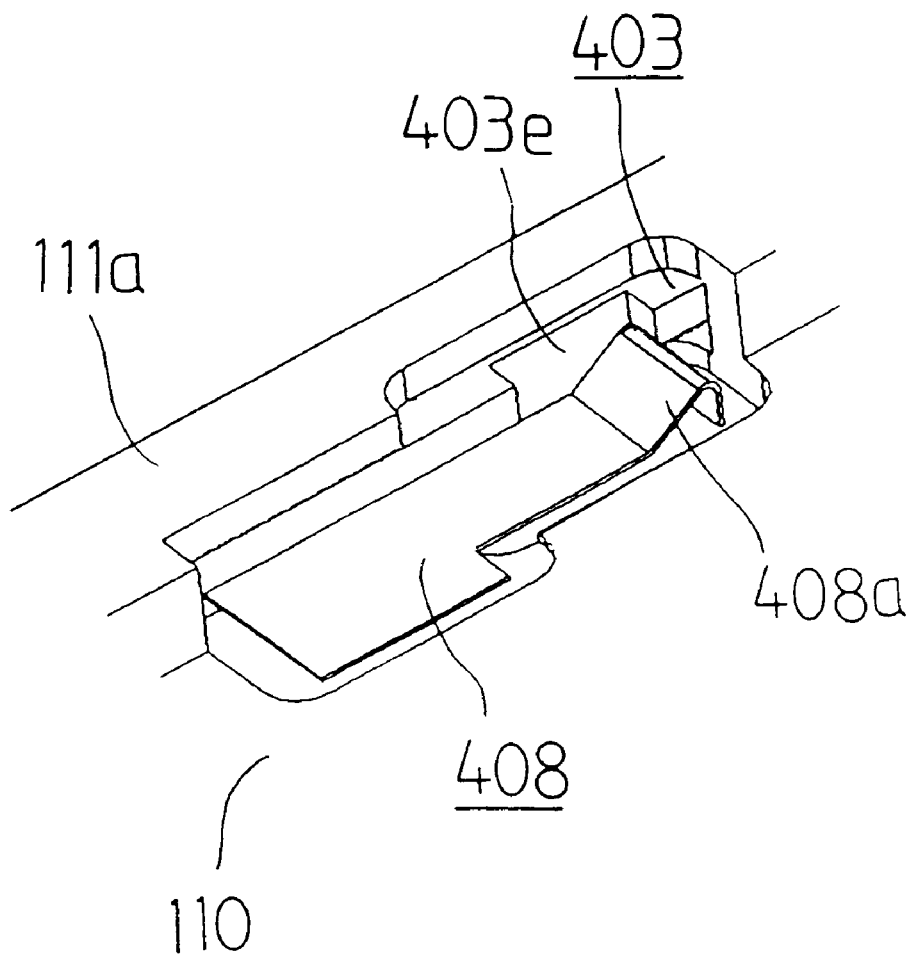
FIG. 50 shows a perspective view of the shaft barb stopper piece which controls the movement of the eject coil spring of the frame side wall part according to embodiment 16 of this invention.

FIG. 50 shows a perspective view of the shaft barb stopper 408. The shaft barb stopper 408 controls the movement in the longish direction of the eject shaft 403 by insertion and ejection of the recording medium cartridge 300. The shaft barb stopper 408 is composed of flexible plate material having an elastic force. An end of the shaft barb stopper 408 forms a curved convexity 408a and the other end is fixed on the frame 110. The convexity 408a of the shaft barb stopper 408 is engaged with a barb stopper notch 403e. The barb stopper notch is notched in the longish direction of the eject shaft 403. The convexity 408a is possible to be bent to the side of the lower cover 113b so as to release the engage state of the shaft barb stopper 408 and the barb stopper notch 403e.

Figure 51:
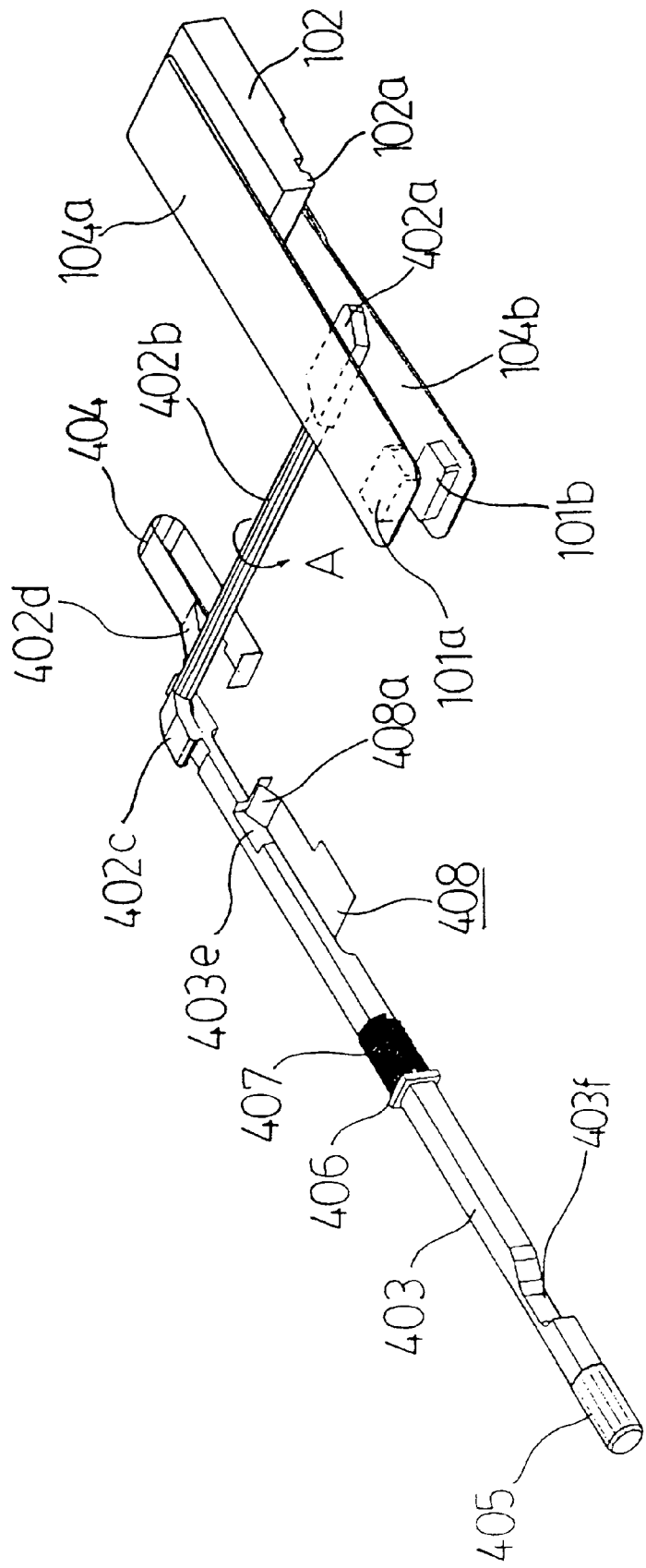
FIG. 51 shows a perspective view of the head unload mechanism under the unload state according to embodiment 16 of this invention.

Next, an explanation is made for the operation of the head unload mechanism when the recording medium cartridge 300 is inserted in the FDD unit 100. In this operation, the unload state, in which read and write procedure is impossible, changes to the load state, in which read and write procedure is possible. FIG. 51 shows a perspective view of the head unload mechanism under the unload state. In the figure, the frame 110 is not shown.

The recording medium cartridge 300 is inserted from the insertion and ejection port 180 and slides on the cartridge receiving face 110s and comes in contact with the convexity 408a of the shaft barb 408. The convexity 408a bends by being pressed by the recording medium cartridge 300 to the side of the lower cover 113b. Then, the engage state of the barb stopper notch 403e of the eject shaft 403 is released. The eject shaft 403 is forced to slide to the side of the insertion and ejection port 180 by the coil spring 407. As a result, the eject shaft 403 moves in the direction of the insertion and ejection port 180 until the spring stopper 406 contacts the frame side wall 111a on the opposite side of the spring stopper face 110m. The eject button 405 comes out from the frame 110. Under the unload state, the rotating force receiver 402c contacts the higher face 403c of the taper face 403b of the eject shaft 403, which is on the side of the insertion and ejection port 180. With the eject shaft 403 moving, the taper face 403b slides. The rotating force receiver 402c slides down the taper face 403b and contacts the lower face 403d which is on the opposite side of the insertion and ejection port 180. The rotating force receiver 402c rotates around the unload lever 402b. When the rotating force receiver 402c rotates, due to the tension of the rotating force spring 404, the unload lever 402b rotates in the direction of the arrow A in the figure. With the rotation of the rotating force receiver 402a, the lifter part 402a rotates in the same direction. When the lifter part 402a is rotated and separated from the lower arm 104b, the lower arm 104b rotates until it comes in contact with the arm stopper 102a. When the lower arm 104b contacts the arm stopper 102a, the recording medium 301 is sandwitched between the lower head 101b and the upper head 101a. Then, the load state in which read and write procedure is possible is completed.

Figure 52:
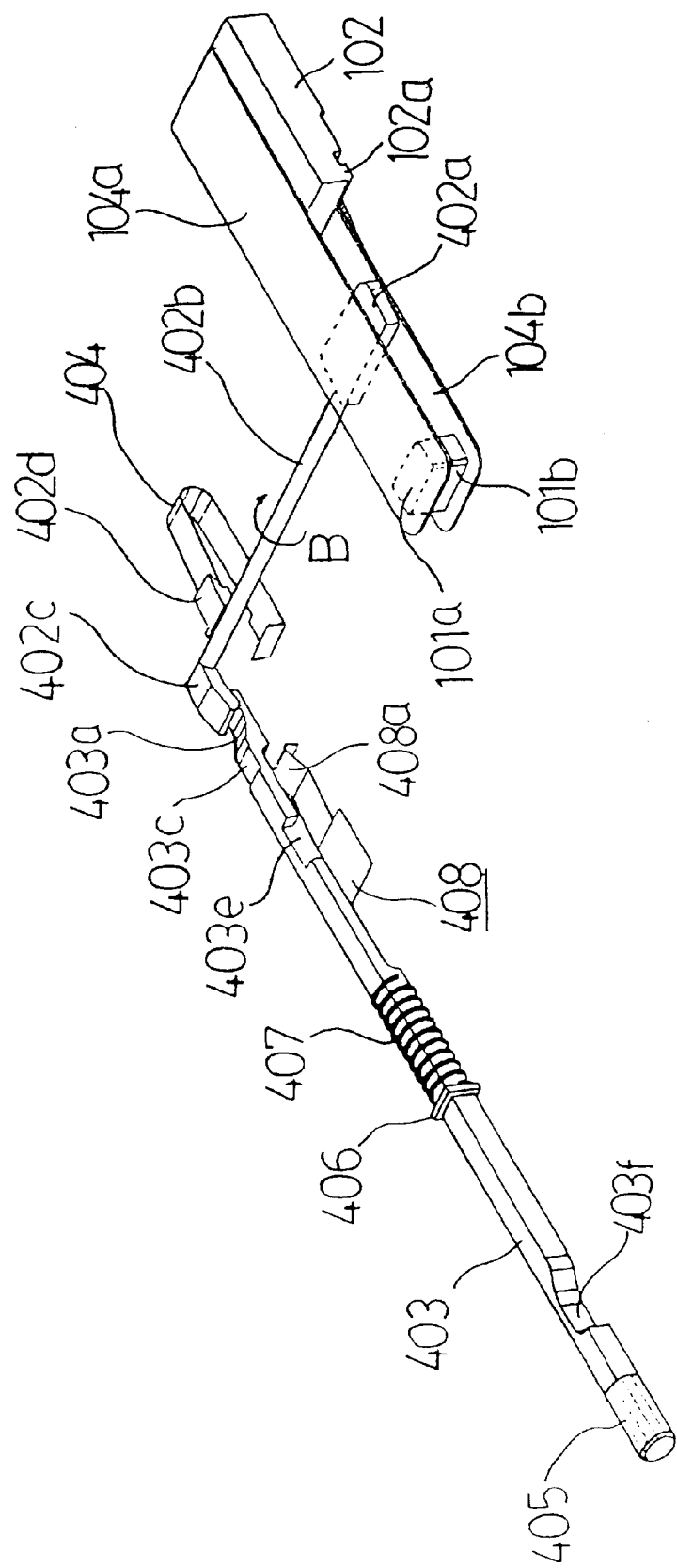
FIG. 52 shows a perspective view of the head unload mechanism under the load state according to embodiment 16 of this invention.

Next, an explanation will be made for the operation in a case where the load state moves to the unload state and the lower head 101b is unloaded. FIG. 52 shows a perspective view of the head unload mechanism under the load state. In the figure, the frame 110 is not shown. Under the load state, the eject button 405 continues to be come out from the frame 110.

When the eject button 405 is pressed against the extension force caused by the coil spring 407 of the eject shaft 403, the eject shaft 403 is moved. The rotating force receiver 402c being contacted to the lower face 403d under the load state slides on the taper face 403b when the eject shaft 403 slides and moves contacted portion to the higher face 403c. When the rotating force receiver 402c moves from the lower face 403d to the higher face 403c, the unload lever 402b rotates in the opposite direction of rotation shown by an arrow B when the unload state changes to the load state. According to the rotation of the unload lever 402b, the lifter part 402a rotates. When the lifter part 402a contacts the lower arm 104b, the lower arm 104b rotates in the direction of separating from the upper arm 104a. Accordingly, both heads 101a and 101b are separated and the sandwich state of the recording medium 301 is released. After released, the recording medium cartridge 300 is ejected up to the position not to be contacted with the shaft barb stopper 408. The shaft barb stopper 408 being bended on the side of the lower cover 113b becomes the unload state due to the elastic force. The convexity 408a engages with the barb stopper notch 403e.

Embodiment 17

In this embodiment, there is shown another embodiment related to the structure of the rotating force spring 404 and the outskirts structure.

Figure 53:
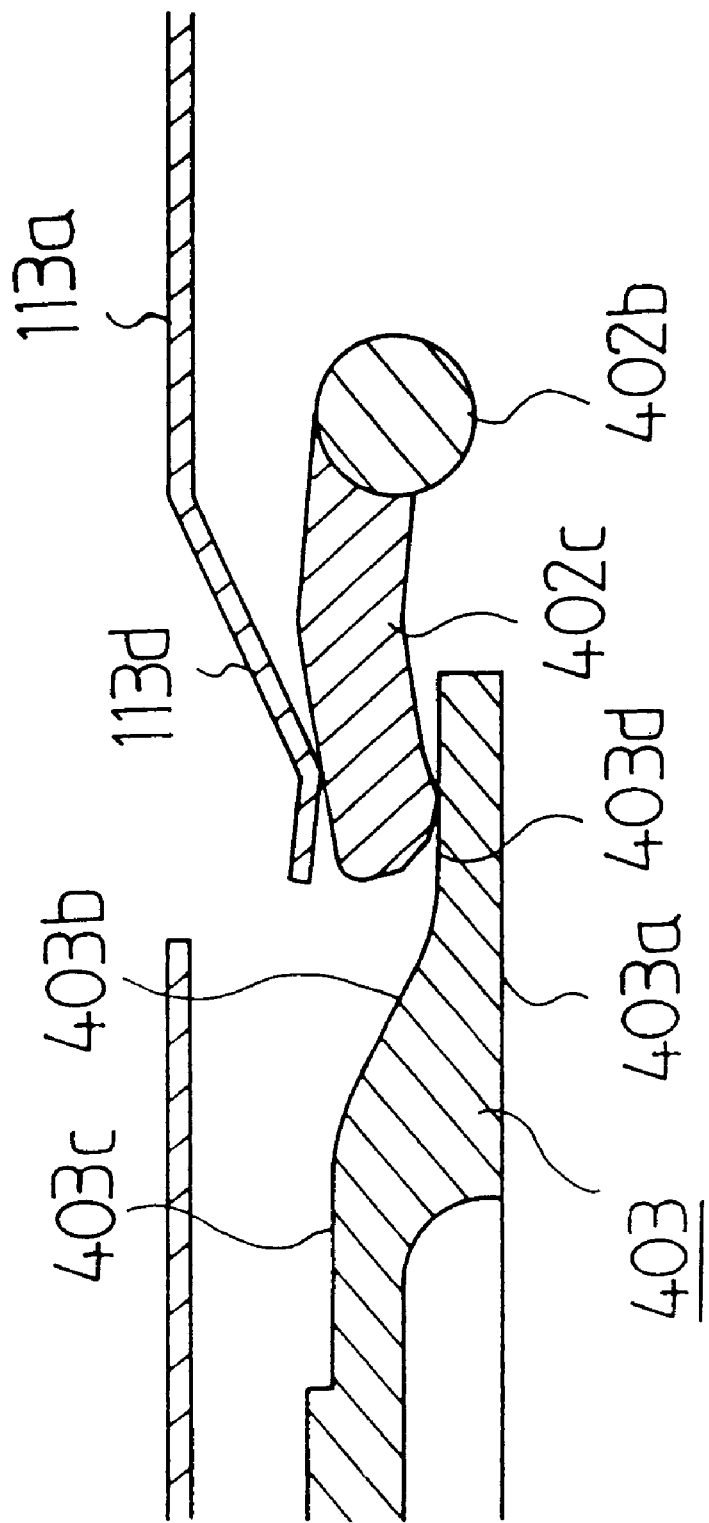
FIG. 53 shows a part of a cross sectional side view of a rotating force receiver and the outskirt of it according to embodiment 17 of this invention.

FIG. 53 shows a part of cross sectional side view of the rotating force receiver 402c which is fixed or unified in the unload lever 402b.

In the figure, an upper cover 113a covers the top face of the FDD unit 100. A rotating force receiver 402c can rotate around the shaft center of the unload lever 402b as well as the unload lever 402b and the lifter part 402a not shown in the figure. A pressure foot 113d, wherein a part of the upper cover 113a is cut and pushed down, is situated on the top of the rotating force receiver 402c.

The pressure foot 113d gives a pressure to the rotating force receiver 402c so that the rotating force receiver 402c always contacts either of the higher face 403c, the taper face 403b or the lower face 403d of the eject shaft 403.

Thus, by providing the pressure foot 113d on the upper cover 113a, the rotating force spring 404 in Embodiment 16 and the tension receiver 402d do not need to be mounted and the number of components can be reduced.

Embodiment 18

Figure 54:
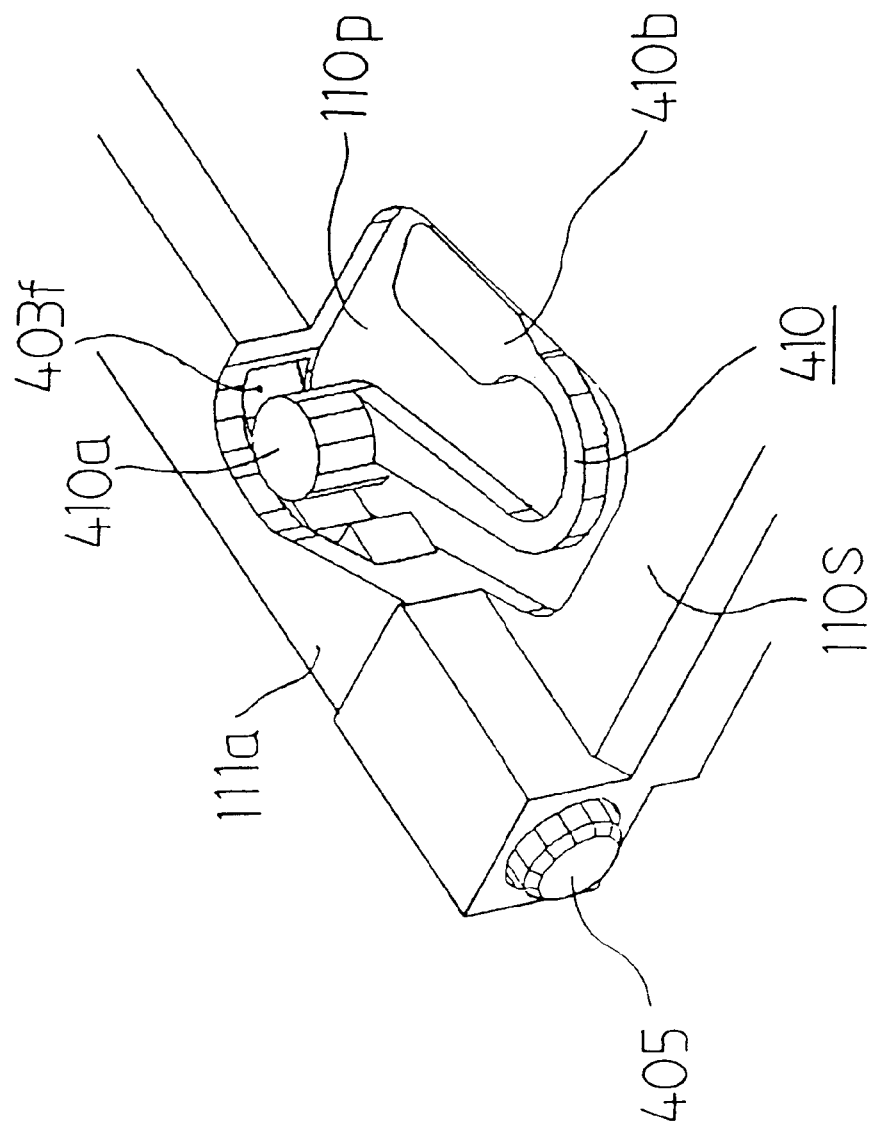
FIG. 54 shows a perspective view of the mechanism of setting position of the recording medium cartridge under the unload state of the storage according to embodiment 18 of this invention.
Figure 55:
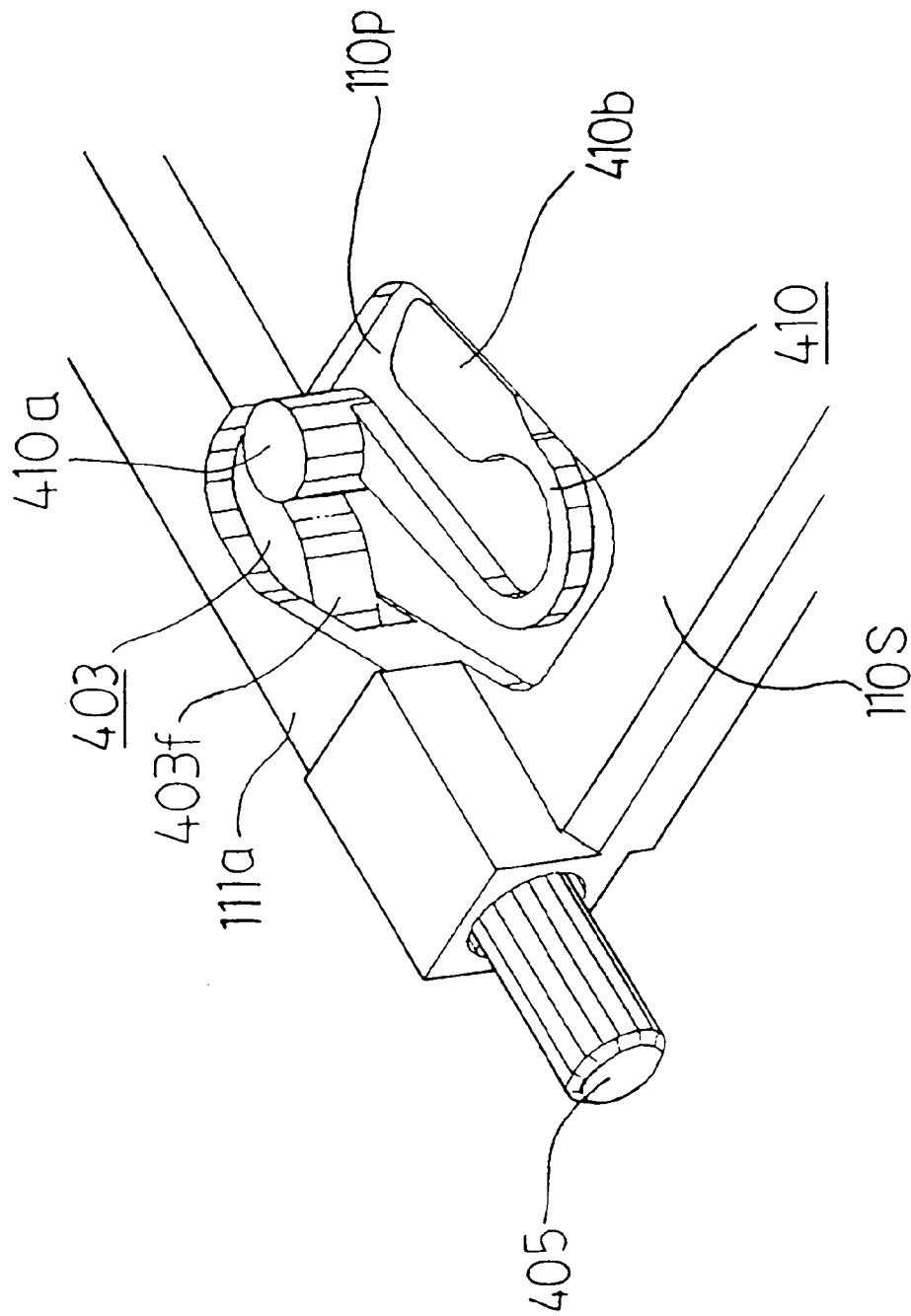
FIG. 55 shows a perspective view of the mechanism of setting the position of the recording medium cartridge under the load state of the storage according to embodiment 18 of this invention.
Figure 56:
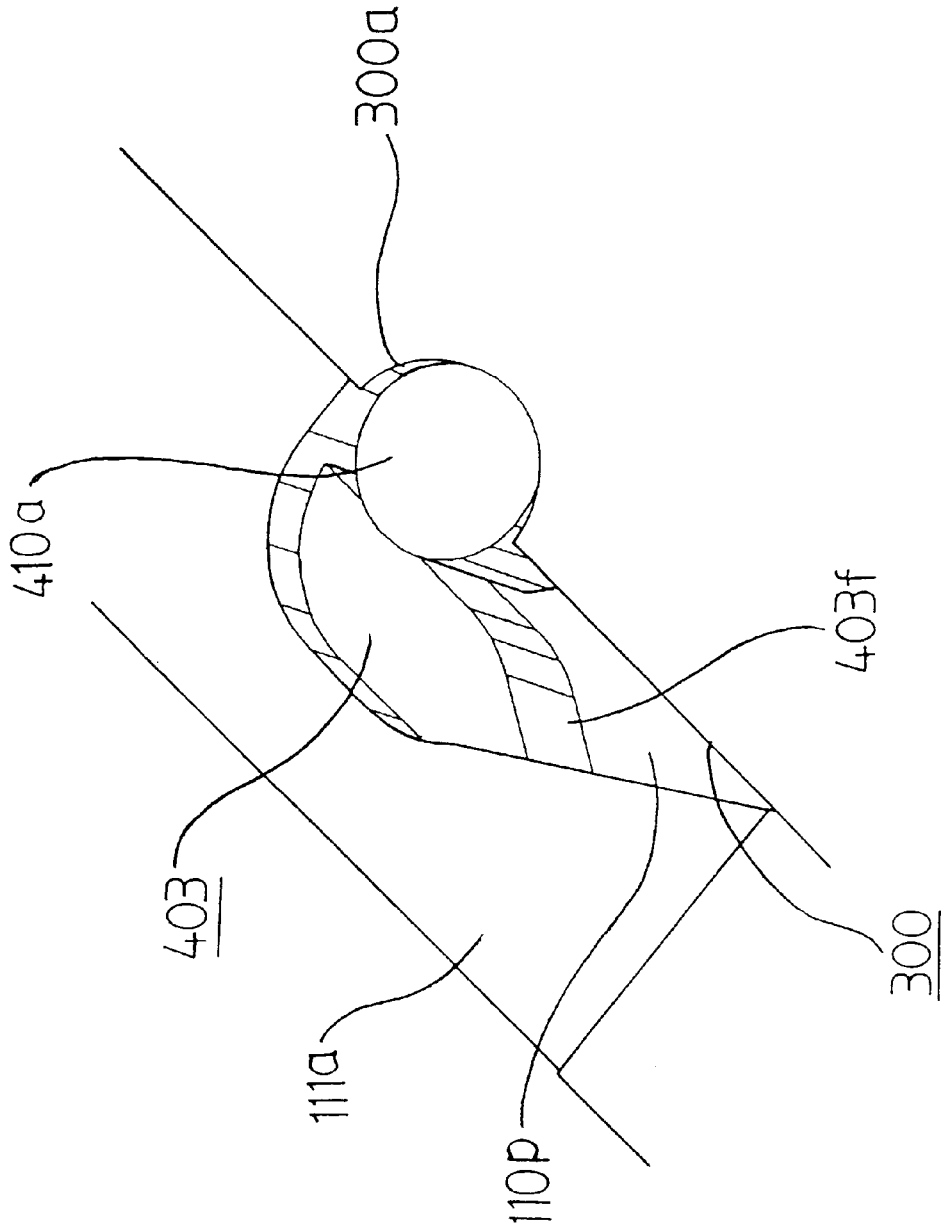
FIG. 56 shows a perspective view of the mechanism of setting the position of the recording medium cartridge under the load state of the storage according to embodiment 18 of this invention.

FIG. 54 shows a perspective view of the position setting mechanism for positioning the recording medium cartridge 300 on the FDD unit 100. It shows an unload state where the position setting is released. FIG. 55 shows a perspective view of the position setting mechanism under the load state. FIG. 56 shows a perspective view of the engage state with the recording medium cartridge 300.

In the figures, a latch lever 410 is a position setting member for holding the load state which read and write procedure is possible in the FDD unit 100. The latch lever is composed of the pole shaped stopper 410a and the almost U-shaped hook spring 410b in the plain of the cartridge receiving face 110s. The hook spring 410b is placed in a concave 110p of the frame 110. When the recording medium cartridge 300 is loaded in the FDD unit 100, the hook spring 410b is hidden under the recording medium cartridge 300 by the concave 110p.

The eject shaft 403 has a lock notch 403f to which the stopper 410a moves under the unload state. The lock notch 403f is provided to contact with the pole side of the stopper 410a of the latch lever. The stopper 410a is always forced to contact with the lock notch 403f by the hook spring 410b.

The side of the recording medium cartridge 300 has a semicircular stopper notch 300a. When the recording medium cartridge 300 is completely inserted to the FDD unit 100, the pole side of the stopper 410a is engaged with the stopper notch 300a.

Thus, the latch lever 410 is mounted to engage with the stopper notch 300a of the recording medium cartridge 300. Accordingly, the position of the recording medium cartridge 300 both in the longish direction and the shortish direction is set.

There is shown the operation of the cartridge position setting mechanism wherein the recording medium cartridge 300 is inserted to the FDD unit 100 changing the unload state to the load state.

The recording medium cartridge 300 is inserted from the insertion and ejection port 180 and slides on the cartridge receiving face 110s so as to be inserted to the inside of the FDD unit 100. In case of insertion, the latch lever 410 is placed on the side of the eject shaft 403 by the hook spring 410b. Therefore, the latch lever contacts the lock notch 403f. This avoids bothering to insert the recording medium cartridge 300. When the recording medium cartridge 300 is completely inserted, according to the unload mechanism of the read/write head 101, the eject shaft 403 moves to the side of the insertion and ejection port 180. At the same time, the lock notch 403f moves on the side of the insertion and ejection port 180. The latch lever 410 being contacted the lock notch 403f moves out in the inside of the FDD unit 100 along the lock notch 403f. When the recording medium cartridge 300 is completely inserted and the movement of the eject shaft 403 finishes, the stopper 410a and the stopper notch 300a of the latch lever 410 are engaged and the recording medium cartridge 300 is set to the load state.

There is shown the operation of the cartridge position setting mechanism wherein the recording medium cartridge 300 is ejected to the outside of the FDD unit 100 changing the load state to the unload state.

The load state changes to the unload state according to the head unload mechanism. When the eject button 405 is pressed, the eject shaft 403 moves to the side of the insertion and ejection port 180. The lock notch 403f also moves. According to the notched shape of the lock notch 403f, the latch lever 410 retracts in the direction of the eject shaft 403. The engage state between the latch lever 410 and the stopper notch 300a is released. The recording medium cartridge 300 positioned in the inside of the FDD unit 100 by the latch lever 410 is released. As a result, the recording medium cartridge 300 is enabled to be ejected and the unload state is set. Based on such configuration, the recording medium cartridge 300 is positioned in the FDD unit 100.

Embodiment 19

This embodiment shows another embodiment related to the cartridge position setting mechanism.

Figure 57:
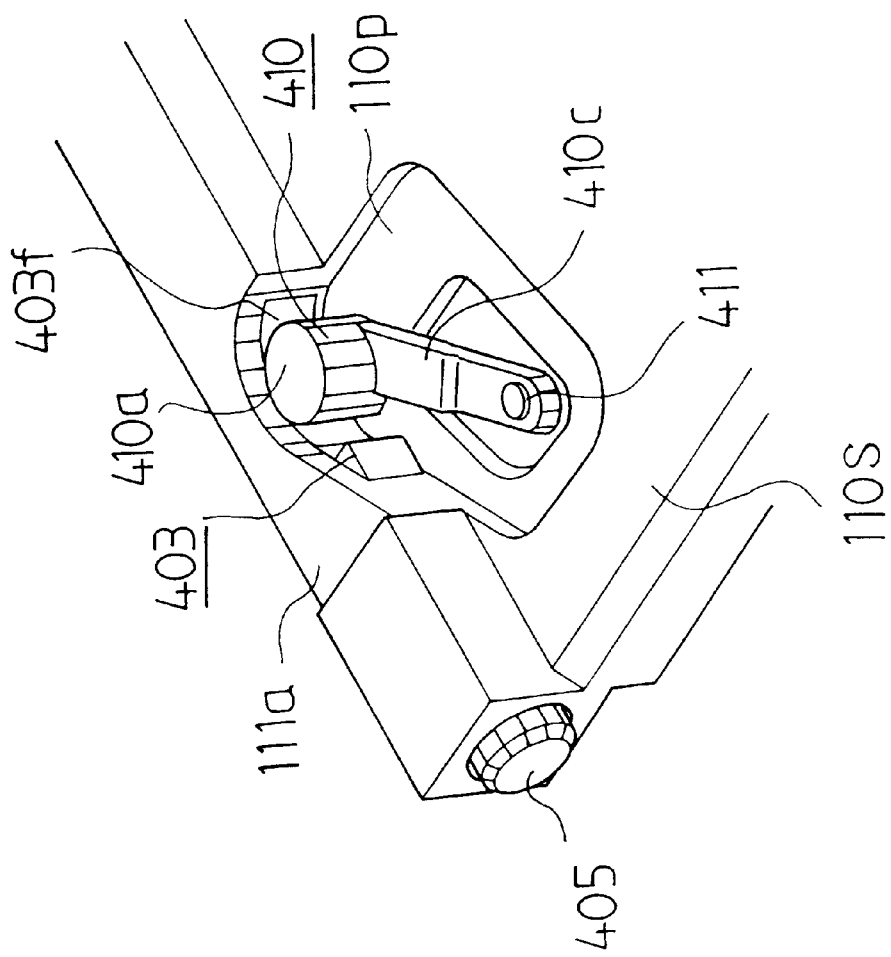
FIG. 57 shows a perspective view of the structure of the mechanism of setting the position of the recording medium cartridge according to embodiment 19 of this invention.

FIG. 57 shows a perspective view of the configuration of the cartridge position setting mechanism of the present embodiment. In the figure, a cartridge receiver face 110s is provided in the frame 110. A side wall part 111a is provided in the frame 110. A lock notch 403f is provided in the eject shaft 403. A latch lever 410 is composed of a pole shaped stopper 410a and a plate lever 410c. The latch lever 410 is engaged with a pin 411. The pin 411 is the stopper of the latch lever 410 in the direction of thickness of the FDD unit 100. The pin 411 also serves as a rotation shaft so that the latch lever 410 can rotate.

The latch lever 410 is not always forced to contact to the lock notch 403f. However, by the recording medium cartridge 300 being inserted, the inserting top of the recording medium cartridge 300 forces the stopper 410a to retract toward the lock notch 403f. When the position setting mechanism enters the load state, the stopper 410a is pushed out from the lock notch 403f and is engaged with the stopper notch 300a of the recording medium cartridge 300. When the recording medium cartridge 300 is ejected, with the ejecting operation of the recording medium cartridge 300, the eject shaft 403 moves on the side of the insertion and ejection port 180. The stopper 410a can be retracted in the inside of the lock notch 403f. According to the movement of the recording medium cartridge 300, the stopper 410a returns in the inside of the lock notch 403f.

Embodiment 20

Figure 58:
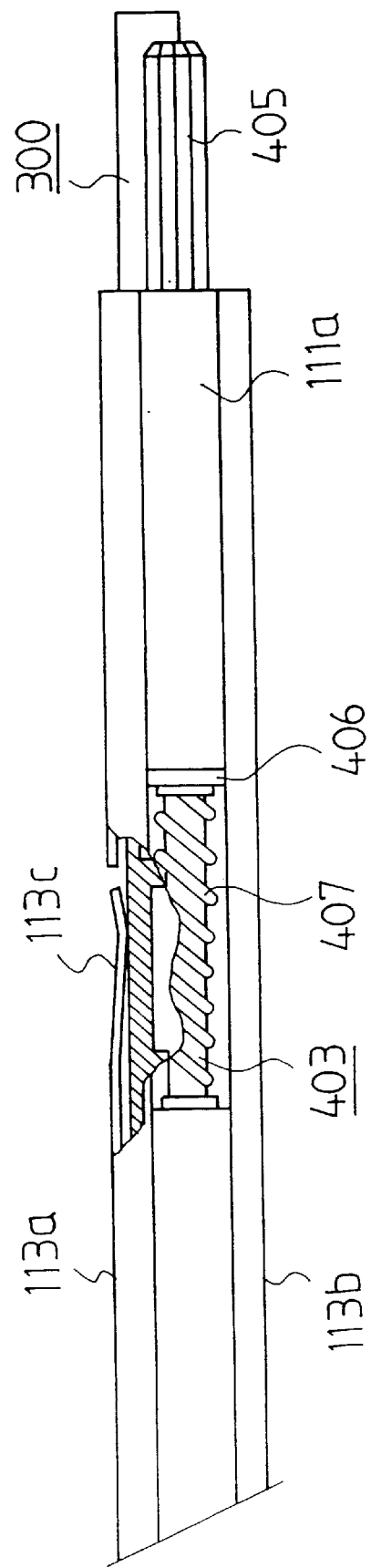
FIG. 58 shows a part of cross sectional view under the condition that the recording medium cartridge according to embodiment 20 of this invention is inserted to the storage.
Figure 59:
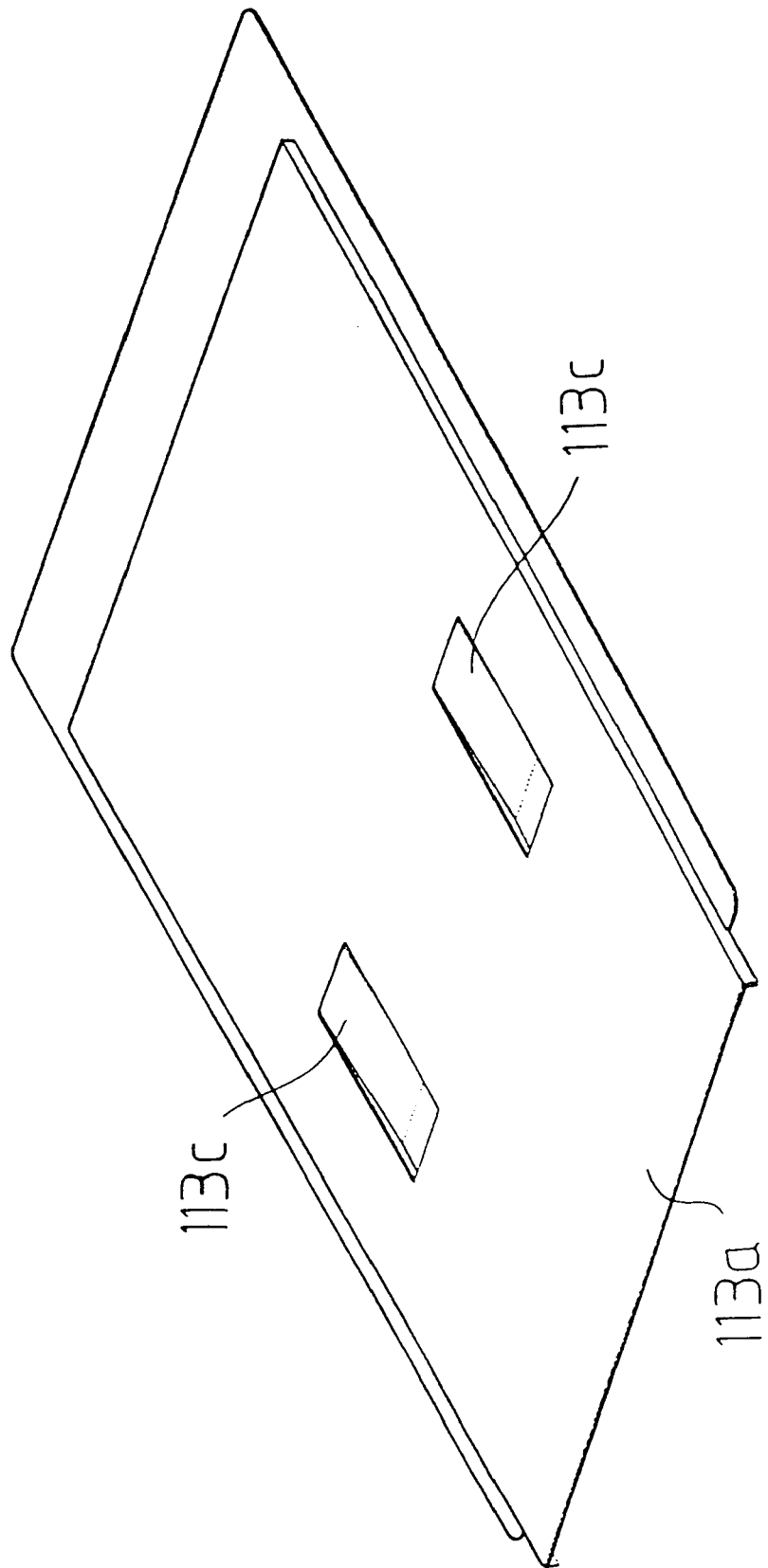
FIG. 59 shows a perspective view of the upper cover according to embodiment 20 of this invention.

FIG. 58 shows a part of cross sectional side view when the recording medium cartridge 300 is inserted to the FDD unit 100. FIG. 59 shows a whole perspective view of the upper cover 113a.

In the upper cover 113a, bend pieces 113c are provided. The bend pieces 113c press the recording medium cartridge 300 in the direction of thickness of the FDD unit 100 when the recording medium cartridge 300 is inserted to the FDD unit 100. By an elasticity of the bend piece 113c, the top face of the recording medium cartridge 300 is pressed down and therefore the recording medium cartridge 300 is firmly fixed in the FDD unit 100.

Thus, by pressing the recording medium cartridge 300 with the bend piece 113c of the upper cover 113a, it is possible to perform stable read and write operation.

As has been described, the unload lever rotates by moving the eject shaft and the head lifter contacts and rotates the arm according to the rotation of the unload lever. Accordingly, the recording medium cartridge can be inserted in the plane direction. The movement in the vertical direction is not needed. As a result, it is effective in that the structure can be simplified and the FDD unit can be made thinner.

Since the eject spring whose one end on the side of the insertion and ejection port contacts the eject shaft and the other end contacts the frame, the eject shaft comes to be always forced toward the side of the insertion and ejection port. As a result, it is possible to simplify the mechanism related to the eject shaft and obtain the FDD unit at a low cost.

Furthermore, the shaft barb stopper whose one end is engaged with the notch of the eject shaft and the other end is fixed on the frame is provided. When the recording medium cartridge is inserted and reaches to the position, the barb position of the shaft barb stopper is come down by the recording medium cartridge. Then, the engage state with the eject shaft is released and it is possible to move the eject shaft on the side of the insertion and ejection port. As a result, it is possible to make the FDD unit thinner.

Since the touching part of the eject shaft contacting the unload lever has a taper shape and the unload lever rotates by moving the eject shaft, it is possible to simplify the head unload mechanism and obtain the FDD unit at a low cost.

Since the unload lever whose one end contacts the unload lever and the other end contacts or fixed to the frame is provided, it is possible to simplify the head unload mechanism and obtain the FDD unit at a low cost.

Since the pressure foot for giving the pressure to the unload lever in a predetermined direction is mounted, it is possible to simplify the head unload mechanism and obtain the FDD unit at a low cost.

By moving the eject shaft, the latch lever is rotated or displaced. Accordingly, the latch lever can be engaged with the notch of the recording medium cartridge. Therefore, it is possible to determine the position of the recording medium cartridge and simplify the positioning mechanism of the recording medium cartridge. As a result, it is possible to obtain the FDD unit at a low cost.

Since the bend piece for pressing the recording medium cartridge to the side of the recording medium drive actuator is provided on the cover, it is possible to pressure the recording medium cartridge and reduce the number of parts. As a result, it is possible to obtain the FDD unit at a low cost.

Embodiment 21

Hereinafter, an embodiment according to this invention will be described with reference to the attached figures.

Figure 60:
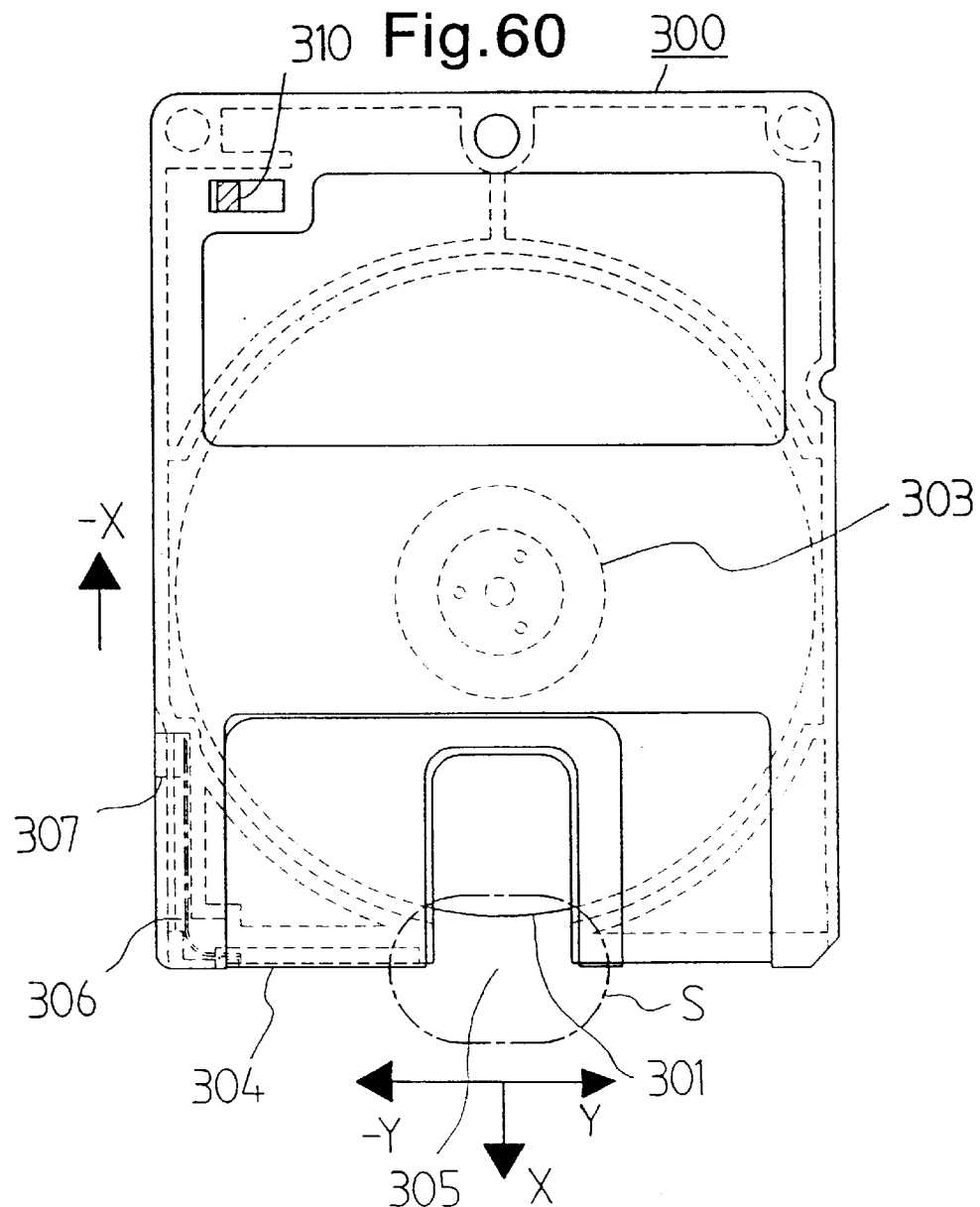
FIG. 60 shows a plan view of the recording medium cartridge according to embodiment 21 of this invention.
Figure 61:
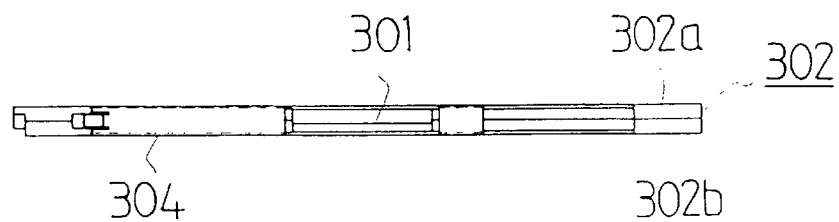
FIG. 61 shows a side view of the recording medium cartridge according to embodiment 21 of this invention.
Figure 62:
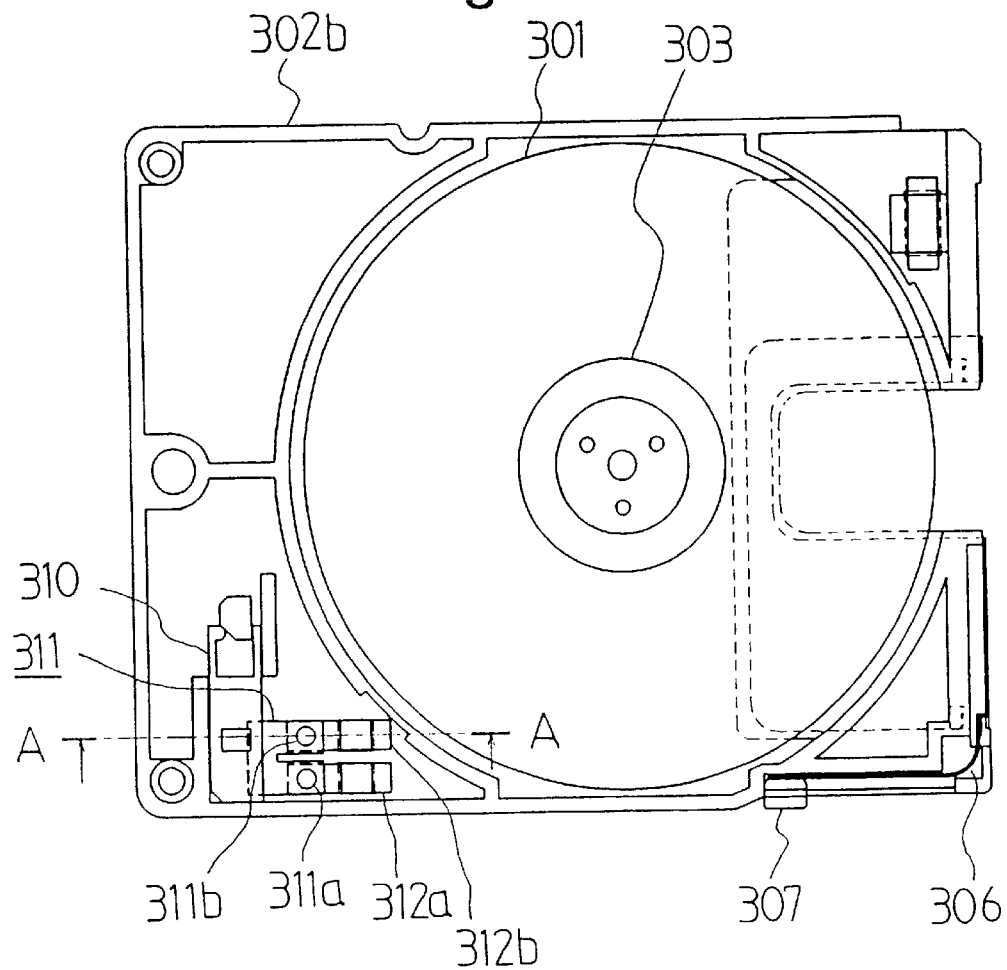
FIG. 62 shows a cross sectional plan view of the recording medium cartridge according to embodiment 21 of this invention.
Figure 63:
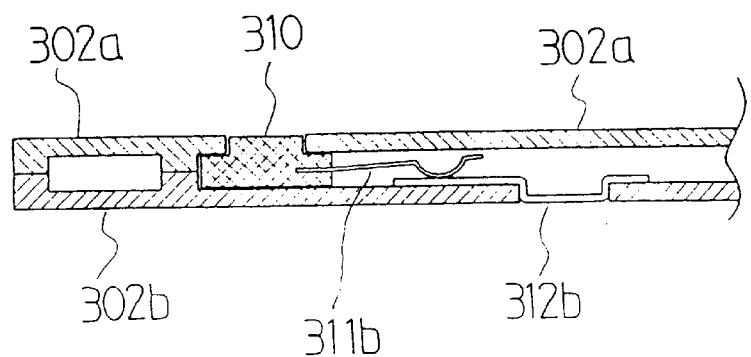
FIG. 63 shows a side cross sectional view seen from A—A direction of FIG. 62 according to embodiment 21 of this invention.

FIG. 60 shows a plan view of the recording medium cartridge. FIG. 61 shows a side view of the cartridge. FIGS. 60 and 61 show a condition that a shutter 304 is opened. FIG. 62 shows a cross sectional view of the recording medium cartridge. FIG. 63 shows an A—A cross sectional view of FIG. 62 to the direction of the arrows.

Figure 64:
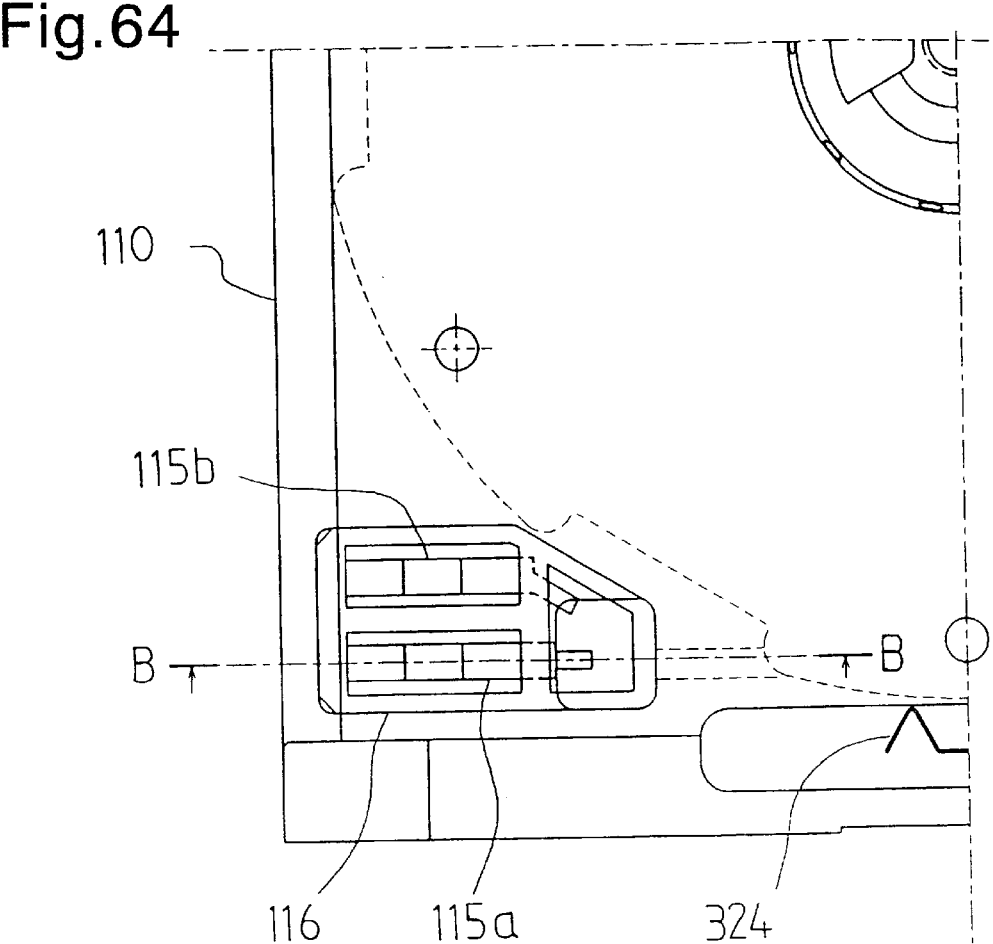
FIG. 64 shows a part of plan view of the FDD according to embodiment 21 of this invention.
Figure 65:
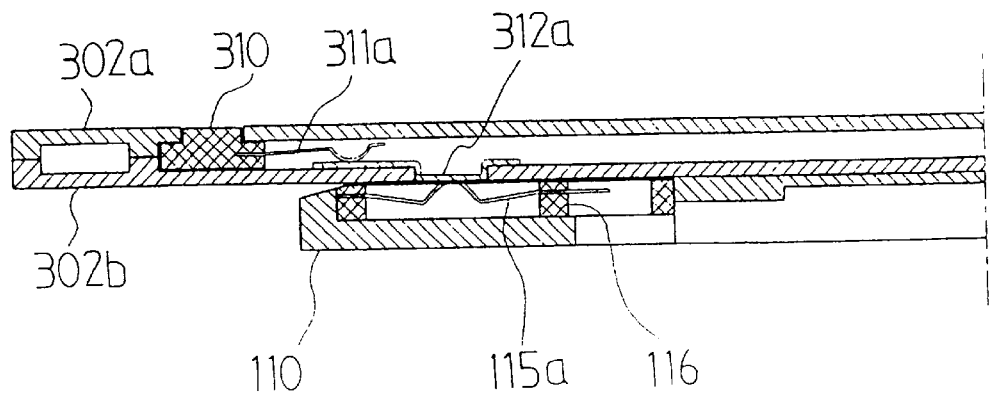
FIG. 65 shows a side cross sectional view seen from B—B direction of FIG. 64 according to embodiment 21 of this invention and a view of the recording medium cartridge and the switching storage under the condition that the recording medium cartridge is mounted in the storage.

Further, FIG. 64 shows a part of a plan view of FDD unit according to the present invention. FIG. 65 shows a B—B cross sectional view of FIG. 64 to the direction of the arrows. FIG. 65 shows the FDD unit and the recording medium cartridge at the time when the recording medium is under the load state.

A cartridge case 302 is composed of a resinous upper shell 302a and a resinous lower shell 302b. The cartridge case 302 carries a disk shaped recording medium 301 fixed on the hub 303. An opener band 306 is provided in the cartridge case 302. The end of the opener band 306 is fixed to an opener latch 307 and the other end of the opener band 306 is fixed to a shutter 304. As shown in FIG. 60, when the recording medium cartridge 300 is inserted into the FDD unit 100 in the X direction, the opener latch 307 is moved in the −X direction by the opener lever 324 mounted on the FDD unit 100. Simultaneously, the shutter 304 is pulled in the −Y direction and the window 305 is opened. Then, the recording medium 301 is exposed. Here, an area S has no parts on no members of the cartridge case 302 and the shutter 304. On the other hand, when the recording medium cartridge 300 is pulled out from the FDD unit 100 the opener latch 307 is moved in the X direction by the opener lever 324. Simultaneously, the shutter 304 is moved in the Y direction and a window 305 is closed.

A slide member 310 is used to recognize the writing prohibition state wherein information once recorded in the recording medium 301 is not erased. A conductive metal piece 311 of yoked type is fixed on the slide member 310 based on such as an integral structure. The conductive metal piece 311 is composed of an elastic plate of a flat spring. The lower shell 302b fixes two conductive metal plates 312a and 312b separately as shown in FIGS. 62 and 63 based on such as an integral structure. Further, portions of the metal plates 312a and 312b are exposed under the lower shell 302b.

In FIGS. 64 and 65, a frame 110 supports the FDD unit. Terminals 115a and 115b are parts of a write protect switch which recognizes the writing prohibition state. Each of terminals 115a and 115b is composed of flat spring of the conductive metal. Each of the terminals 115a and 115b is fixed at the departed position not to be contacted to the other terminal by the switch holder 116. The switch holder 116 is made of noncurrent substance like resin and fixed on the frame 110.

The ends of the terminals 115a and 115b are connected to the circuit board, not shown in the figure, in the FDD unit by the cable. When the recording medium cartridge 300 is mounted on the FDD unit 100 and the load state is set, terminals 115a and 115b are respectively contacted to the two metal plates 312a and 312b exposed from the lower shell 302b.

Figure 66:
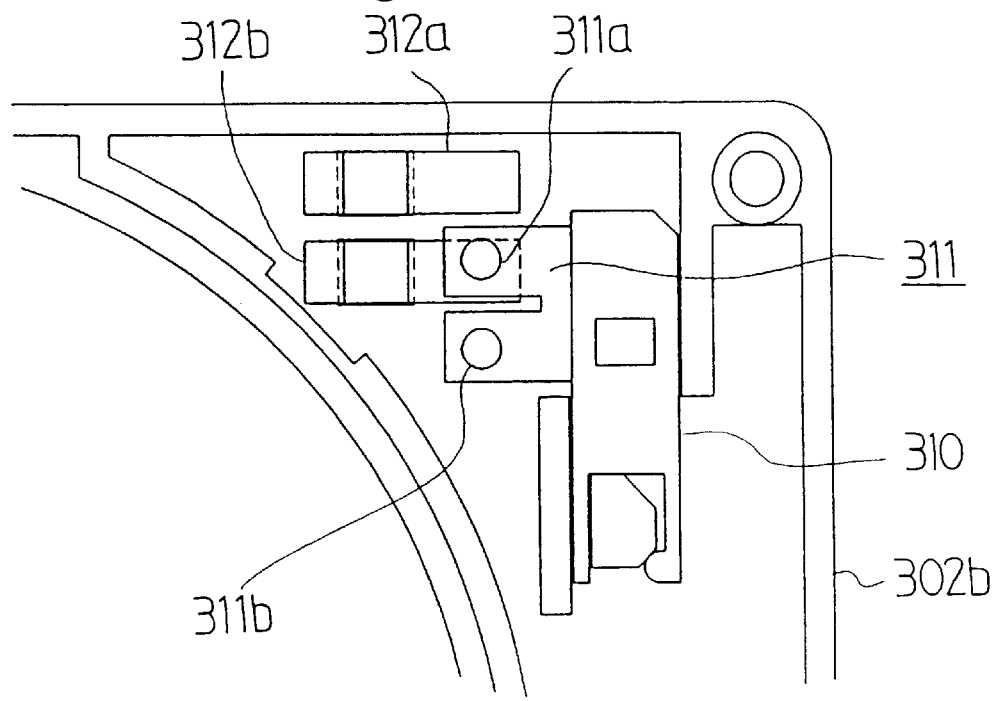
FIG. 66 shows a part of cross sectional plan view of the recording medium cartridge according to embodiment 21 of this invention.
Figure 67:
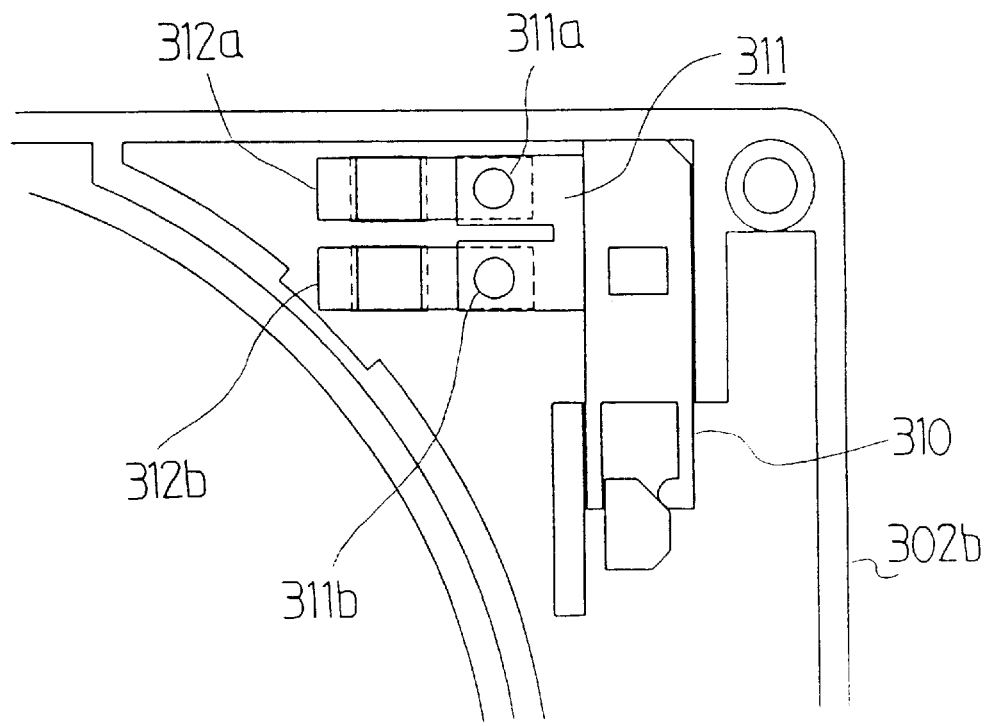
FIG. 67 shows a part of cross sectional side view of the recording medium cartridge according to embodiment 21 of this invention.

The operation of the write protect switch will now be described. FIG. 66 shows a cross sectional view in the direction of plan of the recording medium cartridge 300. FIG. 66 shows a condition that the metal piece 311 fixed on the slide member 310 comes in contact with only metal plate 312b fixed on the lower shell 302b. FIG. 67 shows a cross sectional view in the direction of plan of the recording medium cartridge 300. The metal piece 311 shows a condition that the metal piece 311 contacts two metal plates 312a and 312b.

When the recording medium cartridge 300 is set under the load state in which read and write procedure is possible, write protect switch terminals 115a and 115b on the side of the FDD unit respectively contacts metal plates 312a and 312b fixed on the lower shell 302b. As shown in FIG. 66, when the metal piece 311 contacts only the metal plate 312b, the terminals 115a and 115b connected to the circuit board are not conducted. On the other hand, as shown in FIG. 67, in a case where the metal piece 311 contacts both of the metal plates 312a and 312b, there occurs a conducting state between the terminals 115a and 115b. The circuit board judges whether the writing is prohibited or not by checking the conducting state.

In this way, when the part of the function of the write protect switch is provided in the recording medium cartridge 300, a thinner type of FDD unit than a conventional one is configurated. It is possible to obtain the FDD unit 100 having thickness of below 5.0 mm, which is able to be inserted to the standard slot defined by the PCMCIA type specification.

Embodiment 22

Figure 68:
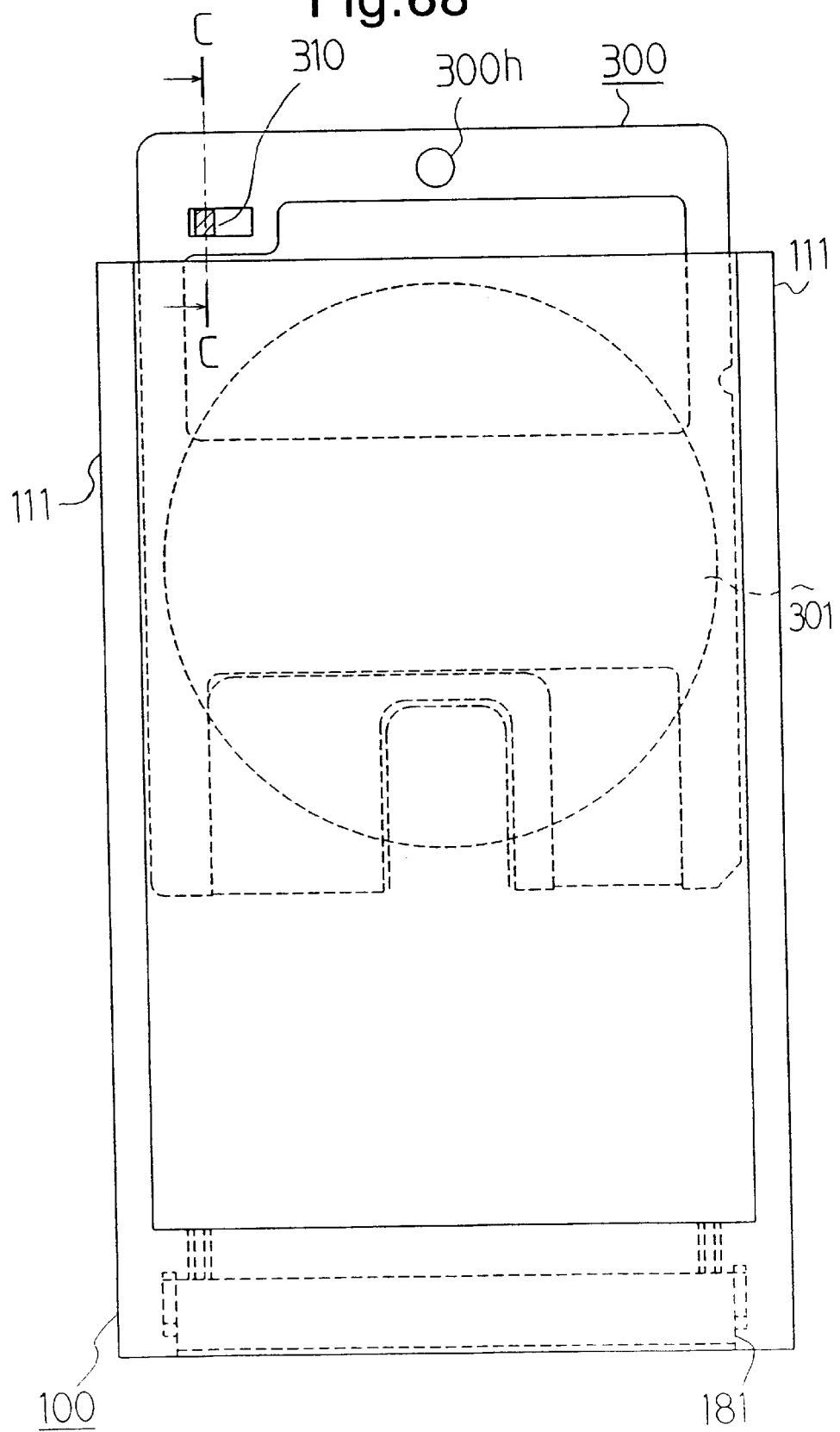
FIG. 68 shows a plan view of the recording medium cartridge and the FDD under the condition that the recording medium cartridge according to embodiment 22 of this invention is mounted in the storage.
Figure 69:
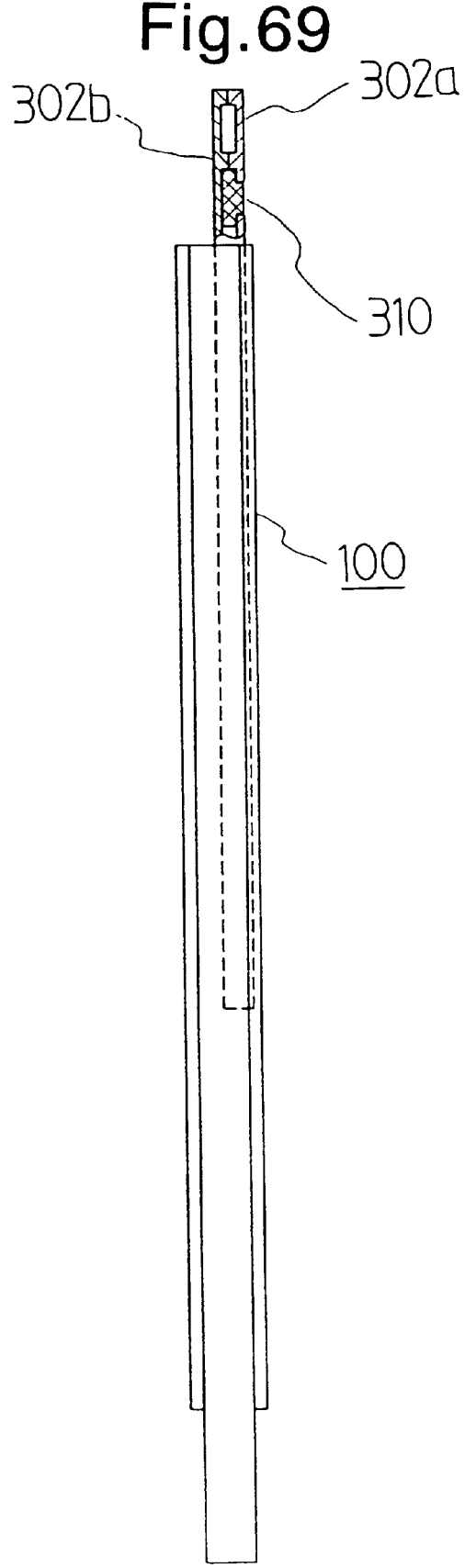
FIG. 69 shows a side view of FIG. 68 according to embodiment 22 of this invention and a part of cross sectional side view seen from C—C direction in FIG. 68.

FIG. 68 shows a top view when the recording medium cartridge 300 is mounted on the FDD unit 100 under the load state in which read and write procedure is possible. FIG. 69 shows a side view of FIG. 68 and a C—C cross sectional view of FIG. 68 to the direction of an arrow.

In the figures, an interface connector 181 is a connector in accordance with PCMCIA type 2 specification. A slide member 310 is used for recognizing writing prohibition state of the recording medium. A recording medium cartridge 300 is composed of the recording medium 301, the upper shell 302a, the lower shell 302b, the slide member 310 and so on.

When the recording medium cartridge 300 is mounted to the FDD unit 100 and the load state is set in which read and write procedure is possible, the slide member 310 is situated on the outside of the FDD unit 100. In order to move the slide member 310 in the Y direction, the upper shell 302a has a hole to expose the slide member. Then, the slide member is moved through the hole. The center of the top of the recording medium cartridge 300 has another hole 300h. When the recording medium cartridge 300 is pulled out from the FDD unit 100, the hole 300h can be used.

When the slide member 310 used for recognizing the writing prohibition state of the recording medium is positioned on the outside of the FDD unit 100 and is facing to the top side to make the operation easy. Therefore, it is possible to set or reset the writing prohibition state unless the recording medium cartridge 300 is set to the unload state.

Embodiment 23

Figure 70:
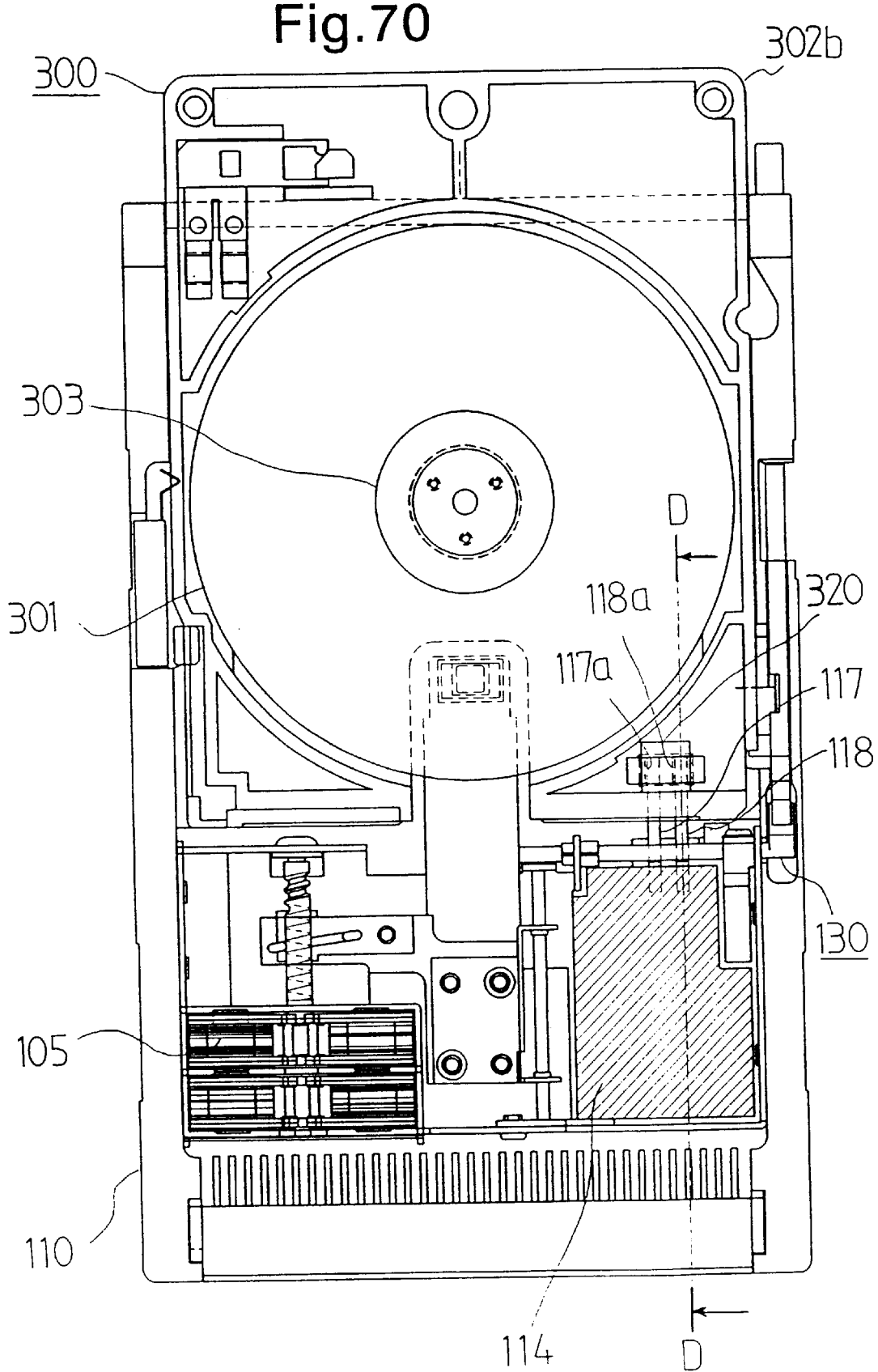
FIG. 70 shows a cross sectional plan view of the recording medium cartridge and the FDD under the condition that the recording medium cartridge according to embodiment 23 of this invention is mounted on the storage.
Figure 71:
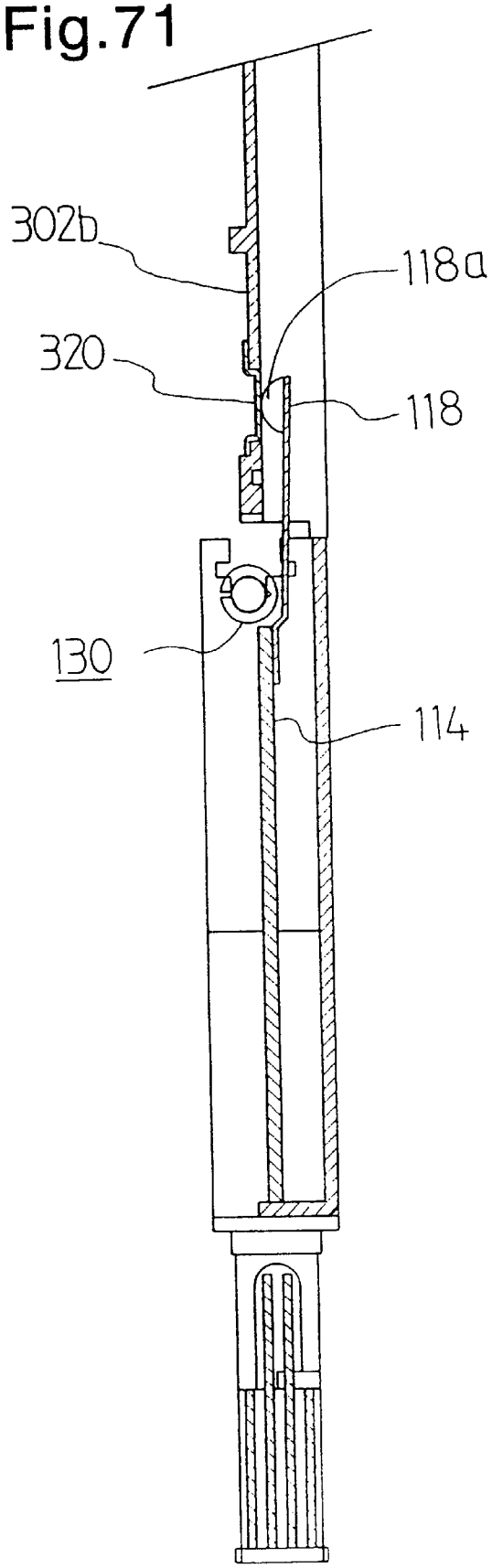
FIG. 71 shows a part of cross sectional side view seen from D—D direction of FIG. 70 according to embodiment 23 of this invention.

FIG. 70 shows a cross sectional view in the direction of plan when the recording medium cartridge 300 is mounted on the FDD unit 100 in a case where the recording medium cartridge 300 is under the load state. FIG. 71 shows a D—D cross sectional view seen in the direction of the arrows.

In the figures, a frame 110 supports the FDD unit 100. A head drive actuator 105, a circuit board 114 and a lower shell 302b are provided. The loading member 130 loads the recording medium cartridge 300 on the FDD unit and sets the position. A conductive metal plate 320 is used as a disk-in-switch for checking whether the recording medium cartridge 300 is mounted on the FDD unit 100 or not. A portion of the metal plate 320 is exposed and fixed on the surface of the lower shell 302b based on such as integral structure. Two disk-in-switch terminals 117 and 118 are fixed on the circuit board 114 by using such as a method of soldering.

The disk-in-switch terminals 117 and 118 has a spring characteristic. The terminal end portions 117a and 118a are always pressed in the direction of top of the FDD unit, namely in the direction of thickness of the cartridge 300. The terminal end portions 117a and 118a are arranged to get in touch with the exposed portion of the metal plate 320 fixed on the lower shell 302b when the recording medium cartridge 300 is mounted on the FDD unit 100 and the load state is set.

When the recording medium cartridge 300 is mounted on the FDD unit 100, both of the top portions 117a and 118a of the disk-in-switch terminals 117 and 118 come in contact with the metal plate 320 on the recording medium cartridge 300. Then, the disk-in-switch terminals 117 and 118 becomes the conducting state. When the circuit board 114 detects the conducting state, it is possible to judge that the recording medium cartridge 300 has been under the load state in which read and write procedure is possible in the FDD unit 100.

Thus, the metal plate 320 is provided for the disk-in-switch at the bottom of the cartridge, namely, the lower shell 302b. The portion of the metal plate is then exposed on the surface of the recording medium cartridge 300. Further, by mounting the disk-in-switch terminals 117 and 118 from the circuit board 114, the structure of the disk-in-switch for detecting that the recording medium cartridge 300 is under the load state on the FDD unit 100 is simplified and the FDD unit 100 can be made thinner.

Embodiment 24

Figure 72:
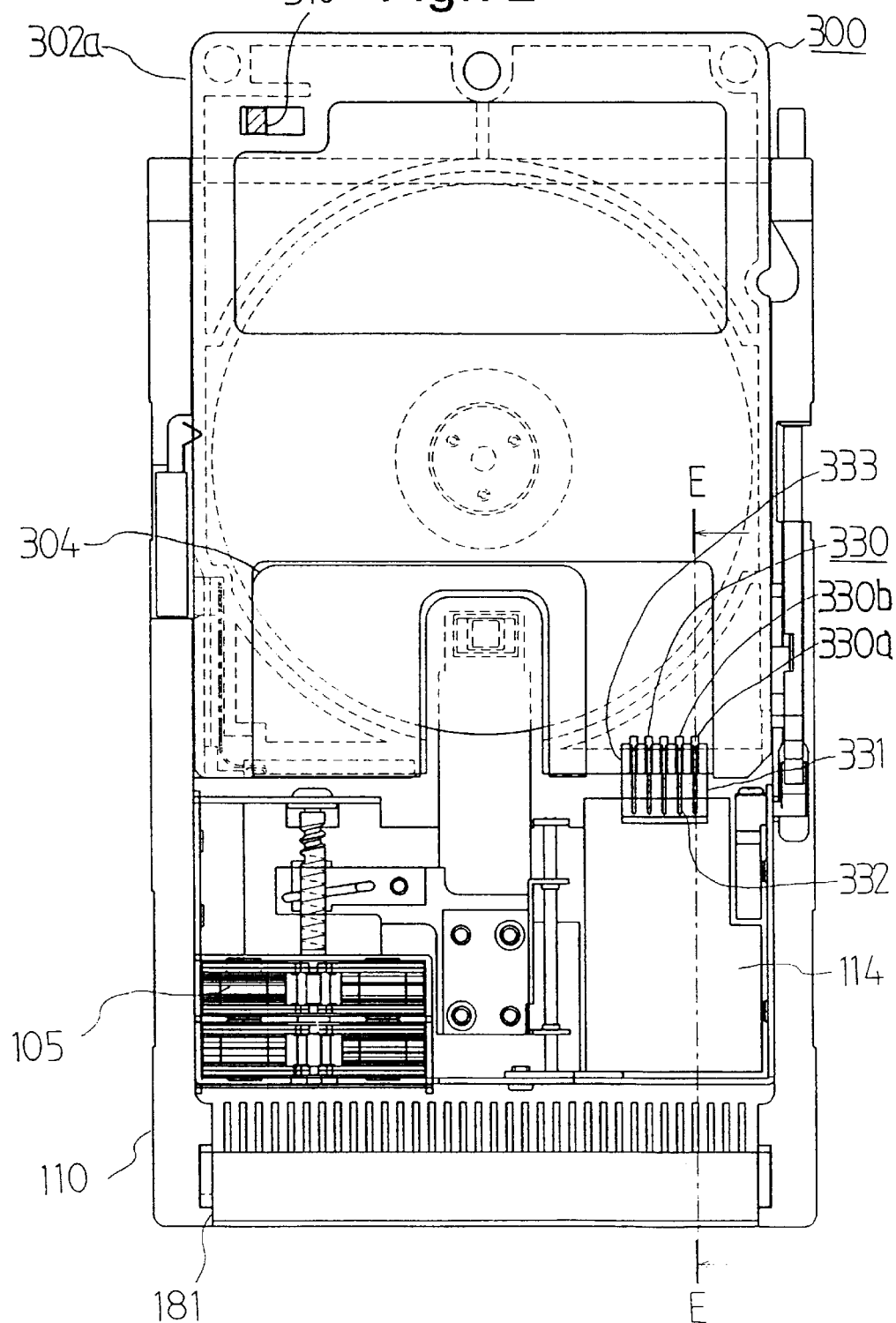
FIG. 72 shows a cross sectional plan view of the recording medium cartridge and the FDD under the condition that the recording medium cartridge according to embodiment 24 of this invention is mounted on the storage.
Figure 73:
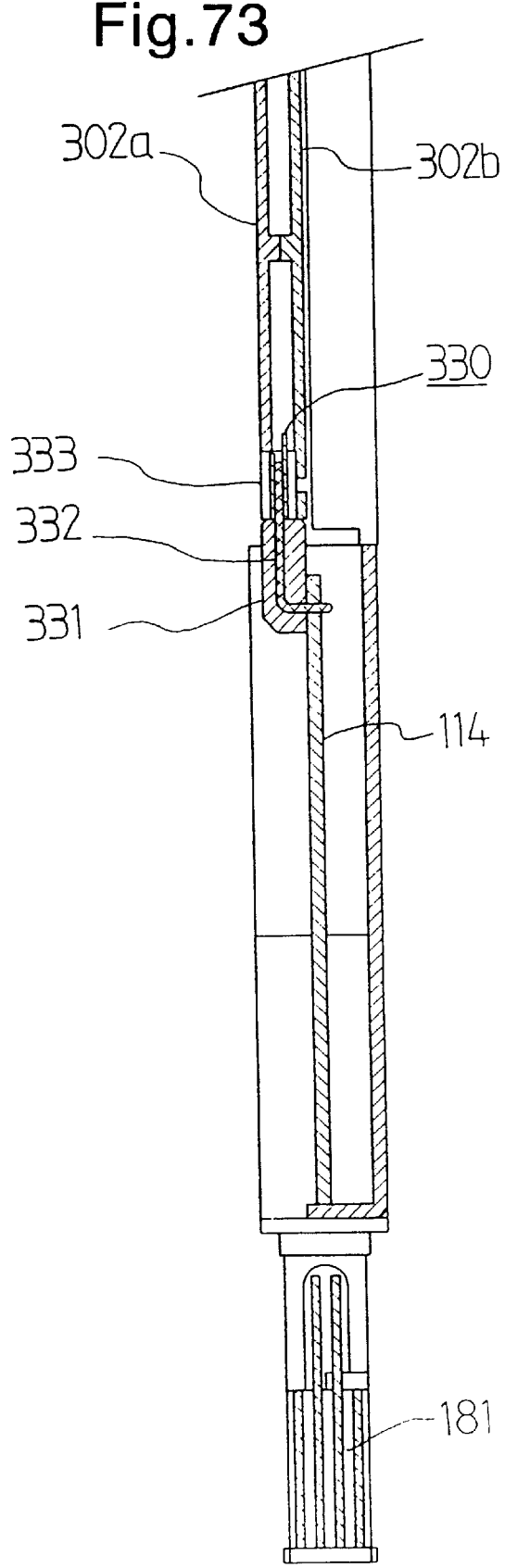
FIG. 73 shows a part of cross sectional side view seen from E—E direction of FIG. 72 according to embodiment 24 of this invention.

In this embodiment, there is shown another embodiment related to the structure of the disk-in-switch. FIG. 72 shows a cross sectional view in the direction of plan when the recording medium cartridge 300 is mounted on the FDD unit 100 and the load state is set. FIG. 73 shows an E—E cross sectional view of FIG. 72 seen in the direction of the arrows.

In the figures, the frame 110 supports the FDD unit. The head drive actuator 105, the circuit board 114 and the recording medium cartridge 300 are provided. The upper shell 302a is a top side case of the recording medium cartridge 300. The slide member 310 is used for write protection. The shutter 304 is provided in the recording medium cartridge 300. The interface connector 181 is the connector in accordance with PCMCIA type 2 specification.

The circuit board 114 has a connector 331 having more than two (five in FIG. 72) terminals 332 to be a standard of position detecting when the recording medium cartridge 300 tries to be the load state. The recording medium cartridge 300 has a connector contact 330. The connector contact 330 has a plurality of contacts to contact with each of the terminals 332. So that there might be at least two conducting points, at least two contacts 330 are connected each other by using a method of soldering or a cable. FIG. 72 shows a conducting state between the contacts 330a and 330b.

According to the present embodiment, by detecting the conducting state based on the connection of the connectors and terminals, it is possible to detect the position of the recording medium cartridge 300 and obtain the stable thin disk-in-switch.

Embodiment 25

Figure 74:
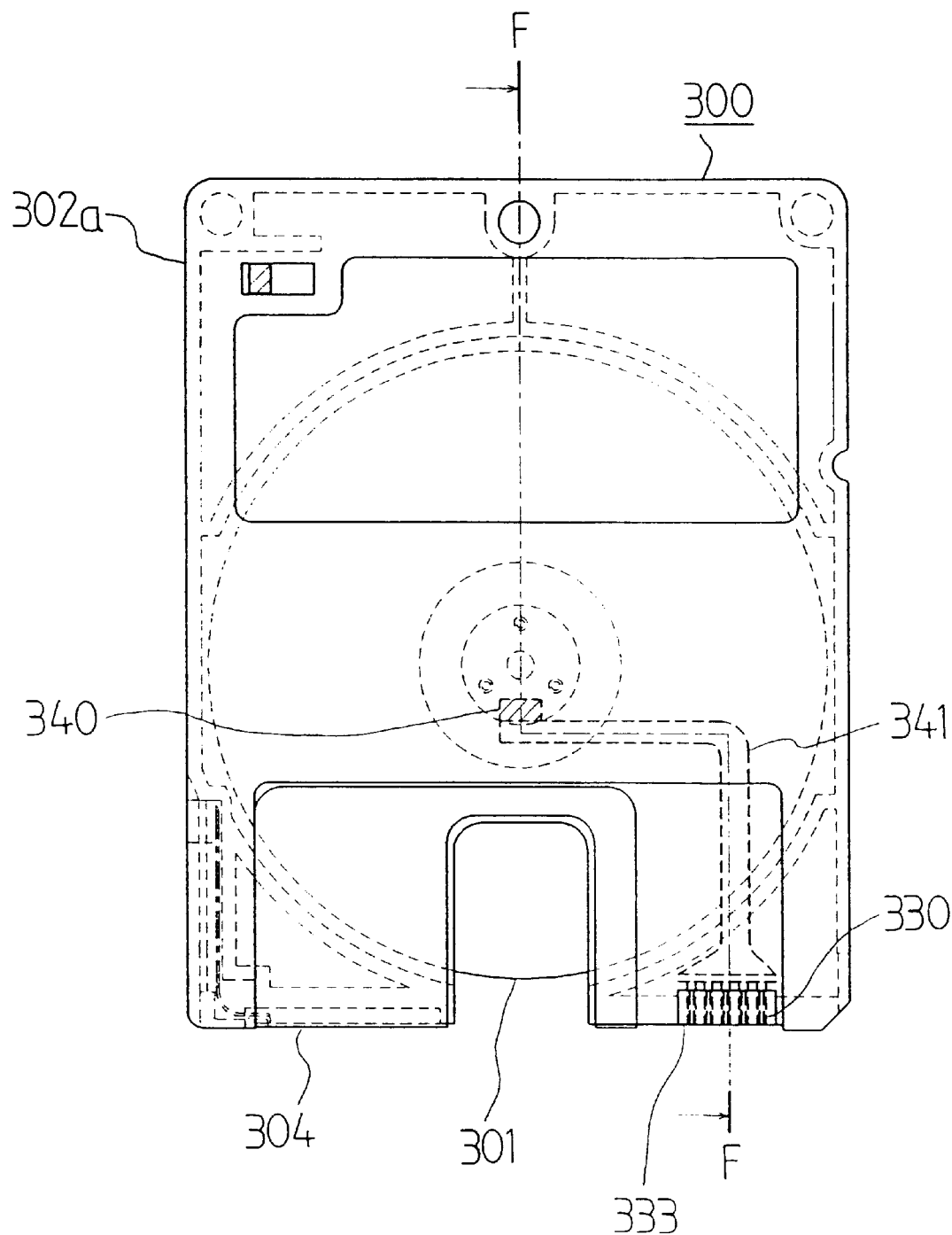
FIG. 74 shows a plan view under the condition that a shutter of the recording medium cartridge according to embodiment 25 of this invention is opened.
Figure 75:
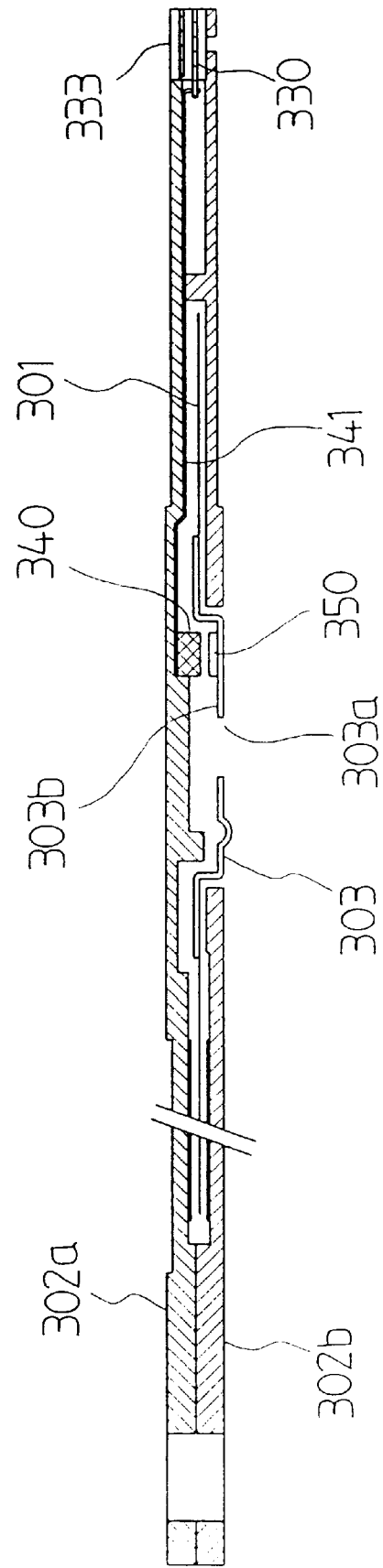
FIG. 75 shows a side face cross sectional view seen from F—F direction of FIG. 74 according to embodiment 25 of this invention.

FIG. 74 shows a top view of the recording medium cartridge 300. In the figure, there is shown a condition that the shutter 304 is opened. FIG. 75 shows an F—F cross sectional view of FIG. 74 seen in the direction of the arrows.

The recording medium 301 and the hub 303 are bonded by using such as a double coated pressure sensitive adhesive tape and carried in the recording medium cartridge 300 to be rotatable. A case of the recording medium cartridge 300 is composed of the upper shell 302a and the lower shell 302b. The inside of the upper shell 302a corresponding to the position a little shifted from the center hole 303a of the hub 303 has an index sensor 340 to detect a predefined position in one rotation. The index censor 340 is a reflection type of photo sensor.

The hub 303 is made of stainless material and its color is normally silver. So that a predefined position of the recording medium 301 or the hub 303 is detected by using a reflection type of photo sensor, a face 303b of the hub 303 facing to the index sensor 340 has a marker 350 of black color, for example, in order to be an opposite color of silver. As a result, when the recording medium 301 and the hub 303 rotate, the output signal of the index sensor 340 changes according to the black marker 350 on a part of the hub 303. Then, it is possible to obtain the index signal from the changed signal.

An index censor 340 is connected to a flexible print cable (hereinafter, referred to as FPC) 341. Each contacts of the connector contact 330 at the connector socket 333 mounted on the side of the shutter 304 of the recording medium cartridge 300 are connected to FPC 341 by using a method of soldering and so forth. Accordingly, the index signal obtained by the index sensor 340 is output to the circuit board 114 of the FDD unit 100 through the FPC 341 and the connector contact 330.

Thus, by mounting the index censor 340 in the recording medium cartridge 300, it is possible to make the FDD unit 100 smaller and thinner.

Embodiment 26

This embodiment shows another embodiment of the recording medium cartridge described in Embodiment 25.

Figure 76:
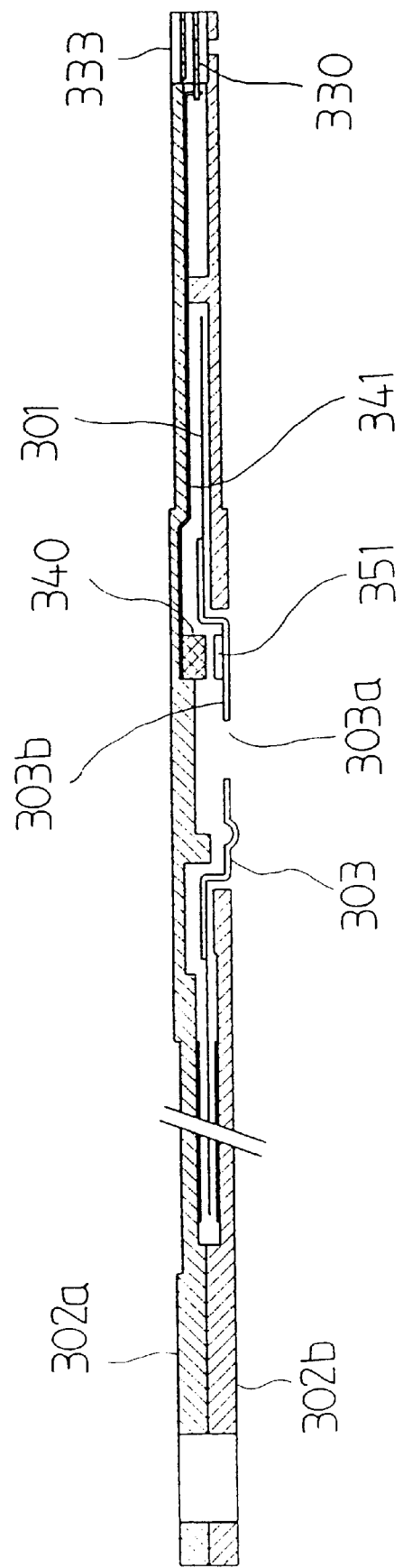
FIG. 76 shows a side face cross sectional view seen from F—F direction of FIG. 74 in the recording medium cartridge according to embodiment 26 of this invention.

FIG. 76 shows an F—F cross sectional view of FIG. 74 which is a top view of the recording medium cartridge, similar to the view of FIG. 75.

In the figure, the upper shell 302a, the lower shell 302b, the hub 303 and the recording medium 301 are provided. The index sensor 340 uses the magnetic resistance device here. On the face 303b of the hub 303 facing to the index sensor 340, a sheet magnet 351 which has N and S magnetic poles in the direction of plan is bonded by using adhesive and so on. As a result, when the recording medium 301 and the hub 303 rotate, the magnetic field of the magnet 351 fixed on a part of the hub 303 is detected by the magnetic resistance device of the index sensor 340. Then, it is possible to obtain the index signal.

Thus, by using the magnetic resistance device as the index sensor, it is possible to detect a predefined position in one rotation and to obtain the index signal as in Embodiment 25.

Embodiment 27

Figure 77:
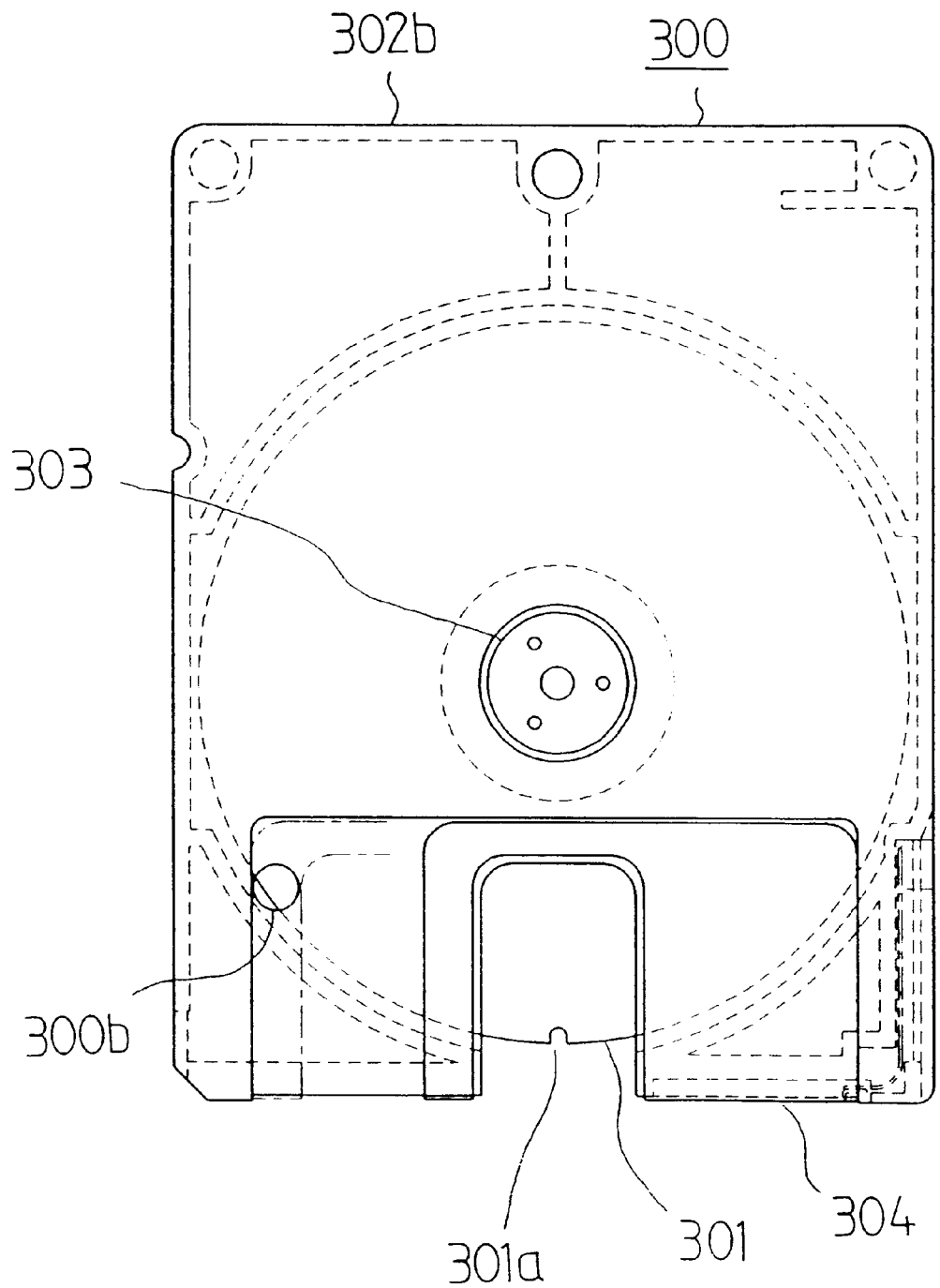
FIG. 77 shows a plan view under the condition that the shutter of the recording medium cartridge according to embodiment 27 of this invention is opened.
Figure 78:
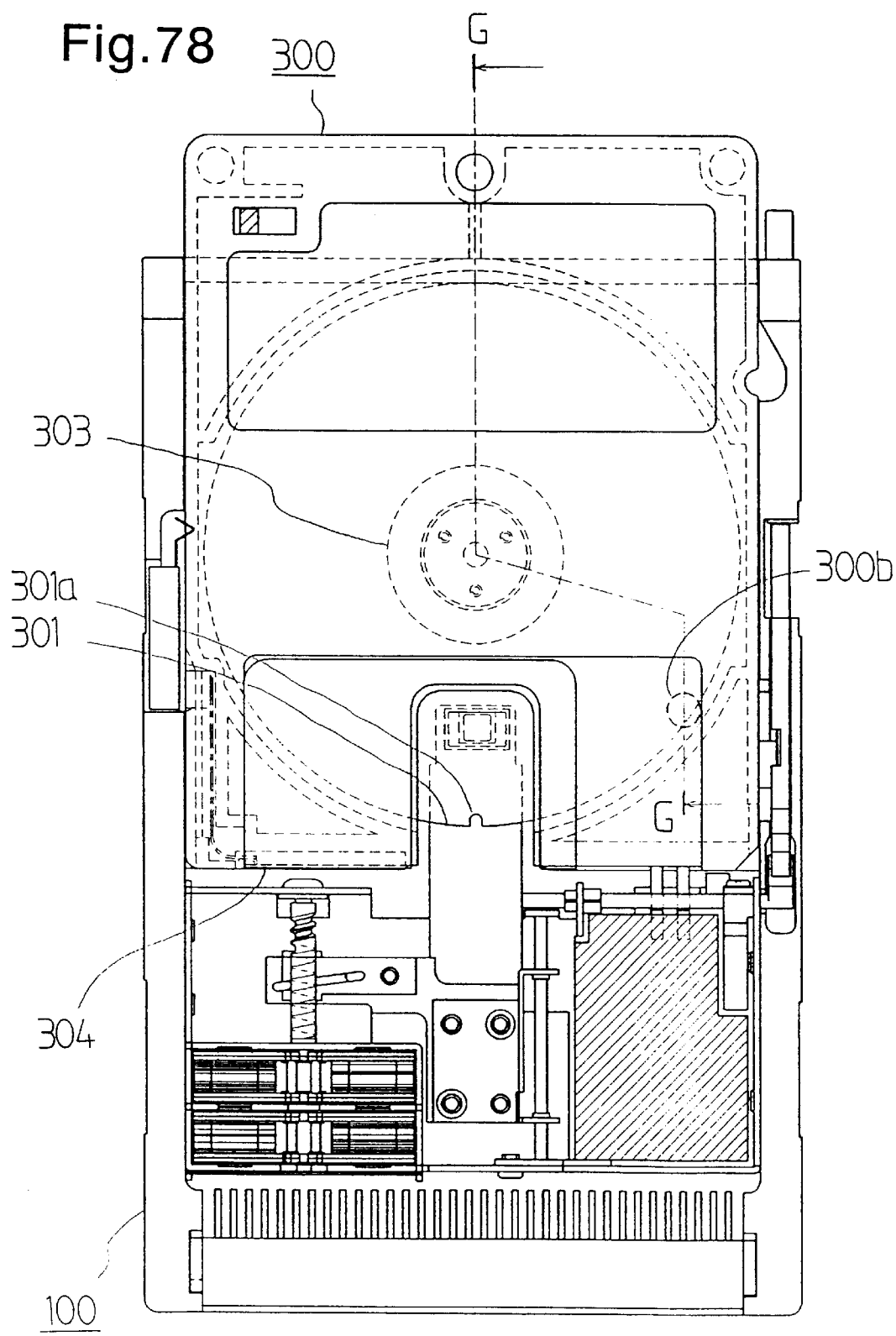
FIG. 78 shows a plan cross sectional view of the recording medium cartridge and the FDD under the condition that the recording medium cartridge according to embodiment 27 of this invention is mounted in the storage.
Figure 79:
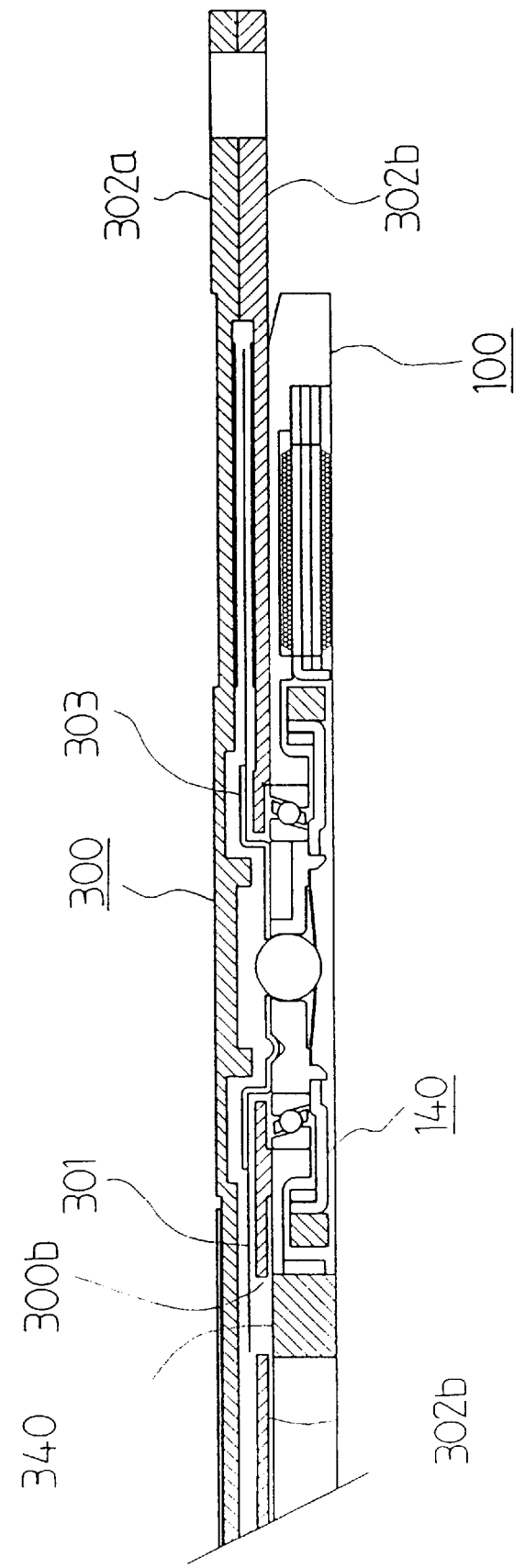
FIG. 79 shows a part of cross sectional side view seen from G—G direction of FIG. 78 according to embodiment 27 of this invention.
Figure 80:
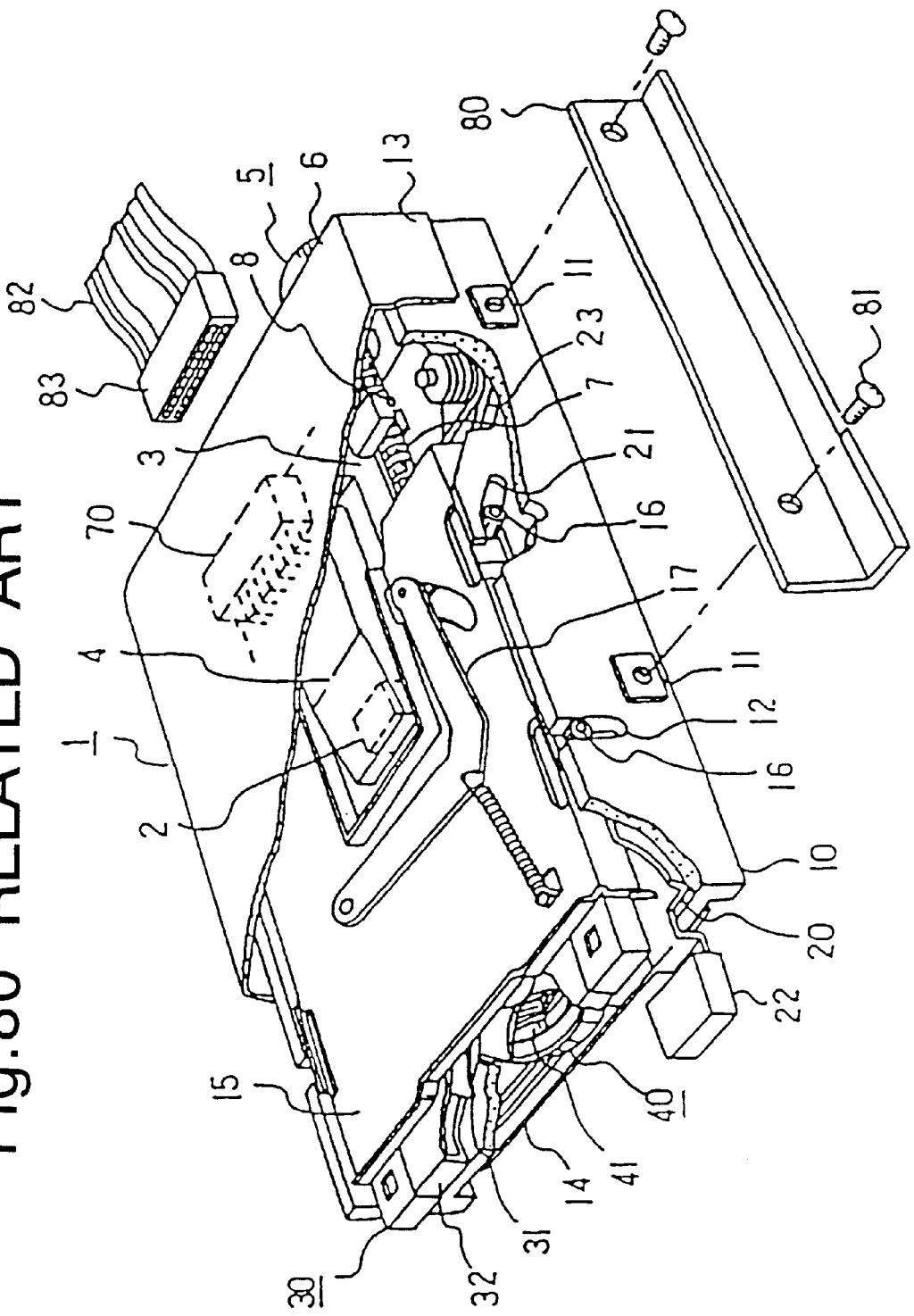
FIG. 80 is a slanted cross sectional view showing part of the conventional FDD.

FIG. 77 shows a plan view of the lower shell 302b of the recording medium cartridge 300. FIG. 78 shows a part of the cross sectional plan view when the recording medium cartridge 300 is set under the load state where read and write procedure is possible in the FDD unit 100. FIG. 79 shows a G—G cross sectional view of FIG. 78 seen in the direction of the arrows.

In the figures, the lower shell 302b, the shutter 304 and the recording medium 301 are provided. A part of a disk circumference of the recording medium 301 has a notch 301a. The lower shell 302b has a hole 300b to be able to inspect the notch 301a. In FIG. 77, the hole 300b is exposed only when the shutter 304 is opened. When the shutter 304 is shut, the hole 300b is covered by the shutter 304. Therefore, the hole 300b is not seen from the surface of the recording medium cartridge 300. However, the hole 300b does not need to locate at a place covered by the shutter 304.

In the FDD unit 100, the index sensor 340 for detecting a predefined position in one rotation is mounted at a corresponding position the hole 300b of the lower shell 302b when the recording medium cartridge 300 is set under the load state where the read and write is possible. The index sensor 340 here uses the reflection type of photo sensor.

There is shown a description of how the index signal is obtained by the index sensor 340.

When the recording medium cartridge 300 is set under the load state on the FDD unit 100, the recording medium 301 is detected by the above mentioned disk-in-switch. Then, the recording medium drive actuator 140 rotates and simultaneously the recording medium 301 and the hub 303 rotates. Under the load state, since the position in which the index sensor 340 is mounted matches the position of the hole 300b placed on the lower shell 302b, it is possible to detect the notch 301a of the recording medium 301 by the index sensor 340 using the reflection type of photo sensor. Thus, it is possible to obtain the index signal.

By making the notch at the part of the circumference of the recording medium 301 and providing the index sensor 340 using a reflection type of photo sensor on the FDD unit 100, it is possible to detect a predefined position in one rotation and to obtain the index signal. The mounting position of the index sensor does not need to be adjusted finely.

As has been described, the medium exchange type storage unit has at least two metal plates in the recording medium cartridge and the slide member a fixed another metal piece. The writing prohibition state is judged whether the slide member gets in touch with one metal plate or both metal plates. It is possible to make the writing prohibition switch thinner.

Since the conductive metal plate is exposed on the lower shell, it is possible to make the writing prohibition switch or make the disk-in-switch thinner.

Since the slide member is placed at the outside upper surface exposed from the storage unit under the condition that the recording medium cartridge is mounted on the storage unit, it is possible to obtain the storage unit whose operation is easy.

Furthermore, since the conductive metal plates are exposed on the surface of the recording medium cartridge and circuit board carried in the storage unit has conductive terminals of two poles, it is possible to make the disk-in-switch thinner.

Furthermore, by mounting the part of the index sensor for detecting the predefined position in one rotation to the recording medium storage, it is possible to make the storage unit thinner.

Furthermore, by mounting the reflection type of photo sensor for detecting a predefined position in one rotation in the recording medium in the recording medium cartridge, it is possible to obtain the storage unit providing a well qualified index signal.

Furthermore, by mounting the magnetic resistance device for detecting a predefined position in one rotation of the recording medium, it is possible to obtain the storage unit providing a well qualified index signal.

Furthermore, since a part of a circumference of the recording medium is partly notched, it is possible to obtain the index signal by the photo sensor and to obtain the storage unit whose reliability is high.

Furthermore, by mounting the photo sensor in the vertical direction of the partly notched recording medium, it is possible to obtain the index signal and to obtain the storage unit whose quality is high.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A recording medium cartridge, comprising:
   a disk-shaped recording medium;
   a case housing the recording medium;
   a window for exposing a part of the recording medium from the case;
   a shutter provided on the case for closing and exposing the window;
   a latch movable in the direction perpendicular to the closing and opening direction of the shutter; and
   a band attached at a first location to the shutter, attached at a second location to the latch, and attached at a third location to the shutter to link the shutter with the latch so that, when the latch is moved in a first latch direction, tension in a band portion between the first location and the second location causes the shutter to move in a first shutter direction and, when the latch is moved in a second latch direction, tension in a band portion between the second location and the third location causes the shutter to move in a second shutter direction which is opposite the first shutter direction, wherein the second location is disposed between the first location and the third location along the length of the band.

2. The recording medium cartridge of claim 1, wherein the latch is slidably disposed alone an outside sidewall of the case.

3. The recording medium cartridge of claim 1, wherein the recording medium has a positioning part and a convexity.

4. The recording medium cartridge of claim 1, wherein the recording medium has a positioning part and a circular concave groove.

5. The recording medium cartridge of claim 1, wherein the recording medium cartridge has a non-zero thickness not more than approximately 2.0 mm.

6. The recording medium cartridge of claim 1, wherein the recording medium has a non-zero diameter not more than approximately 1.8 inches.

7. The recording medium cartridge of claim 1, wherein the first location is disposed on one side of the shutter, and wherein the third location is disposed on another side of the shutter.

8. The recording medium cartridge of claim 1, wherein the band extends substantially around a periphery of the recording medium.

9. A recording medium cartridge comprising:
   a disk-shaped recording medium;
   a case housing the recording medium;
   a window for exposing a part of the recording medium from the case;
   a shutter provided on the case for closing and exposing the window;
   a latch movable in the direction perpendicular to the closing and opening direction of the shutter; and
   a band attached at a first location to the shutter, attached at a second location to the latch, and attached at a third location to the shutter to link the shutter with the latch so that, when the latch is moved in a first latch direction, tension in a band portion between the first location and the second location causes the shutter to move in a first shutter direction and, when the latch is moved in a second latch direction, tension in a band portion between the second location and the third location causes the shutter to move in a second shutter direction which is opposite the first shutter direction, wherein a first end of the band is attached to the shutter at the first location and wherein a second end of the band is attached to the shutter at the third location.

10. The recording medium cartridge of claim 9, wherein the latch is slidably disposed along an outside sidewall of the case.

11. The recording medium cartridge of claim 9, wherein the recording medium cartridge has a non-zero thickness not more than approximately 2.0 mm.

12. The recording medium cartridge of claim 9, wherein the recording medium has a non-zero diameter not more than approximately 1.8 inches.

13. The recording medium cartridge of claim 9, wherein the first location is disposed on one side of the shutter, and the third location is disposed on another side of the shutter.

14. The recording medium cartridge of claim 9, wherein the band extends substantially around the periphery of the recording medium.

15. The recording medium cartridge of claim 9, wherein the second location is disposed between the first location and the third location along a length of the band.

* * * * *